United States Patent
Kaneko et al.

(10) Patent No.: US 9,581,728 B2
(45) Date of Patent: Feb. 28, 2017

(54) RETARDATION FILM, POLARIZING PLATE AND LIQUID CRYSTAL DISPLAY

(71) Applicant: Konica Minolta, Inc., Tokyo (JP)

(72) Inventors: Yuki Kaneko, Tokyo (JP); Masataka Takimoto, Tokyo (JP); Takashi Nanjiyou, Tokyo (JP); Takahiro Takagi, Tokyo (JP); Yuta Shimane, Tokyo (JP); Masumi Nishimura, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/649,101

(22) PCT Filed: Nov. 13, 2013

(86) PCT No.: PCT/JP2013/080677
§ 371 (c)(1),
(2) Date: Jun. 2, 2015

(87) PCT Pub. No.: WO2014/091859
PCT Pub. Date: Jun. 19, 2014

(65) Prior Publication Data
US 2015/0323703 A1 Nov. 12, 2015

(30) Foreign Application Priority Data

Dec. 13, 2012 (JP) ................................ 2012-272824

(51) Int. Cl.
*G02F 1/13363* (2006.01)
*G02B 1/04* (2006.01)
(Continued)

(52) U.S. Cl.
CPC .............. *G02B 1/04* (2013.01); *C08K 5/0016* (2013.01); *C08K 5/10* (2013.01); *C08K 5/15* (2013.01);
(Continued)

(58) Field of Classification Search
CPC ..... C08L 1/10; C08L 1/12; C08L 1/14; C08K 5/0016; C08J 5/18; C08J 2301/12;
(Continued)

(56) References Cited

U.S. PATENT DOCUMENTS 3,169,129 A * 2/1965 Leo Rodgers John ....................
C09K 11/06
252/301.16
2007/0009676 A1* 1/2007 Tamagawa .................. C08J 5/18
428/1.31

(Continued)

FOREIGN PATENT DOCUMENTS

JP    2006188718 A    7/2006
JP    2008197310 A    8/2008
(Continued)

OTHER PUBLICATIONS

Office Action dated Dec. 2, 2014 for corresponding Taiwan Patent Application No. 102142697 and English translation.
(Continued)

*Primary Examiner* — Sophie Hon
(74) *Attorney, Agent, or Firm* — Lucas & Mercanti, LLP

(57) ABSTRACT

The retardation film contains a cellulose ester, has a film thickness of 15 to less than 40 μm, has a film thickness variation both in the widthwise direction and lengthwise direction of 0 to 4 μm, and satisfies an Rt humidity fluctuation of 1% to 12%:

(a difference of retardation $Rt$ (590) values in the thickness direction represented by the following formula (ii) measured at a wavelength of 590 nm after the film has been left to stand for 5 hours in each of a 23° C., 20% relative humidity environment and a 23° C., 80% relative humidity environment)/($Rt$ (590) value measured after the film has been left to stand for 5 hours in a 23° C., 55% relative humidity environment)×100

$$Rt(590)=\{(n_x+n_y)/2-n_z\} \times d \quad \text{Formula (ii)}$$

wherein $n_x$: a refractive index in the slow axis direction in the film plane, $n_y$: a refractive index in the direction per-
(Continued)

pendicular to the slow axis in the film plane, $n_z$: a refractive index in the thickness direction of the film, and d: a film thickness.

9 Claims, 2 Drawing Sheets

(51) Int. Cl.

| | | |
|---|---|---|
| *G02F 1/1335* | (2006.01) | |
| *G02B 5/30* | (2006.01) | |
| *C08K 5/10* | (2006.01) | |
| *C08K 5/15* | (2006.01) | |
| *C08K 5/357* | (2006.01) | |
| *C08K 5/46* | (2006.01) | |
| *C08K 5/00* | (2006.01) | |

(52) U.S. Cl.
CPC .............. *C08K 5/357* (2013.01); *C08K 5/46* (2013.01); *G02B 5/3083* (2013.01); *G02F 1/13363* (2013.01); *G02F 1/133528* (2013.01); *C08K 5/0008* (2013.01); *Y10T 428/105* (2015.01)

(58) Field of Classification Search
CPC ........... G02F 1/133528; G02F 1/13363; G02F 2201/50; Y10T 428/1036–428/1041; Y10T 428/105; Y10T 428/1059; Y10T 428/1073; Y10T 428/1077
USPC ............... 428/1.3–1.31, 1.33, 1.5, 1.53–1.54
See application file for complete search history.

(56) References Cited

U.S. PATENT DOCUMENTS

| | | | | |
|---|---|---|---|---|
| 2007/0247576 A1* | 10/2007 | Tamagawa | ................ | C08L 1/10 349/117 |
| 2009/0051058 A1* | 2/2009 | Ogomi | ................ | G02B 5/3033 264/1.34 |
| 2010/0252786 A1* | 10/2010 | Tamagawa | .............. | B29C 41/26 252/582 |

FOREIGN PATENT DOCUMENTS

| | | | |
|---|---|---|---|
| JP | 2011173964 A | 9/2011 | |
| JP | 2012063492 A | 3/2012 | |
| JP | 2012198534 A | 10/2012 | |
| JP | 2012215687 A | 11/2012 | |
| JP | WO 2013031356 A1 * | 3/2013 | ............... C08K 3/36 |
| JP | WO 2013125419 A1 * | 8/2013 | ................ C08J 5/18 |
| JP | WO 2013136977 A1 * | 9/2013 | ........... G02B 5/3083 |

OTHER PUBLICATIONS

International Search Report dated Jan. 14, 2014 for Application No. PCT/JP2013/080677 with English translation.
The International Preliminary Report on Patentability dated Jun. 16, 2015 from the corresponding International Patent Application No. PCT/JP2013/080677.
The Written Opinion of the International Search Authority dated Jan. 14, 2014 from the corresponding International Patent Application No. PCT/JP2013/080677.
English translation of The Written Opinion of the International Search Authority dated Jan. 14, 2014 from the corresponding International Patent Application No. PCT/JP2013/080677.

* cited by examiner

RETARDATION FILM, POLARIZING PLATE AND LIQUID CRYSTAL DISPLAY

CROSS REFERENCE TO RELATED APPLICATION

This Application is a 371 of PCT/JP2013/080677 filed on Nov. 13, 2013 which, in turn, claimed the priority of Japanese Patent Application No. JP2012-272824 filed on Dec. 13, 2012, both applications are incorporated herein by reference.

TECHNICAL FIELD

The present invention relates to a retardation film, a polarizing plate and a liquid crystal display. More specifically, the present invention relates to a retardation film having small fluctuation in a retardation value in the film thickness direction and small variation in a phase difference due to humidity fluctuation, and a polarizing plate and a liquid crystal display, which have the retardation film and are excellent in durability such as moist heat resistance.

BACKGROUND ART

The demand for liquid crystal displays has been increased in applications such as liquid crystal TVs and liquid crystal displays of personal computers. In general, a liquid crystal display is constituted of a liquid crystal cell having a transparent electrode, a liquid crystal layer, a color filter, and the like, which are sandwiched with glass plates, and two polarizing plates provided in both sides of the liquid crystal cell, and each polarizing plate has a structure having a polarizer (also called a polarization membrane or a polarization film), which is sandwiched with two films (polarizing plate protecting films). For the above described polarizing plate protecting film, a cellulose ester film has been widely used because it has high transparency and can easily secure adhesiveness to a polyvinyl alcohol.

In addition, by arranging an optically biaxial retardation film between a polarizing plate and a liquid crystal layer of a liquid crystal display, it has been known that a wider viewing angel can be realized, that is, display characteristics can be improved. A cellulose ester film capable of expressing excellent optical performance has been focused also as such a retardation film, and a cellulose ester film is also used in a liquid crystal display as a retardation film.

However, since a cellulose ester film has high moisture permeability, the moisture permeates its inside to thus easily cause fluctuation in retardation values (phase difference values) of a retardation film and, as a result, there was a problem such as the occurrence of color unevenness of a liquid crystal display.

As a method of improving fluctuation in retardation values of the above described cellulose ester film, examples thereof include a method of making a film thickness small and a method of adding a large amount of an additive for controlling moisture permeability. However, when the film thickness is made small or when a large amount of an additive is added, a retardation value becomes small and a compound having high ability of increasing the retardation value is thus requested.

As a compound of having high ability of increasing a retardation value, examples such as 1,3,5-triazine-based compounds are suggested (for example, refer to Patent Literature 1).

In addition, in recent years, liquid crystal displays started to be used in televisions and large-sized monitors because of enhancement of its image quality and improvement of high-resolution techniques. In particular, demands such as increasing in sizes of these liquid crystal displays and cost reduction due to effective production are intensified also for materials of liquid crystal displays, and a retardation film is thus required to have a broad width.

CITATION LIST

Patent Literature

Patent Literature 1: JP 2006-188718

SUMMARY OF INVENTION

Technical Problem

However, even when a compound as described in Patent Literature 1 was used, a retardation expression property was insufficient. Furthermore, when an adding amount of the compound was increased in order to enhance the retardation expression property, a polarizing plate prepared using a thinned retardation film containing the compound and a liquid crystal display using the retardation film have a problem of being inferior in durability such as moist heat resistance. In addition, when a large amount of an additive is added in order to control moisture permeability, compatibility to a cellulose ester decreases and the adding amount allowed is limited depending on a type of the additive. Furthermore, along with enlargement of a liquid crystal display, when a thinned retardation film is used in the case of producing a retardation film having a large area, it is hard to control the film thickness of the thin film and film thickness variation thus occurs, thereby causing variation in phase differences in the film in-plane direction, and there was a problem of the occurrence of display unevenness.

The present invention was attained in view of the above described problems, and an object is to provide a retardation film that, while maintaining a high retardation value, has increased durability such as moist heat resistance and can prevent the occurrence of color unevenness even if made in a size having a large area.

Solution to Problem

The present inventors repeated intensive investigations in view of the above described object. As a result, they found that the above described problems can be solved by controlling variation in a film thickness within a specific range and setting fluctuation in retardation values due to humidity fluctuation within a specific range, as well as making a film thickness small, and achieved the completion of the present invention.

That is, the above described object of the present invention is achieved by the following constitution.

1. A retardation film including a cellulose ester as the primary component, which has a film thickness of 15 μm or more and less than 40 μm, has a film thickness variation both in the widthwise direction and lengthwise direction of 0 to 4 μm, and satisfies an Rt humidity fluctuation represented by the formula (1) described below of 1% to 12%.

$Rt$ humidity fluctuation=($\Delta Rt$ value, a difference of retardation $Rt(590)$ values in the thickness direction represented by the following formula (ii) measured at a wavelength of 590 nm after the film has been left to stand for 5 hours in each of a 23° C., 20% relative humidity environment and a 23° C., 80% relative humidity environment)/(Rt(590) value measured after the film has been left to stand for 5 hours in a 23° C., 55% relative humidity environment)×100: Formula (1)

$$Rt(590)=\{(n_x+n_y)/2-n_z\}\times d \quad \text{Formula (ii)}$$

(wherein $n_x$ represents a refractive index in the slow axis direction in the film plane, $n_y$ represents a refractive index in the direction perpendicular to the slow axis in the film plane, $n_z$ represents a refractive index in the thickness direction of the film, and d represents a film thickness (nm), respectively).

2. The retardation film including a cellulose ester as the primary component as set forth in item 1, wherein the total substitution degree of the cellulose ester is 2.1 to 2.5.

3. The retardation film including a cellulose ester as the primary component as set forth in item 1 or 2, which comprises at least one plasticizer selected from the group consisting of sugar ester compounds, polyester compounds and acrylic compounds.

4. The retardation film including a cellulose ester as the primary component as set forth in any one of items 1 to 3, which comprises at least one retardation increasing agent.

5. The retardation film including a cellulose ester as the primary component as set forth in any one of items 1 to 4, wherein the total substitution degree of the cellulose ester is 2.15 to 2.35.

6. A polarizing plate, comprising the retardation film as set forth in any one of items 1 to 5 is adhered to a polarizer with active energy ray curable adhesive agent.

7. A vertically alignment type liquid crystal display comprising the polarizing plate as set forth in 6 on at least one surface of a liquid crystal cell.

Advantageous Effects of Invention

According to the present invention, provided is a retardation film that, while maintaining a high retardation value, has increased durability such as moist heat resistance and can prevent the occurrence of color unevenness even if made in a size having a large area. Also provided are a polarizing plate and a liquid crystal display, which are excellent in durability such as moist heat resistance and can prevent the occurrence of display unevenness in the in-plane direction.

DESCRIPTION OF EMBODIMENTS

Figure 1:
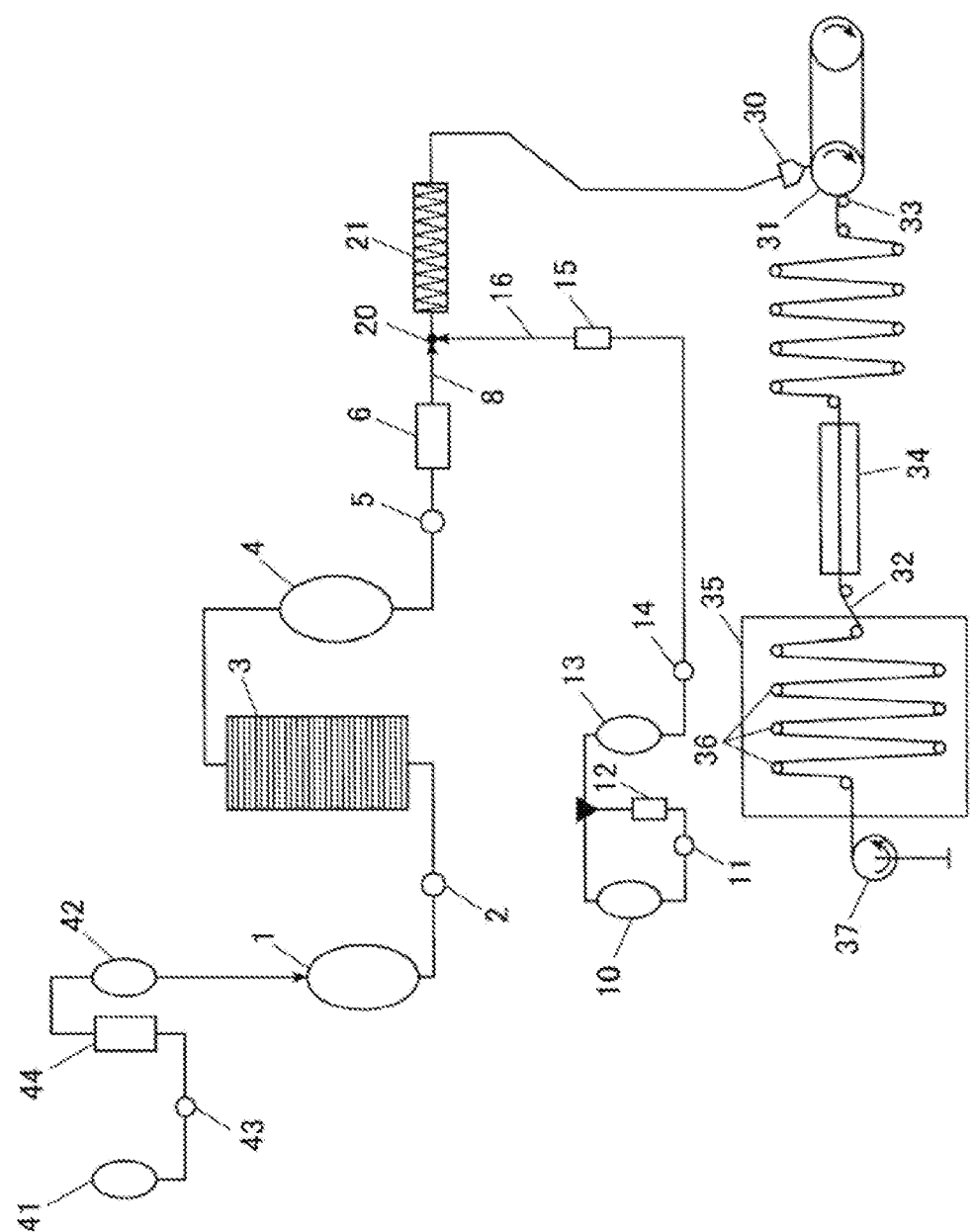
FIG. 1 is a schematic view showing a film production apparatus according to one embodiment of the present invention (step of preparing a dope, flow casting step and drying step in a method of producing a film by solution flow-casting).

According to one embodiment of the present invention, provided is a retardation film (hereinafter also simply referred to as a "film") containing a cellulose ester as the primary component, which has a film thickness of 15 μm or more and less than 40 μm, has a film thickness variation both in the widthwise direction and lengthwise direction of 0 to 4 μm, and satisfies an Rt humidity fluctuation represented by the formula (1) described below of 1% to 12%.

Rt humidity fluctuation=(ΔRt value, a difference of retardation Rt(590) values in the thickness direction represented by the following formula (ii) measured at a wavelength of 590 nm after the film has been left to stand for 5 hours in each of a 23° C., 20% relative humidity environment and a 23° C., 80% relative humidity environment)/(Rt(590) value measured after the film has been left to stand for 5 hours in a 23° C., 55% relative humidity environment)×100: Formula (1)

$$Rt(590)=\{(n_x+n_y)/2-n_z\}\times d \quad \text{Formula (ii)}$$

(wherein $n_x$ represents a refractive index in the slow axis direction in the film plane, $n_y$ represents a refractive index in the direction perpendicular to the slow axis in the film plane, $n_z$ represents a refractive index in the thickness direction of the film, and d represents a film thickness (nm), respectively).

[Retardation Film]

The retardation film according to the present embodiment is characterized by having a film thickness of 15 μm or more and less than 40 μm, having a film thickness variation of 0 to 4 μm both in the widthwise direction and lengthwise direction, and satisfying an Rt humidity fluctuation represented by the formula (1) described below of 1% to 12%.

In the present invention, the "retardation film" refers to a film having different refractive indices in the X axis direction and the Y axis direction, which is an optical compensation film magnifying the viewing angle. The "retardation film" is preferably a film satisfying the following conditions 1 and 2 as a retardation value. Such a film has a property of expressing a high retardation value and is preferably used for magnification of the viewing angle of a vertically alignment type liquid crystal display.

Condition 1: An in-plane retardation value Ro (590) expressed by the following formula (i), which was measured at a wavelength of 590 nm under a temperature 23° C., 55% relative humidity environment is within the range from 30 to 150 nm.

$$Ro(590)=(n_x-n_y)\times d \quad \text{Formula (i):}$$

Condition 2: A retardation value Rt(590) in the thickness direction expressed by the following formula (ii), which was measured at a wavelength of 590 nm under a temperature 23° C., 55% relative humidity environment is within the range from 70 to 300 nm.

$$Rt(590)=\{(n_x+n_y)/2-n_z\}\times d \quad \text{Formula (ii):}$$

(wherein $n_x$ represents a refractive index in the slow axis direction in the film plane, $n_y$ represents a refractive index in the direction perpendicular to the slow axis in the film plane, $n_z$ represents a refractive index in the thickness direction of the film, and d represents a film thickness (nm), respectively).

These retardation values can be measured using an automatic birefringence analyzer, KOBRA-21ADH (Oji Scientific Instruments).

A desired retardation can be adjusted by controlling a draw ratio in film production, an adding amount of a retardation increasing agent, a kind and a substitution degree of an acyl group in a cellulose ester, a film thickness, and the like.

The retardation film of the present embodiment satisfies an Rt humidity fluctuation expressed by the following formula (1) of 1% to 12%. A smaller value of the Rt humidity fluctuation described below means that the retardation film is stable to humidity fluctuation and, from such a viewpoint, the value of the Rt humidity fluctuation is 12% or less. On the other hand, when the Rt humidity fluctuation is less than 1%, moisture permeability of a retardation film is too small and water slants to a protecting film and a polarizer to thus apply load. Therefore, there is a possibility of causing problems such as the occurrence of peeling the protecting film and the polarizer and turning the color tone of a display apparatus to red due to poor water drainage.

Formula (1): Rt humidity fluctuation=($\Delta Rt$ value, a difference of retardation $Rt$(590) values in the thickness direction represented by the above described formula (ii) measured at a wavelength of 590 nm after the film has been left to stand for 5 hours in each of a 23° C., 20% relative humidity environment and a 23° C., 80% relative humidity environment)/($Rt$(590) value measured after the film has been left to stand for 5 hours in a 23° C., 55% relative humidity environment)×100

$$\Delta Rt = |Rt_{20\%}(590) - Rt_{80\%}(590)|$$

A retardation film satisfying the above described range has small fluctuation in a retardation value in the thickness direction of the film due to humidity fluctuation, and a polarizing plate and a liquid crystal display (hereinbelow, also simply referred to as a "display apparatus"), which have the film and are excellent in moist heat resistance, can be provided.

In order to further reduce color unevenness caused by fluctuation in phase differences due to humidity of the film, an Rt humidity fluctuation is preferably 1 to 10%, and more preferably 1 to 8%.

The above described Rt humidity fluctuation can be controlled within the desired range by adjusting a kind and a substitution degree of an acyl group in a cellulose ester, a kind and an adding amount of a retardation increasing agent, a kind and an adding amount of a plasticizer, and the like.

The film thickness of the retardation film according to the present embodiment is 15 µm or more and less than 40 lam. When the film thickness is less than 15 µm, homogeneous film formation is difficult and there is a possibility of occurring color unevenness if made in a size having a large area. In addition, sufficient phase difference could not be obtained. On the other hand, when the film thickness is 40 µm or more, an absolute value of absorbed water content is increased and there is a possibility of occurring color unevenness when used in a display apparatus. The film thickness is preferably within the range from 20 to 35 µm, and more preferably from 25 to 30 µm from the viewpoints of homogeneous film formation and an Rt humidity fluctuation.

The above described film thickness can be controlled within the desired range by adjusting thicknesses of a dope and a molten product flow-cast in film formation and/or stretching conditions.

In addition, the retardation film according to the present embodiment has a film thickness variation of 0 to 4 µm both in the widthwise direction and the lengthwise direction. In such a case, variation in phase differences in the film plane is suppressed even when the film has a large area, and color unevenness can be thus prevented. In order to further suppress variation in phase differences, a film thickness variation is preferably from 0 to 2.5 µm, and more preferably from 0 to 1.5 µm.

Meanwhile, the film thickness of the retardation film can be measured by using a film thickness meter such as a micrometer. Specifically, film thicknesses (µm) are measured at 100 or more points with an interval of 10 mm in the film widthwise direction, and the average value of these thicknesses is defined to be a film thickness (µm). In addition, a difference between the maximum value and the minimum value of the film thicknesses is defined to be a film thickness variation (µm).

The above described film thickness variation can be controlled within the desired range by adjusting a kind and a substitution degree of an acyl group in a cellulose ester, a kind and an adding amount of a retardation increasing agent, and a kind and an adding amount of a plasticizer. In particular, by setting a kind and a substitution degree of an acyl group in a cellulose ester within a predetermined range, a flow casting property and a stretching property in film formation can be controlled, which makes it possible to have a homogeneous film thickness.

In general, examples of a method of expressing a phase difference of a film include methods such as (1) expressing a phase difference with a cellulose ester (cellulose acetate); and (2) expressing a phase difference by adding a retardation increasing agent. In the former case, Rt is fluctuated due to humidity because cellulose has moisture permeability. On the other hand, the latter case is preferable since Rt is hardly fluctuated by humidity. Furthermore, since a phase difference expression property is improved by adding an increasing agent, the film can be made thin. However, a too large adding amount of an increasing agent is not preferable since there is a possibility of deteriorating a haze.

Plasticity is imparted to the film by adding a plasticizer and a stress is easily applied to the entire film in stretching to thus make a film thickness variation small (become preferable). Furthermore, since the inside of the film becomes hydrophobic to keep water out, an Rt humidity fluctuation is reduced. However, a too large amount of a plasticizer is not preferable because there is a possibility of deteriorating a haze.

Since the smaller the film thickness is, the more the entire water content decreases, an Rt humidity fluctuation is reduced. However, when the film thickness is too thin, homogeneous film formation is difficult and a film thickness variation is increased (become worse).

The smaller a substitution degree of an acyl group in a cellulose ester is, the more the phase difference expression property is improved, which thus makes it possible to make the film thin. On the other hand, a too small substitution degree of an acyl group is not preferable because there is a possibility of deteriorating durability.

On the other hand, since a phase difference is not expressed when the substitution degree of an acyl group in a cellulose ester is large, a draw ratio is required to increase in film formation, and it is hard to uniformly stretch the film at a high draw ratio and, therefore, the film thickness variation is increased (become worse). In addition, since an Rt humidity fluctuation is generated by coordinating a water molecule to a carbonyl group in cellulose, when a substitution degree of an acyl group is high, that is, when an amount of carbonyl groups in cellulose is large, the Rt humidity fluctuation tends to deteriorate.

In the present invention, (1) a film thickness, (2) a film thickness variation, and (3) an Rt humidity fluctuation can be adjusted within desired ranges by controlling (a) flow casting conditions of a dope and a molten product (film thickness), (b) stretching conditions, (c) a kind and a substitution degree of an acyl group in a cellulose ester, (d) a kind and an adding amount of a retardation increasing agent, (e) a kind and an adding amount of a plasticizer, based on the above described findings.

In addition, in the retardation film of the present embodiment, an L* being a water immersion part/L* being a non-immersion part measured by an EZ contrast is preferably from 1.05 or more and 1.80 or less. In such a case, a retardation film having suppressed color unevenness can be obtained even when the film has a size with a large area. The L* being a water immersion part/L* being a non-immersion part is more preferably from 1.05 or more and 1.55 or less, and further more preferably from 1.05 or more and 1.30 or less from the viewpoint of more suppressing color unevenness. Note that an evaluation of the L* being a water immersion part/L* being a non-immersion part is carried out in the following procedure.

(Evaluation of L* being Water Immersion Part/L* being Non-Immersion Part)

Using a commercially available VA type liquid crystal display (KDL 40EX720 manufactured by SONY), a polarizing plate in the upper side of a liquid crystal cell is peeled off, and a polarizing plate for the evaluation, which is constituted using the retardation film of the present embodiment, is attached with a baseless double-sided tape. The liquid crystal display is laid down to place on a board or the like, and Bemcot (manufactured by Asahi Kasei Fibers Corporation) is mounted on a part of the polarizing plate for the evaluation to immerse in water. Bemcot is covered with 100 μm of PET in order to avoid drying, a signal of a black state is input to a TV from a PC and the power of the TV is turned on and left for 24 hours (room temperature is set at 23° C. and panel temperature was set at 38° C.). After 24 hours, Bemcot is removed. L* being a part where Bemcot was present is assumed to be L* of a water immersion part and measured by an EZ Contrast (manufactured by ELDIM). L* being a part without Bemcot is assumed to be L* of a non-immersion part and measured by an EZ Contrast. Note that the measurement with an EZ Contrast is conducted by turning a TV to a black state in a color mode. In the conditions of water immersion, the power of the panel is turned on and Bemcot that is sufficiently perfused with water is attached to the polarizing plate and left for 24 hours in that state.

The retardation film according to the present embodiment is constituted by containing a cellulose ester as the primary component and, if needed, further containing (a) a retardation increasing agent, (b) a plasticizer, (c) a hydrogen bonding compound, and (d) other additives such as other optional components. Note that "the primary component" in the film of the present invention means a component that occupies 50% by mass or more of the entire film, preferably occupies 60% by mass or more, and more preferably occupies 70% by mass or more.

<Cellulose Ester>

In the specification, a cellulose ester means a cellulose acylate resin obtained by substituting a part or all of hydrogen atoms in the 2-position, 3-position and 6-position of hydroxyl groups (—OH) in a β-1,4 bonded glucose unit that constitutes cellulose with acyl groups.

A cellulose ester contained in the film of the present embodiment is not particularly limited and is preferably a linear or branched carboxylic acid ester having about 2 to 22 carbon atoms. A carboxylic acid that constitutes the ester may be an aliphatic carboxylic acid, may form a ring, or may be an aromatic carboxylic acid. For example, a cellulose ester in which a hydrogen atom in a hydroxyl group moiety in cellulose is substituted with an acyl group having 2 to 22 carbon atoms such as an acetyl group, a propionyl group, a butyryl group, an isobutyryl group, a valeryl group, a pivaloyl group, a hexanoyl group, an octanoyl group, a lauroyl group, and a stearoyl group. A carboxylic acid (acyl group) constituting an ester may have a substituent. A carboxylic acid constituting an ester is preferably a lower fatty acid having particularly 6 or less carbon atoms, and more preferably a lower fatty acid having 3 or less carbon atoms. Note that an acyl group in a cellulose ester may be used in a single kind or may be used in a combination of plural kinds.

Specific examples of a preferable cellulose ester include a mixed fatty acid ester of cellulose bound to a propionate group or a butyrate group in addition to an acetyl group such as cellulose acetate propionate (CAP), cellulose acetate butyrate, cellulose acetate propionate butyrate, other than cellulose acetate (DAC, TAC). These cellulose esters may be used in a single kind or may be used in combination of plural kinds.

(Kind and Substitution Degree of Acyl Groups)

A cellulose ester preferably has a total substitution degree from 2.1 to 2.5. By adjusting the substitution degree within the range, uniformity of film thickness could be improved as well as suppressing environmental fluctuation (particularly Rth fluctuation due to humidity). The substitution degree is more preferably from 2.15 to 2.35 from the viewpoints of improving a flow casting property and a stretching property in film formation and more improving uniformity of film thickness.

More specifically, a cellulose ester satisfies both of the formulas (a) and (b) described below. In the formulas, X represents a substitution degree of acetyl groups, and Y represents a substitution degree of propionyl groups or butyryl groups or a substitution degree of a mixed material thereof.

$$2.1 \geq X+Y \geq 2.5 \qquad \text{Formula (a)}$$

$$0 \leq Y \leq 1.5 \qquad \text{Formula (b)}$$

A cellulose ester is preferably cellulose acetate (Y=0), more preferably cellulose acetate propionate (CAP) (Y; propionyl group, Y>0), and more preferably cellulose acetate in which Y=0 from the viewpoint of reducing a film thickness variation. A particularly preferably used cellulose acetate is cellulose diacetate (DAC) in which $2.1 \leq X \leq 2.5$ (more preferably $2.15 \leq X \leq 2.35$) from the viewpoint that a phase difference expression property, an Rt humidity fluctuation and a film thickness variation are within desired ranges. In the case of Y>0, a particularly preferably used cellulose acetate propionate (CAP) satisfies $0.95 \leq X \leq 2.25$, $0.1 \leq Y \leq 1.2$, $2.15 \leq X+Y \leq 2.35$.

By using the above described cellulose acetate or cellulose acetate propionate, a retardation film which is excellent in retardation and also excellent in mechanical strength and environmental fluctuation can be obtained.

Note that, a substitution degree of acyl groups indicates an average number of acyl groups in one glucose unit and shows how many hydrogen atoms in the 2-position, 3-position and 6-position hydroxyl groups in one glucose unit are substituted with acyl groups. Therefore, the maximum substitution degree is 3.0, which means that hydrogen atoms in the 2-position, 3-position and 6-position hydroxyl groups are all substituted with acyl groups in this case. These acyl groups may be averagely substituted to the 2-position, 3-position and 6-position in a glucose unit, or may be substituted with distribution. The substitution degree can be found by the method prescribed in ASTM-D817-96.

In order to obtain desired optical characteristics, cellulose acetates having different substitution degrees may be used in mixture. A mixing ratio of different cellulose acetates is not particularly limited.

A number average molecular weight (Mn) of a cellulose ester is preferably within the range from $6 \times 10^4$ to $3 \times 10^5$, and more preferably within the range from $7 \times 10^4$ to $2 \times 10^5$ since mechanical strength of an obtained film is enhanced. The number average molecular weight Mn of a cellulose ester is calculated by a measurement using gel permeation chromatography (GPC) according to the measurement conditions described below.

Solvent: methylene chloride
Columns: Shodex K806, K805, K803G (3 columns manufactured by Showa Denko K.K. are connected to be used)
Column temperature: 25° C.
Sample concentration: 0.1% by mass
Detector: RI Model 504 (manufactured by GL SCIENCES INC.)
Pump: L6000 (manufactured by Hitachi, Ltd.)
Flow rate: 1.0 ml/min
Calibration curve: Standard polystyrene STK standard polystyrene (manufactured by TOSOH CORPORATION), calibration curves from 13 samples having Mw=1000000 to 500 are used. 13 samples should be spaced approximately equally.

Examples of raw material cellulose of a cellulose ester are not particularly limited and include cotton linter, wood pulp and kenaf. Each of cellulose esters obtained from these raw materials can be used in mixture at any ratio.

A cellulose ester such as cellulose acetate and cellulose acetate propionate can be produced by a known method. In general, a raw material cellulose, a predetermined organic acid (such as acetic acid and propionic acid), an acid anhydride (such as acetic anhydride and propionic anhydride), and a catalyst (such as sulfuric acid) are mixed to esterify cellulose, and the reaction proceeds until a triester of cellulose is produced. Three hydroxy groups (hydroxyl groups) in a glucose unit are substituted with an acyl acid of an organic acid in a triester. When two types of organic acids are simultaneously used, a mixed ester type cellulose ester, for example, cellulose acetate propionate and cellulose acetate butyrate, can be produced. Subsequently, a cellulose ester resin having a desired acyl substitution degree is synthesized by hydrolyzing a triester of cellulose. Then, a cellulose ester resin is completed after undergoing steps such as filtration, precipitation, washing with water, dehydration, and drying. Specifically, a cellulose ester resin can be synthesized by reference to the method described in JP H10-45804.

Examples of commercially available products include L20, L30, L40 and L50 manufactured by Daicel Corporation, and Ca398-3, Ca398-6, Ca398-10, Ca398-30 and Ca394-605 manufactured by Eastman Chemical Company, and the like.

<Other Additives>
(a) Retardation Increasing Agent
The film of the present embodiment preferably contains at least one retardation increasing agent for the purpose of controlling retardation.

A retardation increasing agent (also called a retardation expression agent) refers to a compound having a function to increase a retardation value of a film. Specifically, a retardation increasing agent refers to a compound having a function to show a 1.1 times or larger retardation value Rt(590) at a measured wavelength of 590 nm in the thickness direction of a film containing 3 parts by mass of the compound with respect to 100 parts by mass of a cellulose ester as compared to a retardation value Rt(590) of a film without addition.

A retardation increasing agent contained in the film of the present embodiment is not particularly limited. In one preferable embodiment, a retardation increasing agent includes a compound expressed by the general formula (1) described below. As described above, by using a compound obtained by introducing a substituent of —OCO— as a connecting group into a phenyl group substituted to a specific position for a benzooxazinone skeleton, interaction with a cellulose ester is improved, compatibility and an orientation property are enhanced, and a retardation film having a high retardation expression property can be thus obtained. Furthermore, since a compound expressed by the general formula (1) forms a hydrogen bond with a cellulose ester, excellent moist heat resistance is exhibited by suppressing coordination of a water molecule. Therefore, the film can be effectively improved in color unevenness of a liquid crystal display due to humidity fluctuation.

(Compound Expressed by the General Formula (1))

[Chem. 1]

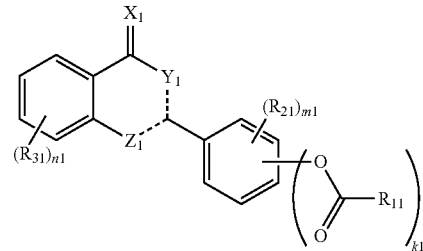

General Formula (1)

(In the general formula (1), $X_1$ represents an oxygen atom or a sulfur atom, $Y_1$ represents an oxygen atom, a sulfur atom, a nitrogen atom or $NR_{41}$, and $Z_1$ represents an oxygen atom, a nitrogen atom or a sulfur atom. $R_{11}$, $R_{21}$ and $R_{31}$ each represent a substituent. $R_{41}$ represents a hydrogen atom or a substituent. k1 represents an integer from 1 to 5. m1 represents an integer from 0 to 4. n1 represents an integer from 0 to 4. A dashed line represents a single bond (—) or a double bond (═).)

A retardation increasing agent preferably contains a compound expressed by the general formula (2) described below from the viewpoint of compatibility, more preferably contains a compound expressed by the general formula (3) described below from the viewpoint of light resistance, and particularly preferably contains a compound expressed by the general formula (4) described below from the viewpoint of a phase difference expression property.

[Chem. 2]

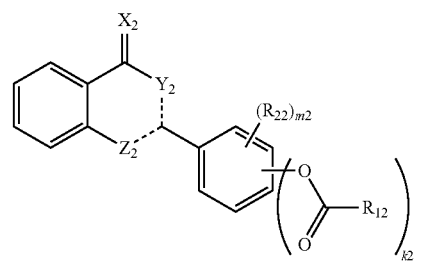

General Formula (2)

(In the general formula (2), $X_2$ represents an oxygen atom or a sulfur atom, $Y_2$ represents an oxygen atom, a sulfur atom, a nitrogen atom or $NR_{42}$, $Z_2$ represents an oxygen atom, a nitrogen atom or a sulfur atom. $R_{12}$ and $R_{22}$ each represent a substituent. $R_{42}$ represents a hydrogen atom or a substituent. k2 represents an integer from 1 to 5. m2 represents an integer from 0 to 4. n2 represents an integer from 0 to 4. A dashed line represents a single bond (—) or a double bond (=).)

[Chem. 3]

General Formula (3)

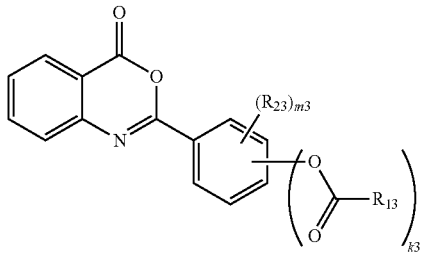

(In the general formula (3), $R_{13}$ and $R_{23}$ each represent a substituent. k3 represents an integer from 1 to 5. m3 represents an integer from 0 to 4.)

[Chem. 4]

General Formula (4)

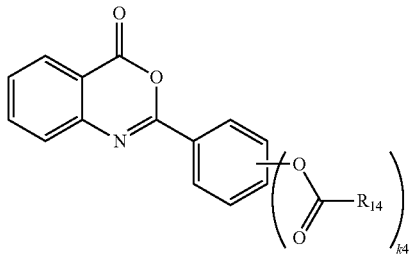

(In the general formula (4), $R_{14}$ represents a substituent. k4 represents an integer from 1 to 5.)

In the general formula (1) described above, $R_{11}$ represents a substituent. Examples of the substituent expressed by $R_{11}$ include alkyl groups having 1 to 12 carbon atoms (for example, methyl group, ethyl group, propyl group, isopropyl group, n-butyl group, t-butyl group, pentyl group, hexyl group, 1-ethylpentyl group, octyl group, 2-ethylhexyl group, nonyl group and dodecyl group), alkyl fluoride groups having 1 to carbon atoms (for example, trifluoromethyl group), cycloalkyl groups having 3 to 12 carbon atoms (for example, cyclopropyl group, cyclopentyl group, cyclohexyl group and adamantyl group), aryl groups having 6 to 12 carbon atoms (for example, phenyl group and naphthyl group), alkyloxy groups (alkoxy groups) having 1 to 12 carbon atoms (for example, methoxy group, ethoxy group, propoxy group, isopropoxy group, isobutoxy group, t-butoxy group, isopentyloxy group and 2-ethylhexyloxy group), aryloxy groups having 6 to 12 carbon atoms (for example, phenoxy group and naphthoxy group), alkylamino groups having 1 to 12 carbon atoms (for example, methylamino group, ethylamino group, dimethylamino group, butylamino group, cyclopentylamino group, 2-ethylhexylamino group and dodecylamino group), arylamino groups having 6 to 12 carbon atoms (for example, phenylamino group), alkylthio groups having 1 to 12 carbon atoms (for example, methylthio group, ethylthio group, 2-ethylhexylthio group and cyclohexylthio group), arylthio groups having 6 to 12 carbon atoms (for example, phenylthio group), heterocyclic groups (heteroaryl groups) having 1 to 12 carbon atoms (for example, pyridyl group, pyrimidyl group, oxazolyl group, thiazolyl group, ozadiazolyl group, thiadiazolyl group and imidazolyl group), alkenyl groups having 2 to 12 carbon atoms (for example, vinyl group, 2-propenyl group, 3-butenyl group, 1-methyl-2-propenyl group, 3-pentenyl group, 1-methyl-3-butenyl group, 4-hexenyl group, cyclohexenyl group and styryl group), alkynyl groups having 1 to 12 carbon atoms (for example, propargyl group), alkylsulfonyl groups having 2 to 12 carbon atoms (for example, methylsulfonyl group and ethylsulfonyl group), and amino group.

A substituent expressed by $R_{11}$ may be further substituted plurally with other substituents such as alkyl groups (for example, methyl group, ethyl group, propyl group, isopropyl group, t-butyl group, pentyl group, hexyl group, octyl group and dodecyl group), alkyl fluoride groups (for example, trifluoromethyl group), cycloalkyl groups (for example, cyclopropyl group, cyclopentyl group, cyclohexyl group and adamantyl group), aryl groups (for example, phenyl group and naphthyl group), heterocyclic groups (heteroaryl groups) (for example, pyridyl group, pyrimidyl group, oxazolyl group, thiazolyl group, oxadiazolyl group, thiadiazolyl group and imidazolyl group), acylamino groups (for example, acetylamino group and benzoylamino group), alkylthio groups (for example, methylthio group and ethylthio group), arylthio groups (for example, phenylthio group and naphthylthio group), alkenyl groups (for example, vinyl group, 2-propenyl group, 3-butenyl group, 1-methyl-2-propenyl group, 3-pentenyl group, 1-methyl-3-butenyl group, 4-hexenyl group, cyclohexenyl group and styryl group), halogen atoms (for example, fluorine atom, chlorine atom, bromine atom and iodine atom), alkynyl groups (for example, propargyl group), alkylsulfonyl groups (for example, methylsulfonyl group and ethyl sulfonyl group), arylsulfonyl groups (for example, phenylsulfonyl group and naphthylsulfonyl group), alkylsulfinyl group (for example, methylsulfinyl group), arylsulfinyl groups (for example, phenylsulfinyl group), phosphono group, acyl groups (for example, acetyl group, pivaloyl group and benzoyl group), carbamoyl groups (for example, aminocarbonyl group, methylaminocarbonyl group, dimethylaminocarbonyl group, butylaminocarbonyl group, cyclohexylaminocarbonyl group and phenylaminocarbonyl group), sulfamoyl groups (for example, aminosulfonyl group, methylaminosulfonyl group, dimethylaminosulfonyl group, butylaminosulfonyl group, hexylaminosulfonyl group, cyclohexylaminosulfonyl group, octylaminosulfonyl group, dodecylaminosulfonyl group, phenylaminosulfonyl group, naphthylaminosulfonyl group and 2-pyridylaminosulfonyl group), sulfoneamide groups (for example, methanesulfoneamide group and benzenesulfoneamide group), cyano group, alkyloxy groups (for example, methoxy group, ethoxy group and propoxy group), aryloxy groups (for example, phenoxy group and naphthyloxy group), siloxy group, acyloxy groups (for example, acetyloxy group and benzolyoxy group), sulfonic acid groups or salts thereof, aminocarbonyloxy group, amino groups (for example, amino group, ethylamino group, dimethylamino group, butylamino group, cyclopentylamino group, 2-ethylhexylamino group and dodecylamino group), anilino groups (for example, phenylamino group, chlorophenylamino group, toluidino group, anicidino group, naphthylamino group and 2-pyridylamino group), imide group, ureido groups (for example, methylureido group, ethylureido group, pentylureido group, cyclohexylureido group, octylureido group, dodecylureido group, phenylureido group, naphthylureido group and 2-pyridylaminoureido group), alkoxycarbonylamino groups (for example, methoxycarbonylamino group and phenoxycarbonylamino group), alkoxycarbonyl groups (for example, methoxycarbonyl group, ethoxycarbonyl group and phenoxycarbonyl), aryloxycarbonyl groups (for example, phenoxycarbonyl group), carbamate groups (for example, methyl carbamate group and phenyl carbamate group), alkyloxyphenyl groups (for example, methoxyphenyl group), acyloxyphenyl groups (for example, acetyloxyphenyl group), thioureido group, carboxy group, salts of carboxylic acids, hydroxy groups, mercapto groups, and nitro groups, or may form a ring by connecting adjacent substituents. Note that a substituent expressed by $R_{11}$ is never substituted with the same substituent in the above description. That is, an alkyl group to be substituted is not substituted with an alkyl group.

Preferable examples of $R_{11}$ include an alkyl group having 1 to 12 carbon atoms, an cycloalkyl group having 3 to 12 carbon atoms, an alkyloxy group having 1 to 12 carbon atoms, an aryl group having 6 to 12 carbon atoms, an aryloxy group having 6 to 12 carbon atoms, an amino group, an alkylamino group having 1 to 12 carbon atoms, an arylamino group having 6 to 12 carbon atoms, and an alkylthio group having 1 to 12 carbon atoms; $R_{11}$ is more preferably an alkyl group having 1 to 12 carbon atoms, a cycloalkyl group having 3 to 12 carbon atoms, an alkyloxy group having 1 to 12 carbon atoms, an aryl group having 6 to 12 carbon atoms, an aryloxy group having 6 to 12 carbon atoms and an alkylthio group having 1 to 12 carbon atoms; further more preferably an alkyl group having 1 to 12 carbon atoms, an alkyloxy group having 1 to 12 carbon atoms, an aryl group having 6 to 12 carbon atoms, an aryloxy group having 6 to 12 carbon atoms; particularly preferably an alkyl group having 1 to 12 carbon atoms and an alkyloxy group having 1 to 12 carbon atoms; and the most preferably an alkyl group having 1 to 12 carbon atoms. In particular, when $R_{11}$ is an alkyl group, an alkyl group having 1 to 8 carbon atoms is preferable, and an alkyl group having 1 to 4 carbon atoms is more preferable. By using these substituents for $R_{11}$, compatibility of the compounds (cellulose ester and retardation increasing agent) is improved to form a film having a low inside haze and expressing a high retardation value.

In the general formula (1) described above, each of $R_{21}$ and $R_{31}$ represents a substituent. Examples of substituents expressed by $R_{21}$ and $R_{31}$ include alkyl groups having 1 to 12 carbon atoms (for example, methyl group, ethyl group, propyl group, isopropyl group, t-butyl group, pentyl group, 1-ethylpentyl group, hexyl group, octyl group, 2-ethylhexyl group, nonyl group and dodecyl group), alkyl fluoride groups having 1 to 12 carbon atoms (for example, trifluoromethyl group), cycloalkyl groups having 3 to 12 carbon atoms (for example, cyclopropyl group, cyclopentyl group, cyclohexyl group and adamantyl group), aryl groups having 6 to 12 carbon atoms (for example, phenyl group and naphthyl group), heterocyclic groups (heteroaryl groups) having 1 to 12 carbon atoms (for example, pyridyl group, pyrimidyl group, oxazolyl group, thiazolyl group, oxadiazolyl group, thiadiazolyl group and imidazolyl group), acylamino groups having 1 to 12 carbon atoms (for example, acetylamino group and benzoylamino group), alkylthio groups having 1 to 12 carbon atoms (for example, methylthio group, ethylthio group, 2-ethylhexylthio group and cyclohexylthio group), arylthio groups having 6 to 12 carbon atoms (for example, phenylthio group and naphthylthio group), alkenyl groups having 2 to 12 carbon atoms (for example, vinyl group, 2-propenyl group, 3-butenyl group, 1-methyl-2-propenyl group, 3-pentenyl group, 1-methyl-3-butenyl group, 4-hexenyl group, cyclohexenyl group and styryl group), halogen atoms (for example, fluorine atom, chlorine atom, bromine atom and iodine atom), alkynyl groups having 2 to 12 carbon atoms (for example, propargyl group), alkylsulfonyl groups having 1 to 12 carbon atoms (for example, methylsulfonyl group and ethylsulfonyl group), arylsulfonyl groups having 6 to 12 carbon atoms (for example, phenylsulfonyl group and naphthylsulfonyl group), alkylsulfonyloxy groups having 1 to 12 carbon atoms (for example, methylsulfonyloxy group and ethylsulfonyloxy group), arylsulfonyl groups having 6 to 12 carbon atoms (for example, phenylsulfonyloxy group and naphthylsulfonyloxy group), alkylsulfinyl groups having 1 to 12 carbon atoms (for example, methylsulfinyl group), arylsulfinyl groups having 6 to 12 carbon atoms (for example, phenylsulfinyl group), phosphono groups, acyl groups having 1 to 12 carbon atoms (for example, acetyl group, pivaloyl group and benzoyl group), carbamoyl groups (for example, aminocarbonyl group, methylaminocarbonyl group, dimethylaminocarbonyl group, ethylaminocarbonyl group, butylaminocarbonyl group, cyclohexylaminocarbonyl group and phenylaminocarbonyl group), sulfamoyl groups (for example, aminosulfonyl group, methylaminosulfonyl group, dimethylaminosulfonyl group, butylaminosulfonyl group, hexylaminosulfonyl group, cyclohexylaminosulfonyl group, octylaminosulfonyl group, dodecylaminosulfonyl group, phenylaminosulfonyl group, naphthylaminosulfonyl group and 2-pyridylaminosulfonyl group), sulfoneamide groups (for example, methane sulfoneamide group and benzene sulfoneamide group), cyano groups, alkyloxy groups having 1 to 12 carbon atoms (for example, methoxy group, ethoxy group, propoxy group, isopropoxy group, isobutoxy group, t-butoxy group, isopentyloxy group and 2-ethylhexyloxy), aryloxy groups having 6 to 12 carbon atoms (for example, phenoxy group and naphthyloxy group), siloxy groups, acyloxy groups having 1 to 12 carbon atoms (for example, acetyloxy group and benzoyloxy group), sulfonic acid groups or salts thereof, aminocarbonyloxy groups, amino groups, alkylamino groups having 1 to 12 carbon atoms (for example, methylamino group, ethyl amino group, dimethylamino group, butylamino group, cyclopentylamino group, 2-ethylhexylamino group and dodecylamino group), anilino groups (for example, phenylamino group, chlorophenylamino group, toluidino group, anicidino group, naphthylamino group and 2-pyridylamino group), imide groups, ureido groups (for example, methylureido group, ethylureido group, pentylureido group, cyclohexylureido group, octylureido group, dodecylureido group, phenylureido group, naphthylureido group and 2-pyridylaminoureido group), alkoxycarbonylamino groups having 2 to 12 carbon atoms (for example, methoxycarbonylamino group and phenoxycarbonylamino group), alkoxycarbonyl groups having 2 to 12 carbon atoms (for example, methoxycarbonyl group, ethoxycarbonyl group and phenoxycarbonyl), aryloxycarbonyl groups having 7 to 12 carbon atoms (for example, phenoxycarbonyl group), carbamate groups (for example, methyl carbamate group and phenyl carbamate group), alkyloxyphenyl groups having 7 to 12 carbon atoms (for example, methoxyphenyl group), acyloxyphenyl groups having 7 to 12 carbon atoms (for example, acetyloxyphenyl group), thioureido groups, carboxy groups, salts of carboxylic acid (a carboxy group may exist forming a salt with a cation such as sodium ion and potassium ion), hydroxy groups, mercapto groups, and nitro groups.

Substituents expressed by $R_{21}$ and $R_{31}$ in the general formula (1) may be further substituted plurally with the same groups or may form a ring by connecting adjacent substituents. As other substituents, groups exemplified as the other substituents in $R_{11}$ are used in the same manner. However, a substituent expressed by $R_{11}$ is never substituted with the same substituent in the above description. That is, an alkyl group to be substituted is not substituted with an alkyl group.

Preferable examples of $R_{21}$ include an alkyl group having 1 to 12 carbon atoms, a cycloalkyl group having 3 to 12 carbon atoms, an alkyloxy group having 1 to 12 carbon atoms, an aryl group having 6 to 12 carbon atoms, an aryloxy group having 6 to 12 carbon atoms, an acyl group having 1 to 12 carbon atoms, an alkoxycarbonyl group having 2 to 12 carbon atoms, an aryloxycarbonyl group having 7 to 12 carbon atoms, an amino group, an alkylamino group having 1 to 12 carbon atoms, and an alkylthio group having 1 to 12 carbon atoms, and a halogen atom; more preferable examples thereof include an alkyl group having 1 to 12 carbon atoms, a cycloalkyl group having 3 to 12 carbon atoms, an alkyloxy group having 1 to 12 carbon atoms, an aryl group having 6 to 12 carbon atoms, an aryloxy group having 6 to 12 carbon atoms, an acyl group having 1 to 12 carbon atoms, an alkoxycarbonyl group having 2 to 12 carbon atoms, an aryloxycarbonyl group having 7 to 12 carbon atoms, and a halogen atom; and particularly preferable examples thereof include an alkyl group having 1 to 12 carbon atoms, an alkyloxy group having 1 to 12 carbon atoms, an acyl group having 1 to 12 carbon atoms, and an alkoxycarbonyl group having 2 to 12 carbon atoms. By using these substituents for $R_{21}$, compatibility of the compounds (cellulose ester and retardation increasing agent) is improved to form a film having a low inside haze and suppressed bleed-out and expressing a high retardation value.

Preferable examples of $R_{31}$ include an alkyl group having 1 to 12 carbon atoms, a cycloalkyl group having 3 to 12 carbon atoms, an alkyloxy group having 1 to 12 carbon atoms, an aryl group having 6 to 12 carbon atoms, an aryloxy group having 6 to 12 carbon atoms, an acyl group having 1 to 12 carbon atoms, an acyloxy group having 1 to 12 carbon atoms, an alkoxycarbonyl group having 2 to 12 carbon atoms, an aryloxycarbonyl group having 7 to 12 carbon atoms, an amino group, an alkylamino group having 1 to 12 carbon atoms, an alkylthio group having 1 to 12 carbon atoms, an a halogen atom; more preferable examples thereof include an alkyl group having 1 to 12 carbon atoms, a cycloalkyl group having 3 to 12 carbon atoms, an alkyloxy group having 1 to 12 carbon atoms, an aryl group having 6 to 12 carbon atoms, an aryloxy group having 6 to 12 carbon atoms, an acyl group having 1 to 12 carbon atoms, an acyloxy group having 1 to 12 carbon atoms, an alkoxycarbonyl group having 2 to 12 carbon atoms, an aryloxycarbonyl group having 7 to 12 carbon atoms, an amino group, an alkylthio group having 1 to 12 carbon atoms and a halogen atom; and particularly preferable examples thereof include an alkyl group having 1 to 12 carbon atoms, an alkyloxy group having 1 to 12 carbon atoms, an aryl group having 6 to 12 carbon atoms, an aryloxy group having 6 to 12 carbon atoms, an acyl group having 1 to 12 carbon atoms, an acyloxy group having 1 to 12 carbon atoms, an alkoxy- carbonyl group having 2 to 12 carbon atoms and an aryloxycarbonyl group having 7 to 12 carbon atoms. By using these substituents for $R_{31}$, compatibility of the compounds (cellulose ester and retardation increasing agent) is improved to form a film having a low inside haze and suppressed bleed-out and expressing a high retardation value.

$R_{41}$ represents a hydrogen atom or a substituent, and as the substituent, the same groups for $R_{21}$ and $R_{31}$ are cited.

Preferable examples of $R_{41}$ include a hydrogen atom, an alkyl group having 1 to 12 carbon atoms, a cycloalkyl group having 3 to 12 carbon atoms, an aryl group having 6 to 12 carbon atoms, an acyl group having 1 to 12 carbon atoms, an alkoxycarbonyl group having 2 to 12 carbon atoms, and an aryloxycarbonyl group having 7 to 12 carbon atoms; more preferable examples thereof include a hydrogen atom, an alkyl group having 1 to 12 carbon atoms, a cycloalkyl group having 3 to 12 carbon atoms, an aryl group having 6 to 12 carbon atoms, and an acyl group having 1 to 12 carbon atoms; and particularly preferable examples thereof include an alkyl group having 1 to 12 carbon atoms, an aryl group having 6 to 12 carbon atoms, and an acyl group having 1 to 12 carbon atoms. By introducing these groups, compatibility of the compounds is improved to form a film having a low inside haze and suppressed bleed-out and expressing a high retardation.

In the general formula (1), k1 represents an integer from 1 to 5. The integer expressed by k1 is preferably within the range from 1 to 4, more preferably within the range from 1 to 3, and particularly preferably 1 from the viewpoints of a phase difference expression property and compatibility.

In the general formula (1), as a substitution position of replacing —OCO— in a benzene ring, when a bonding site with a benzooxadinone skeleton is assumed to be the 1-position, —OCO— is preferably substituted to the 3-position, 4-position and 5-position, and more preferably substituted to the 4-position. A high retardation is expressed by replacing to these positions.

m1 in the general formula (1) represents an integer from 0 to 4. The integer expressed by m1 is preferably within the range from 0 to 3, and particularly preferably 0 from the viewpoint of a phase difference expression property.

In the general formula (1), n1 represents an integer from 0 to 4. The integer expressed by n1 is preferably within the range from 0 to 3, more preferably 0 or 1, and particularly preferably 0 from the viewpoint of compatibility.

In the general formula (1), $X_1$ represents an oxygen atom or a sulfur atom. In particular, $X_1$ is preferably an oxygen atom from the viewpoint of light resistance.

In the general formula (1), $Y_1$ represents an oxygen atom (—O—), a sulfur atom (—S—), a nitrogen atom (—N═) or $NR_{41}$. In particular, $Y_1$ is preferably an oxygen atom, a nitrogen atom or $NR_{41}$, more preferably an oxygen atom or a nitrogen atom, and particularly preferably an oxygen atom from the viewpoint of light resistance.

In the general formula (1), $Z_1$ represents an oxygen atom (—O—), a nitrogen atom (—N═) or a sulfur atom (—S—). In particular, $Z_1$ is preferably an oxygen atom or a nitrogen atom, and particularly preferably a nitrogen atom from the viewpoint of light resistance.

Each of $X_2$, $Y_2$, $Z_2$, $R_{12}$, $R_{22}$, $R_{42}$, k2 and m2 in the general formula (2) is the same as each of $X_1$, $Y_1$, $Z_1$, $R_{11}$, $R_{21}$, $R_{41}$, k1 and m1 in the general formula (1).

Each of $R_{13}$, $R_{23}$, k3 and m3 in the general formula (3) is the same as each of $R_{11}$, $R_{21}$, k1 and m1 in the general formula (1).

Each of $R_{14}$ and k4 in the general formula (4) is the same as each of $R_{11}$ and k1 in the general formula (1).

Specific examples of compounds expressed by the above described general formulas (1) to (4) will be cited, but the present invention is not limited to the following specific examples at all.
[Chem. 5]
A-001
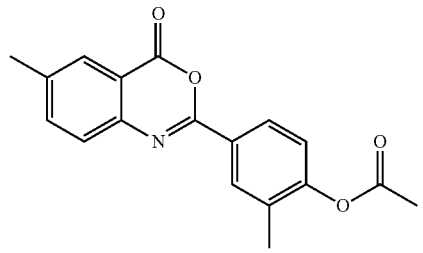
A-002
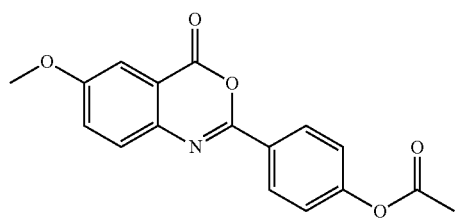
A-003
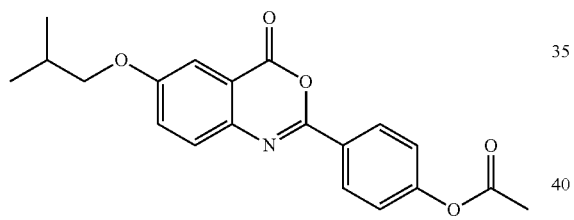
A-004
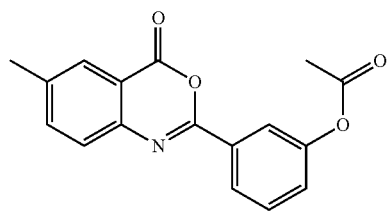
A-005
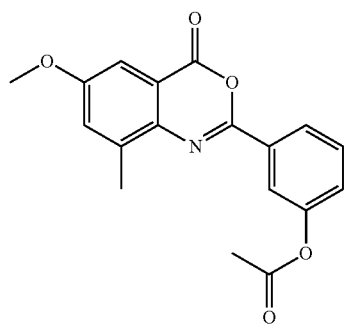
A-006
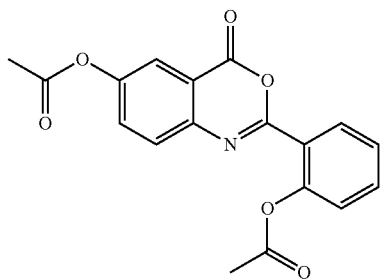
A-007
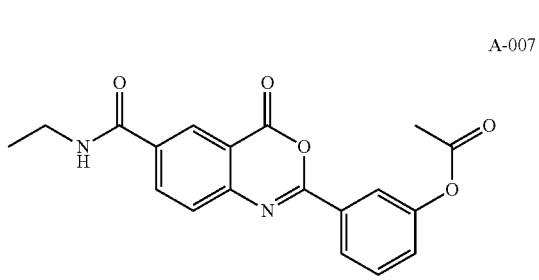
A-008
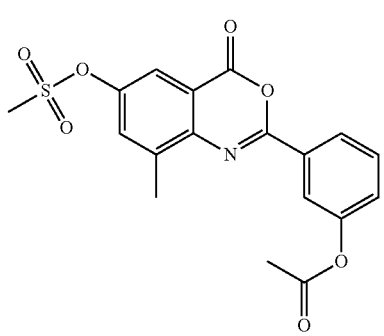
A-009
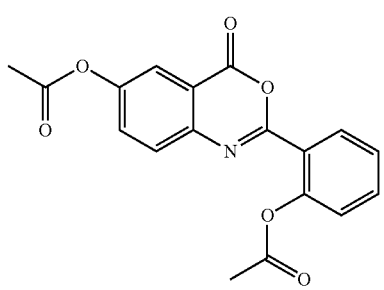
A-010
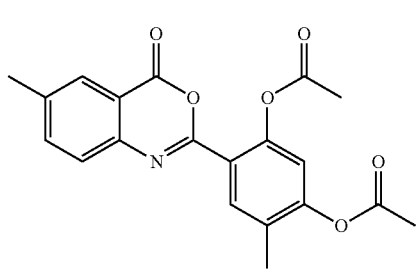

[Chem. 6]
A-011
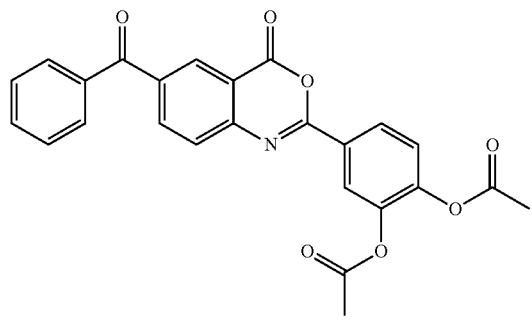
A-012
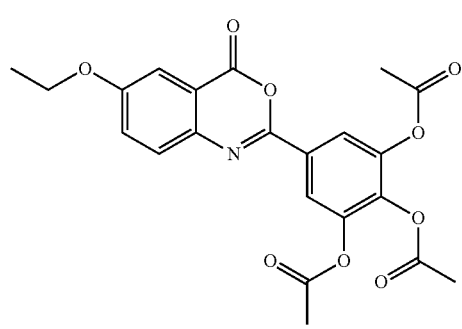
A-013
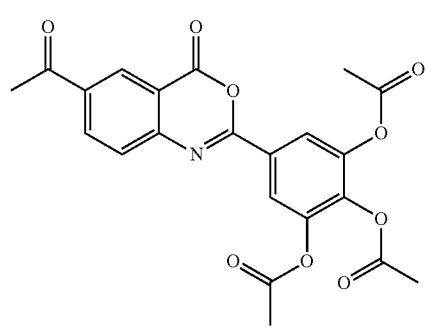
A-014
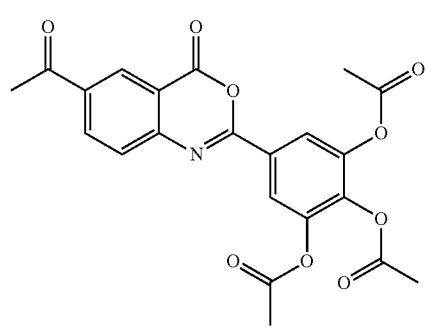
A-015
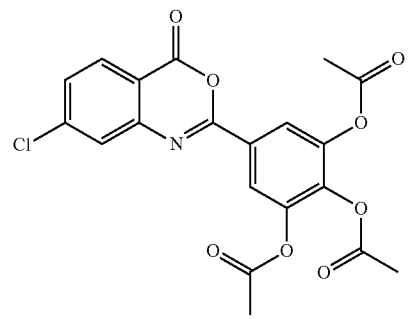
A-016
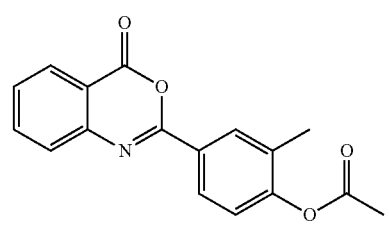
A-017
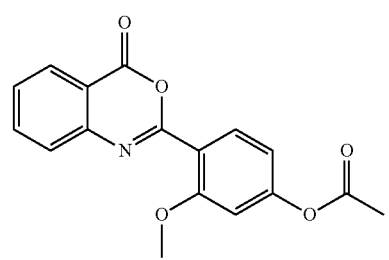
A-018
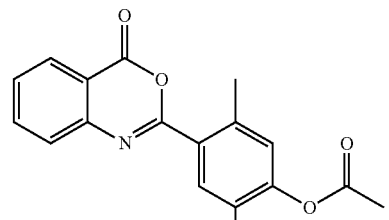
A-019
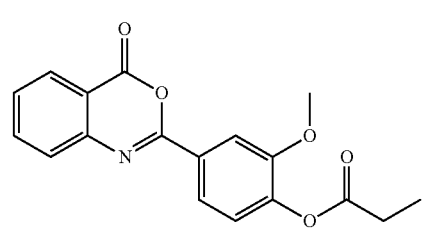
A-020
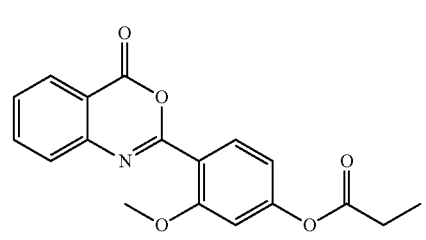

-continued
A-021
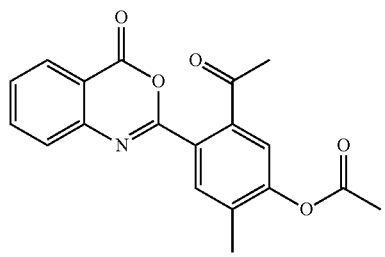
A-022
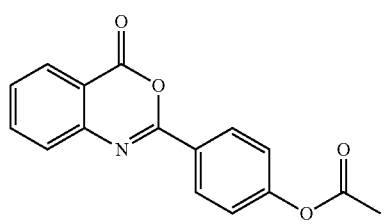
A-023
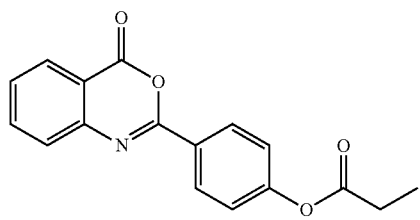
A-024
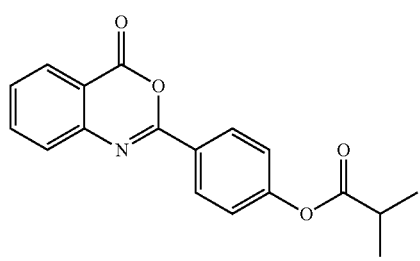
A-025
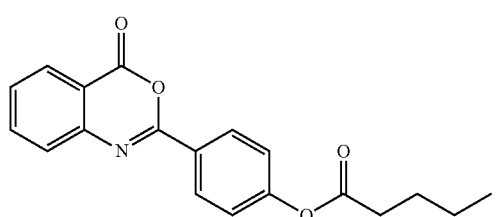
A-026
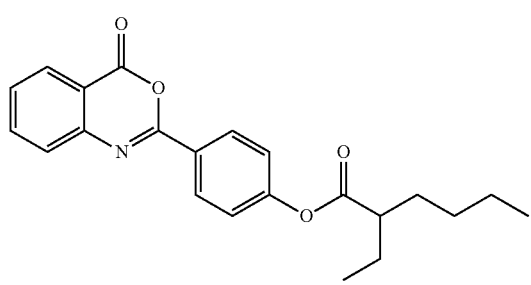
-continued
A-027
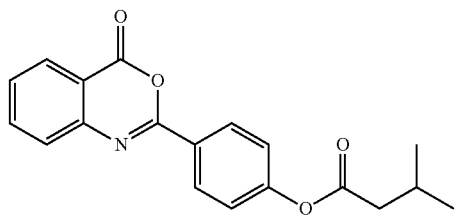
A-028
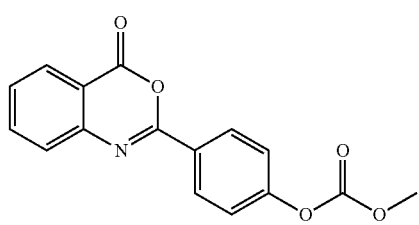
A-029
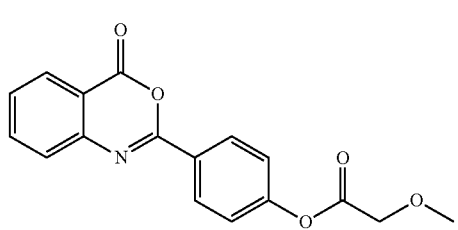
A-030
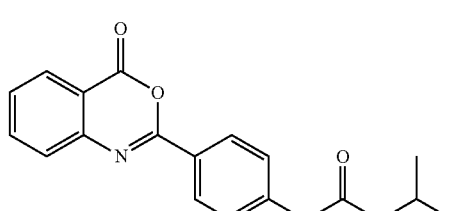
A-031
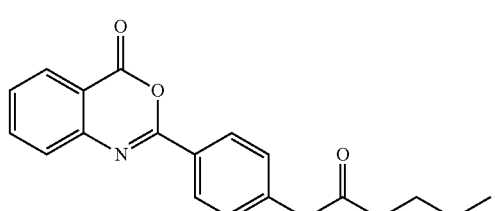
A-032
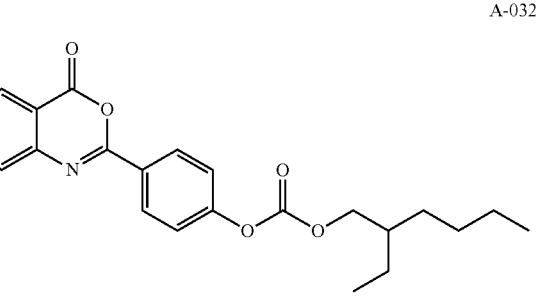

[Chem. 8]
A-033
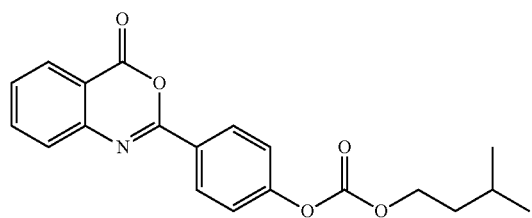
A-034
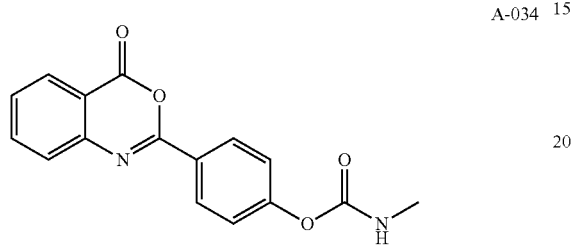
A-035
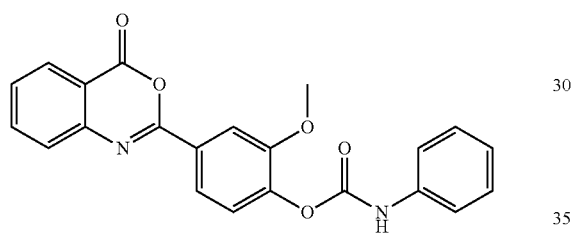
A-036
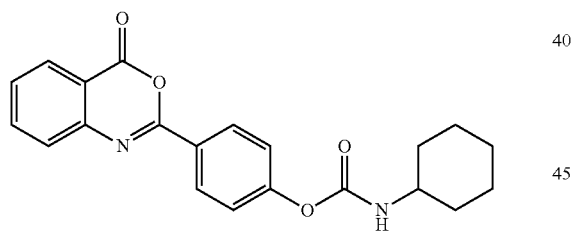
A-037
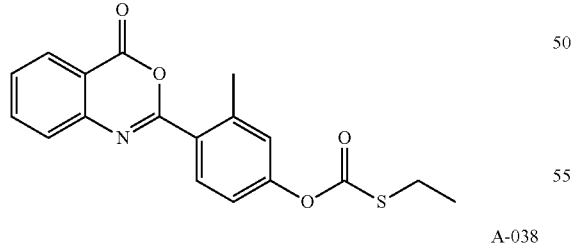
A-038
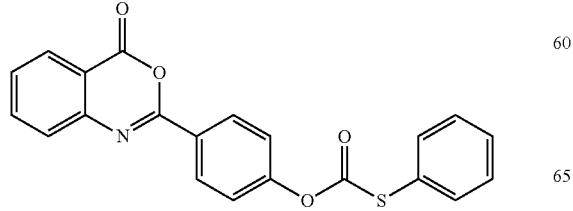
A-039
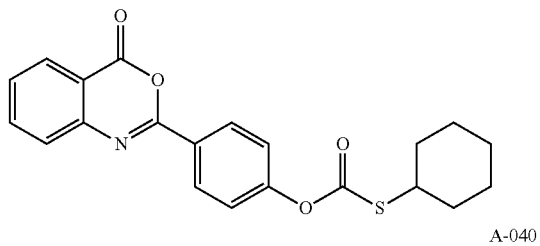
A-040
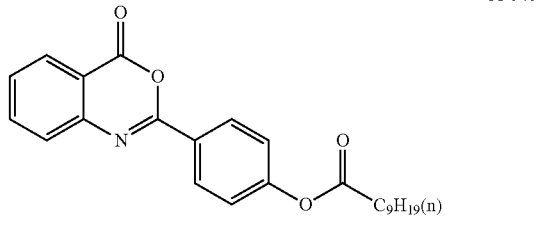
A-041
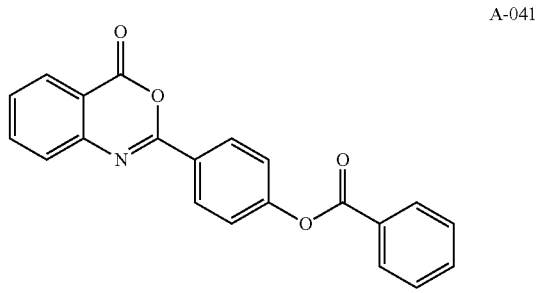
A-042
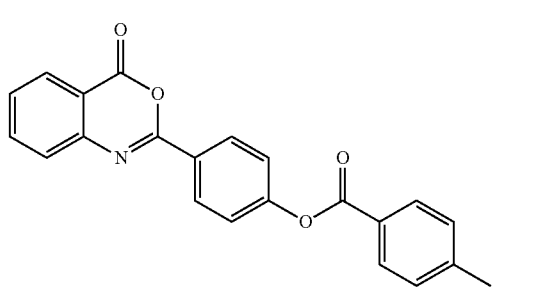
[Chem. 9]
A-043
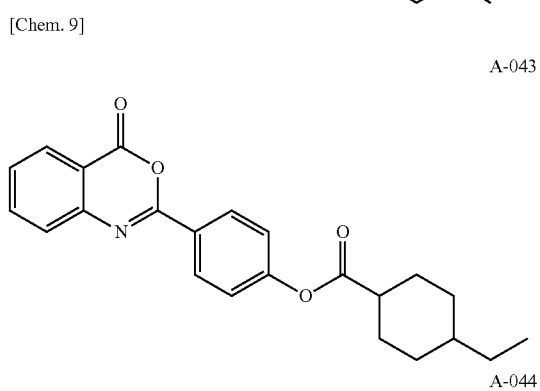
A-044
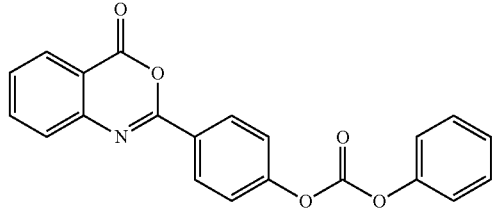

A-045
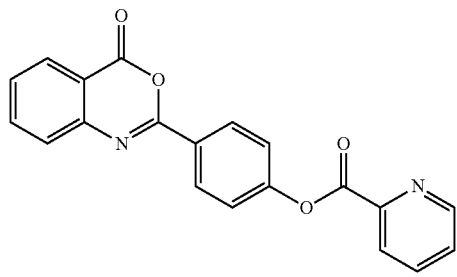
A-046
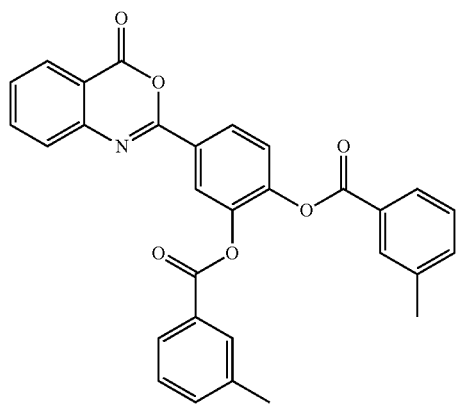
A-047
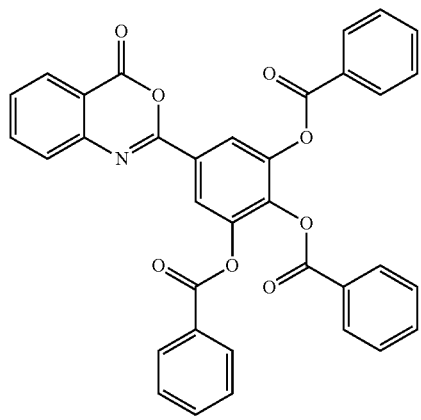
A-048
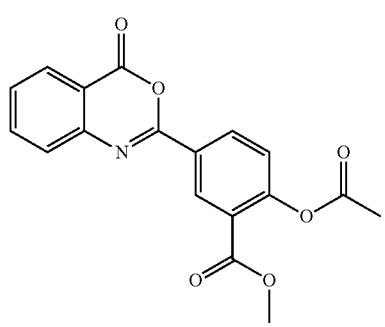
A-049
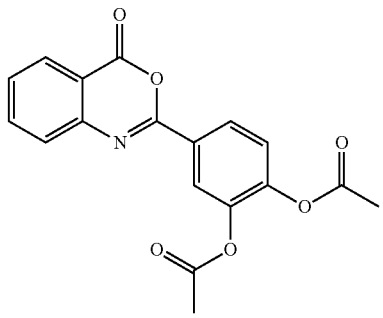
A-050
A-051
[Chem. 10]
A-052
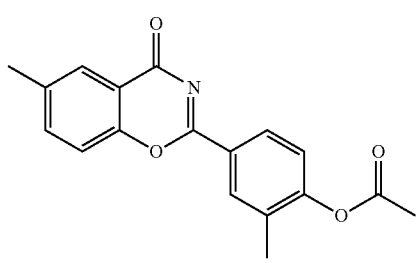
A-053
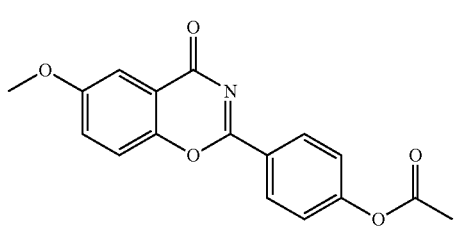

A-054
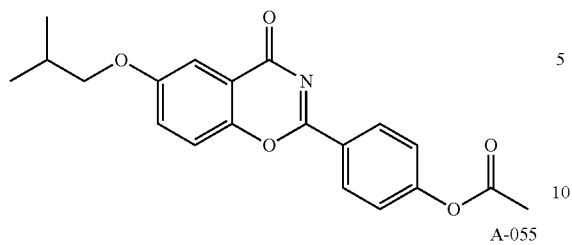
A-055
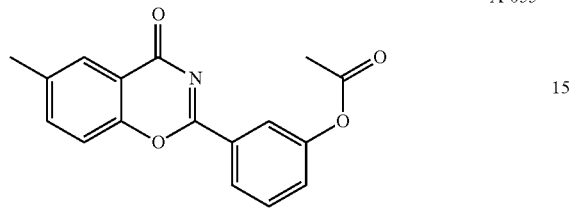
A-056
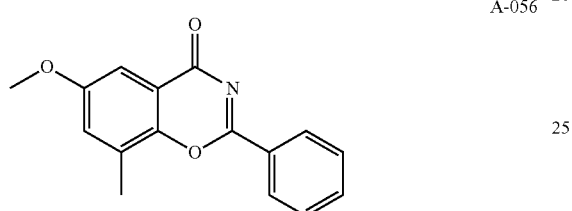
A-057
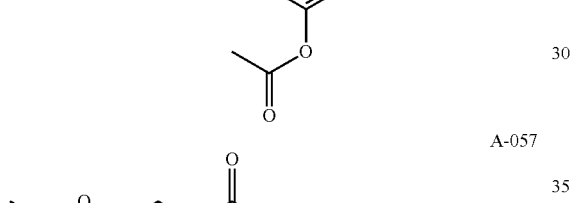
A-058
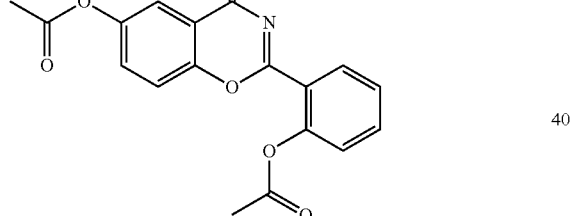
A-059
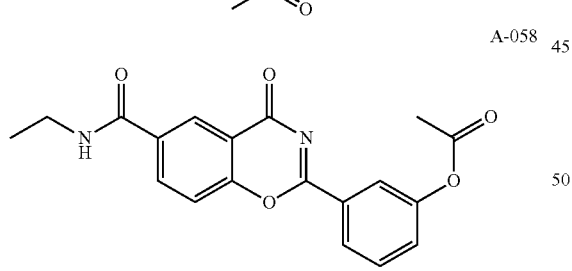
A-060
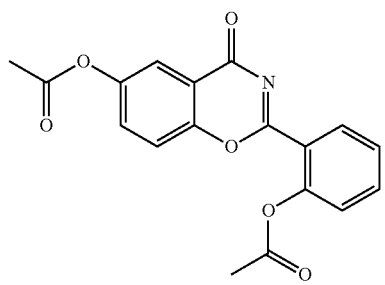
[Chem. 11]
A-061
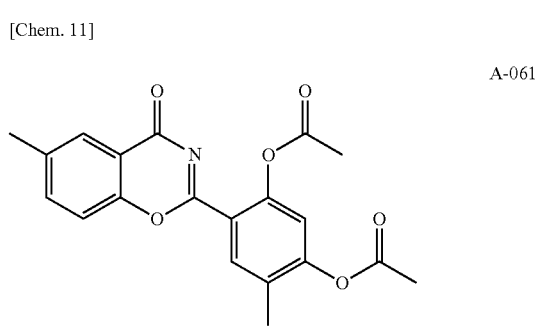
A-062
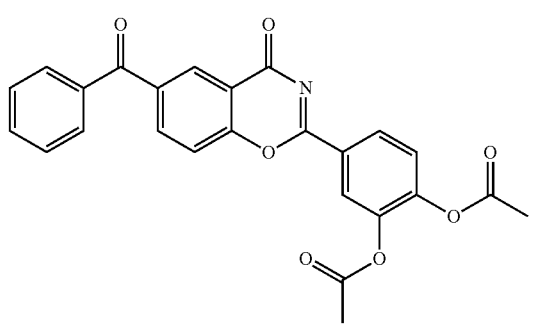
A-063
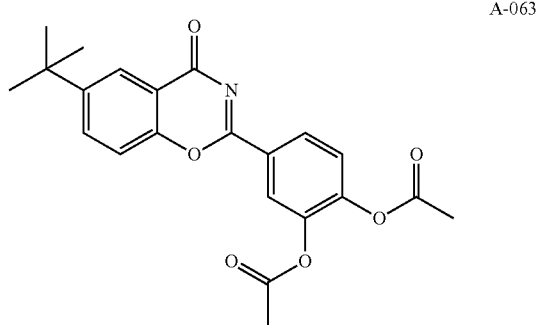
A-064
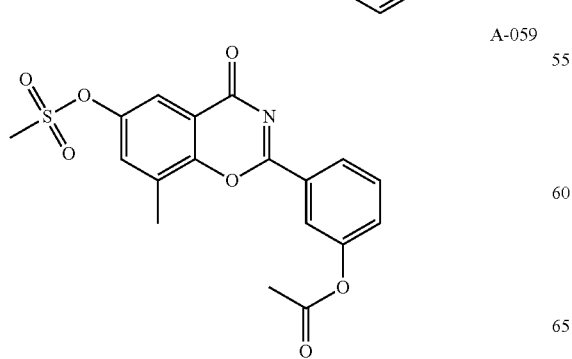

A-065
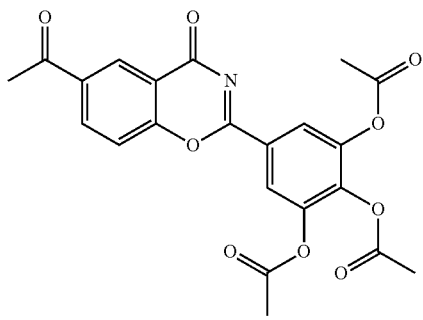
A-066
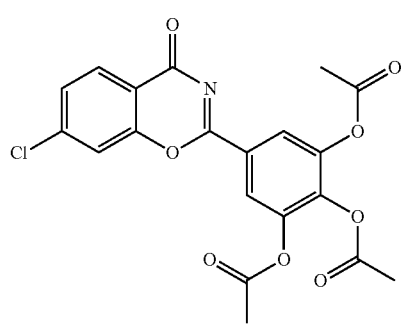
A-067
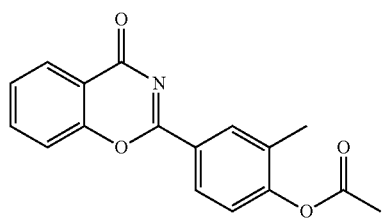
A-068
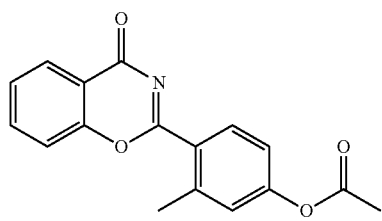
A-069
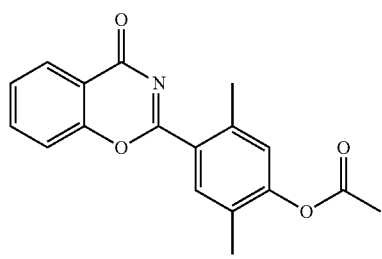
A-070
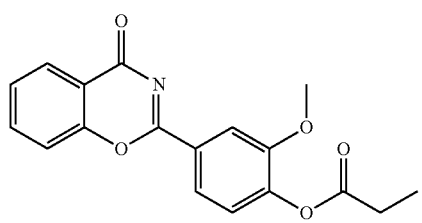
[Chem. 12]
A-071
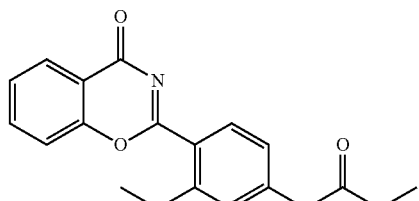
A-072
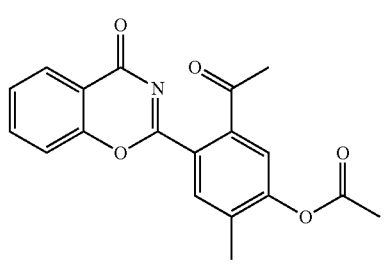
A-073
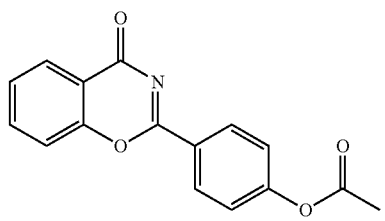
A-074
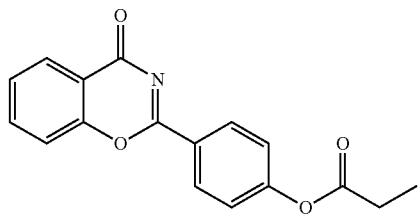
A-075
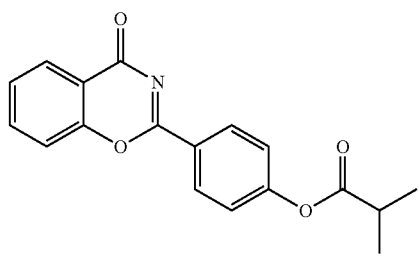
A-076
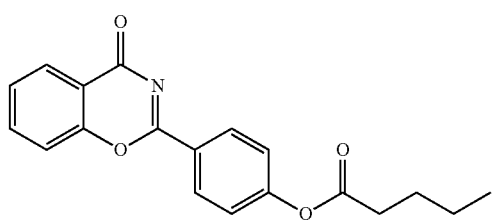

A-077
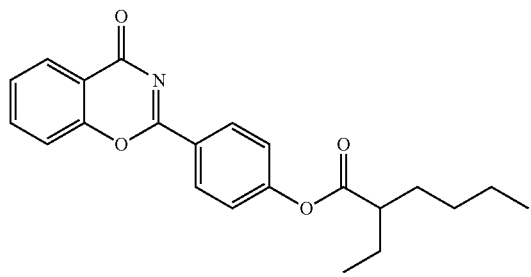
A-078
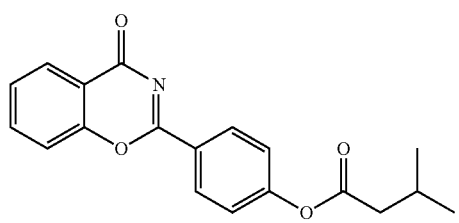
A-079
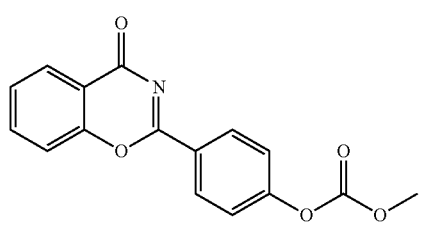
A-080
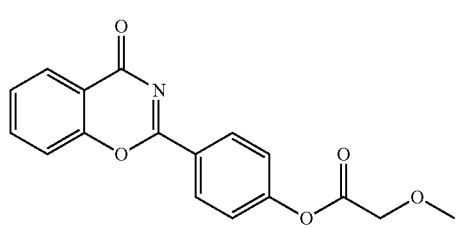
[Chem. 13]
A-081
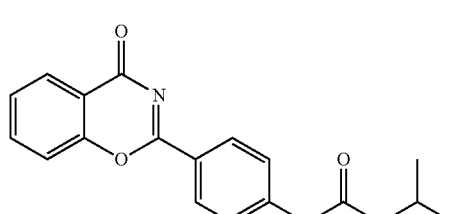
A-082
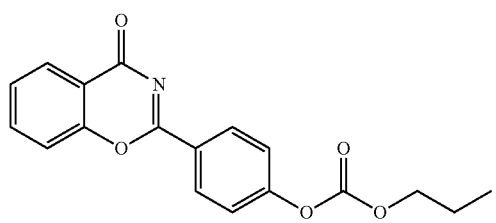
A-083
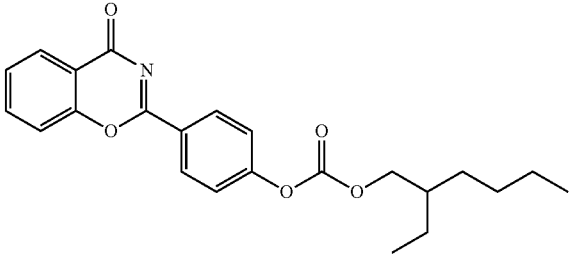
A-084
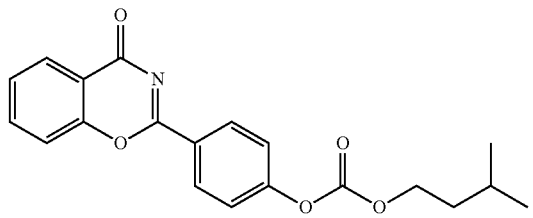
A-085
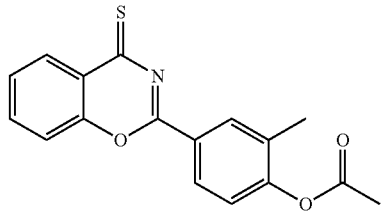
A-086
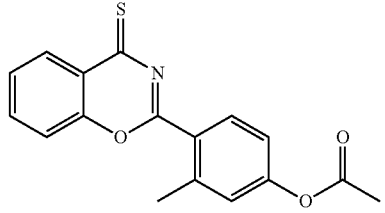
A-087
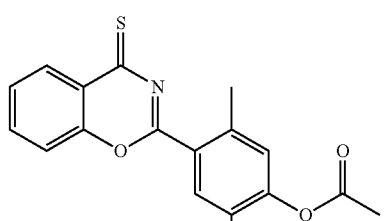
A-088
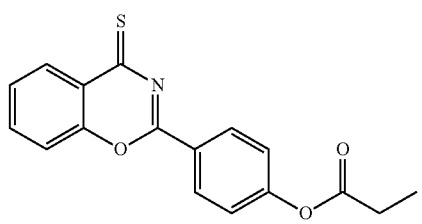

A-089
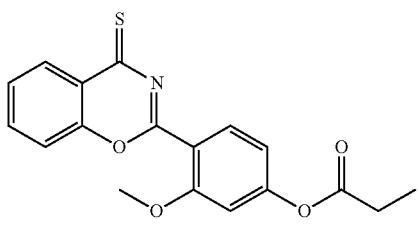
A-090
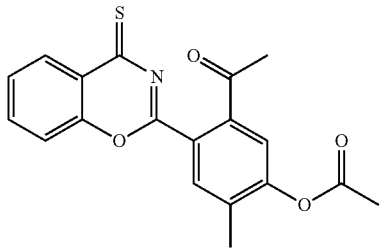
[Chem. 14]
A-091
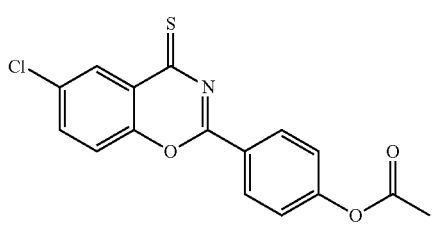
A-092
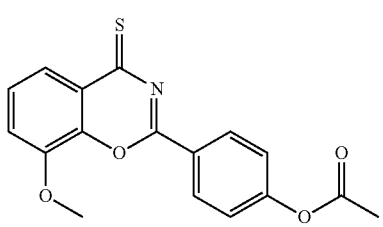
A-093
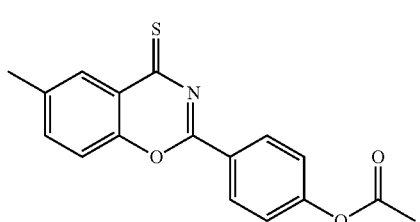
A-094
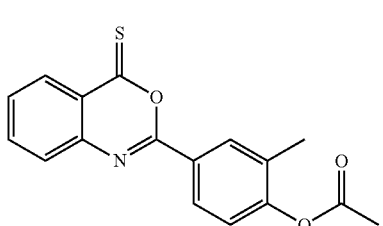
A-095
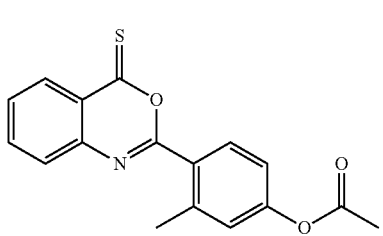
A-096
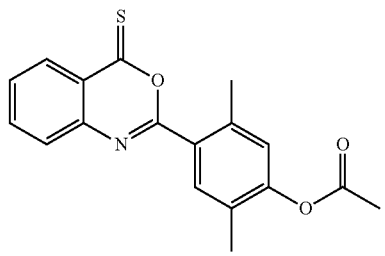
A-097
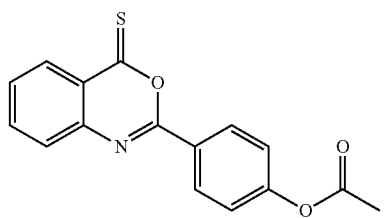
A-098
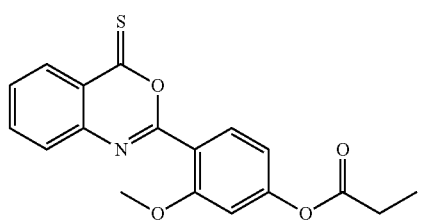
A-099
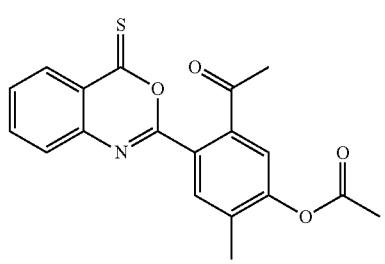
A-100
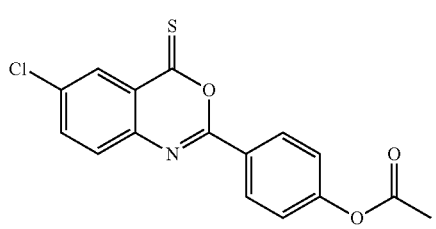
[Chem. 15]
A-101
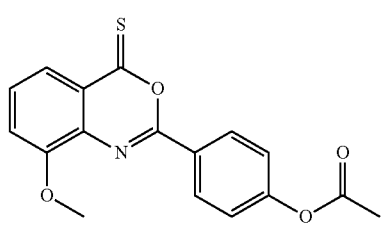

-continued
A-102
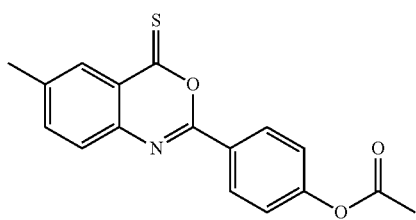
A-103
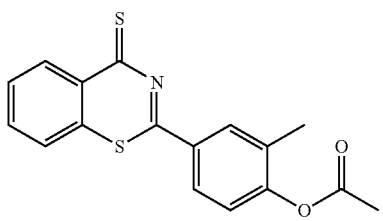
A-104
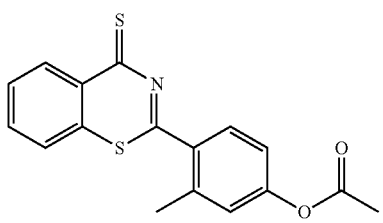
A-105
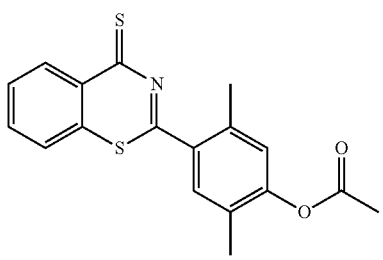
A-106
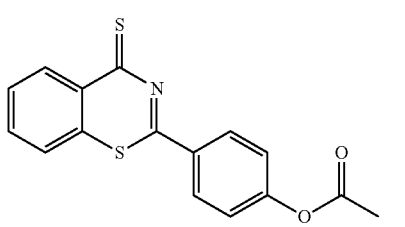
A-107
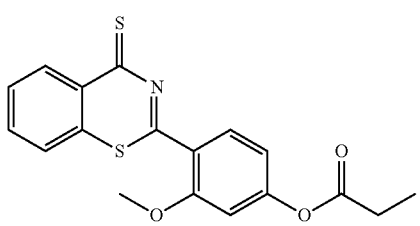
A-108
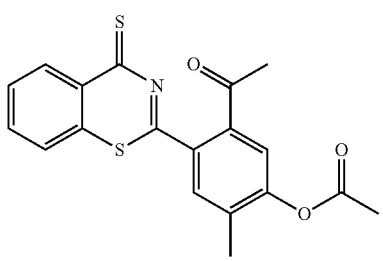
-continued
A-109
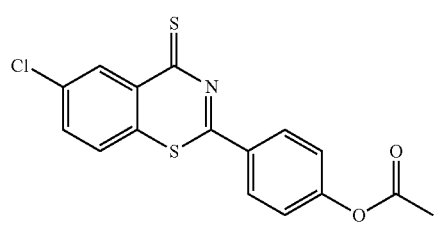
A-110
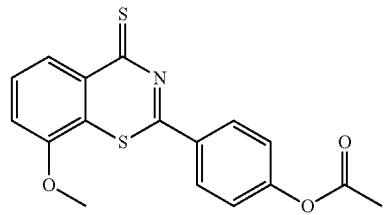
[Chem. 16]
A-111
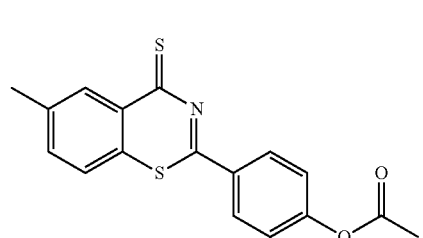
A-112
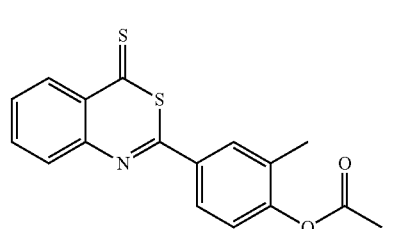
A-113
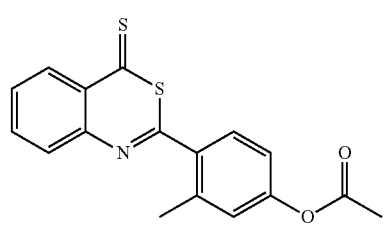
A-114
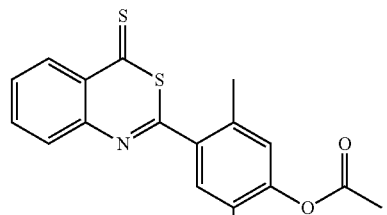
A-115
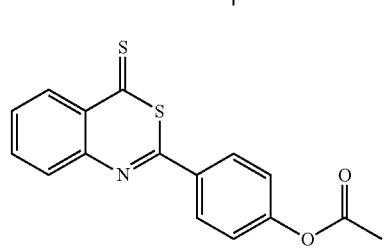

|     |     |
| --- | --- |
| A-116 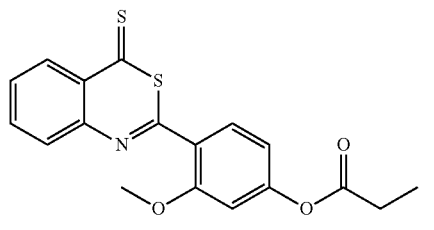 | A-123 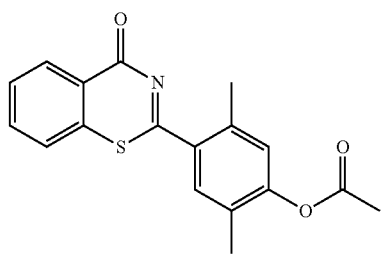 |
| A-117 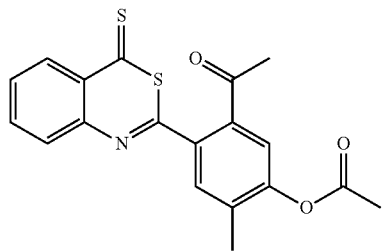 | A-124 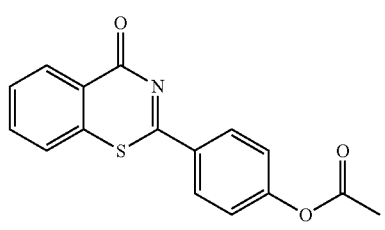 |
| A-118 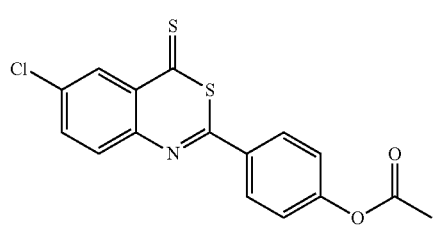 | A-125 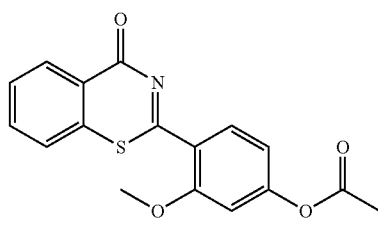 |
| A-119 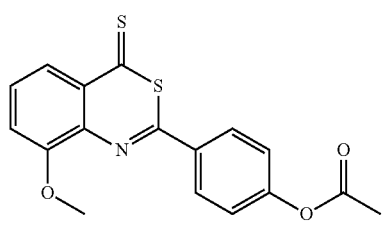 | A-126 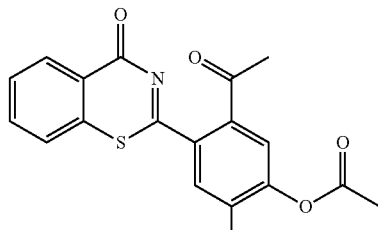 |
| A-120 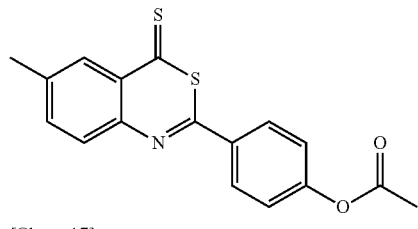 | A-127 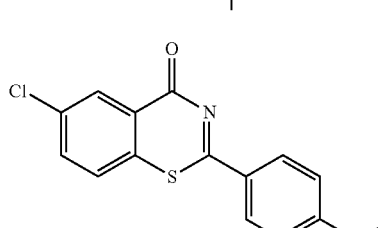 |
| [Chem. 17] A-121 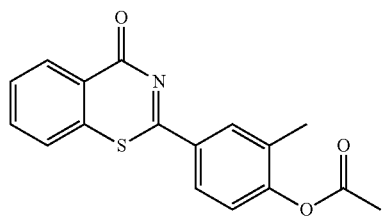 | A-128 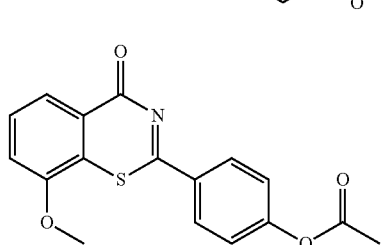 |
| A-122 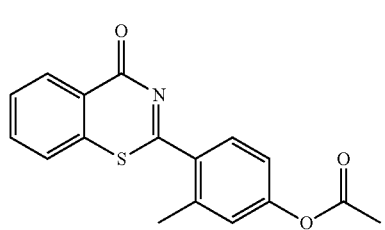 | A-129 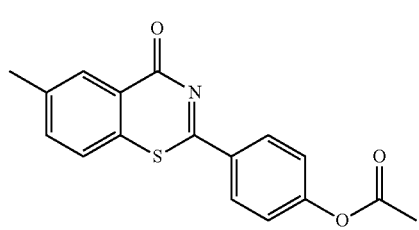 |

A-130
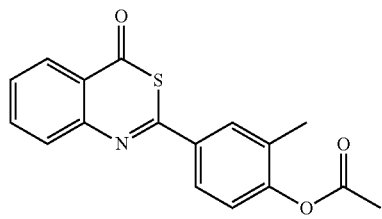
the retarda
A-131
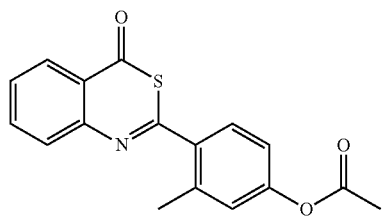
A-132
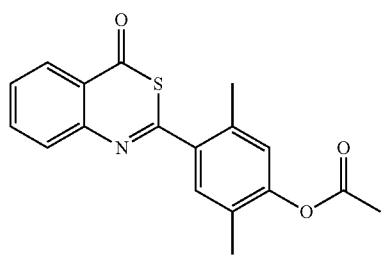
A-133
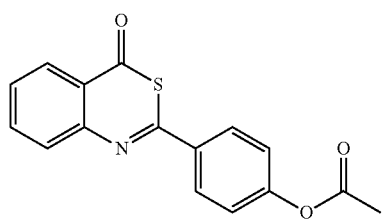
A-134
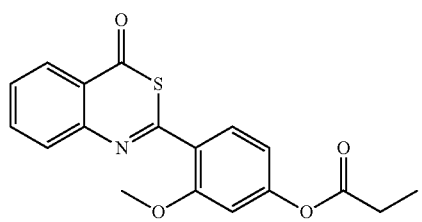
A-135
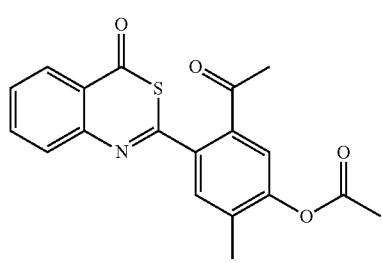
A-136
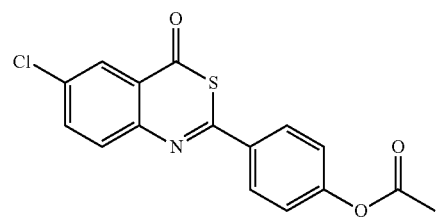
A-137
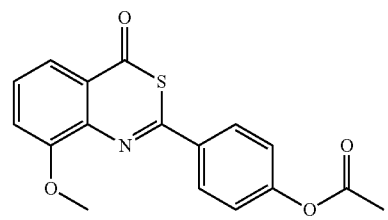
A-138
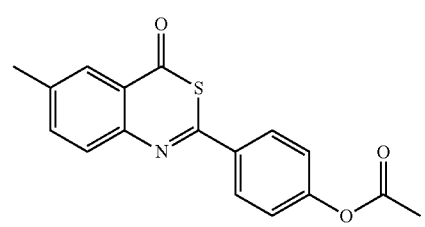
A-139
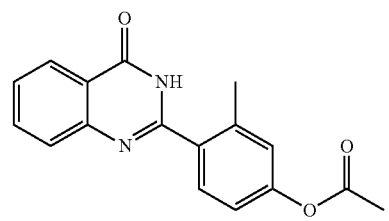
A-140
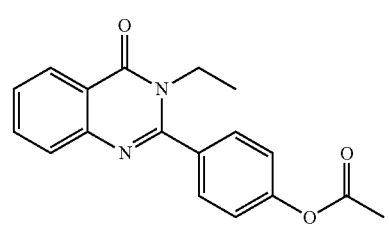
[Chem. 19]
A-141
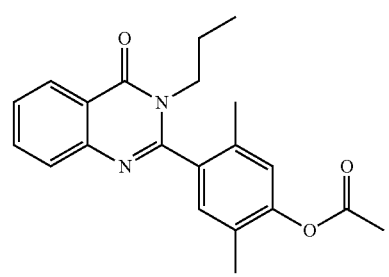

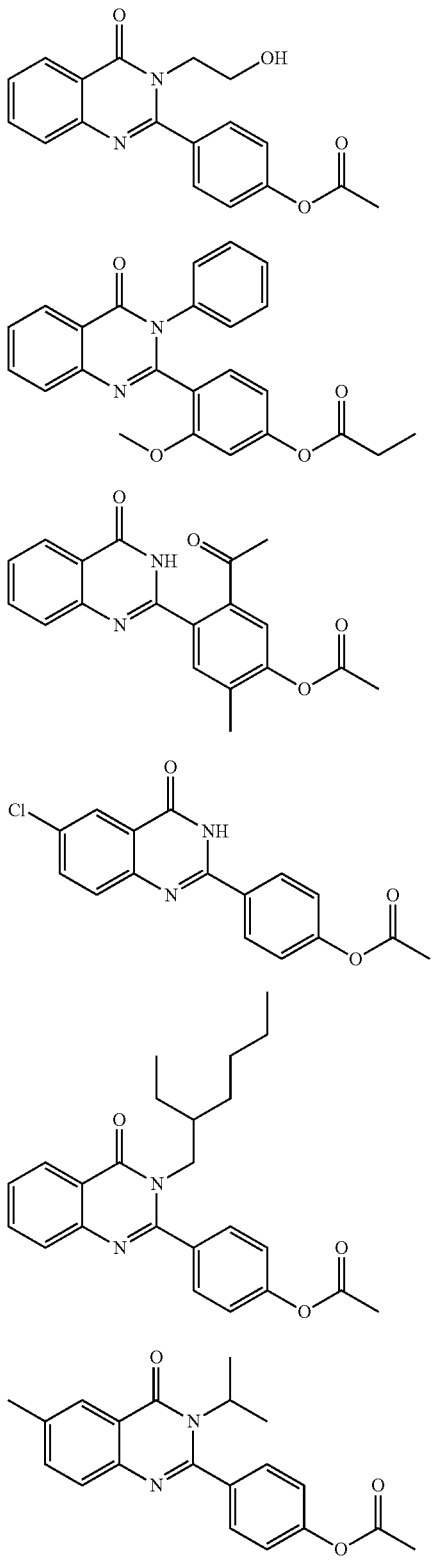

A-142
A-143
A-144
A-145
A-146
A-147

When the film of the present embodiment contains a compound expressed by the general formula (1) in addition to a cellulose ester, in order to obtain desired retardation, the compound expressed by the general formula (1) is preferably added into the cellulose ester. Adding into the cellulose ester means that the compound is dissolved or dispersed into the cellulose ester. Only coating the compound expressed by the general formula (1) on the surface of a retardation film has a possibility of not obtaining desired retardation. In order to be in a state of adding into a cellulose ester, a method of preparing a dope obtained by mixing the cellulose ester and flow-casting the dope or a method of flow-casting a molten material obtained by previously heat-melting a mixture of the cellulose ester and the compound may be used.

An amount in use of a compound expressed by the general formula (1) in the film of the present embodiment is not particularly limited. However, in order to obtain desired retardation, a compound expressed by the general formula (1) is preferably contained within the range from 0.1 to 20 parts by mass, more preferably contained within the range from 1 to 15 parts by mass, further more preferably contained within the range from 1.5 to 10 parts by mass, still more preferably contained within the range from 2 to 8 parts by mass, and particularly preferably contained within the range from 3 to 7 parts by mass, with respect to 100 parts by mass of the cellulose ester. When the compound is contained within the ranges, compatibility and resistant to bleed-out are preferable as well as imparting sufficient retardation to the film of the present invention.

The compound expressed by the above described general formula (1) shows a 1.1 times or larger value of a retardation value Rt(590) in the thickness direction of the retardation film containing 3 parts by mass of the compound expressed by the general formula (1) with respect to 100 parts by mass of a cellulose ester, as compared to a retardation value Rt(590) of a cellulose ester film without addition, and the retardation value Rt(590) is preferably within the range from 1.2 to 10 times, and more preferably within the range from 1.3 to 4 times. A film which is excellent in a retardation expression property can be provided by adding a compound within the above described ranges.

<Synthesis of Compound Expressed by the General Formula 1>

A compound expressed by the general formula (1) can be synthesized by a general method. A synthesis example of an exemplified compound will be stated below.

(Synthesis of Exemplified Compound A-022)

[Chem. 20]

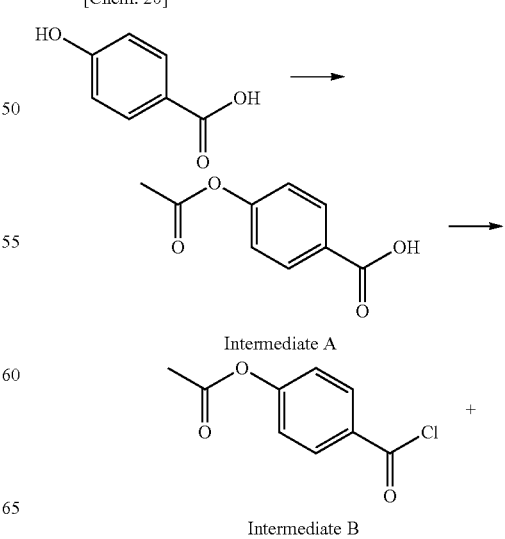

Intermediate A

Intermediate B

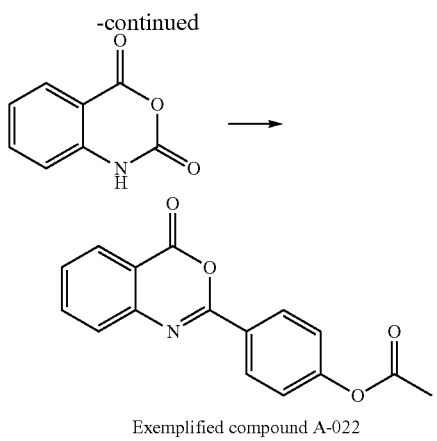

Exemplified compound A-022

A 2 L-recovery flask was charged with 56 g of 4-hydroxybenzoic acid and 800 ml of an aqueous 1 N NaOH solution and the mixture was stirred at 40° C. to be dissolved, and 50 g of acetic anhydride was dropped thereto. The reaction mixture was stirred for 1 hour and then cooled with water, and 30 ml of acetic acid was added. The reaction solution was stirred for 1 hour and then filtered, washed with water and dried to thus obtain 54.5 g of an intermediate A.

A 100 ml-recovery flask was charged with 5.0 g of the intermediate A, 3.0 ml of thionyl chloride and 0.1 ml of DMF and the mixture was heated at 80° C. for 3 hours. The solvent and thionyl chloride were distilled off under reduced pressure to thus obtain 5.6 g of an intermediate B.

A 200 ml-recovery flask was charged with 50 ml of pyridine and 4.5 g of isatoic anhydride, the mixture was heated to 50° C., and 5.6 g of the intermediate B was then dropped thereto. The outer temperature was increased to 120° C. after completion of the dripping. The outer temperature was cooled to room temperature after 2 hours, 100 ml of water was added, and the mixture was stirred for 1 hour. The reaction solution was filtered, washed with methanol and then dried to thus obtain 6.4 g of a crude product. The crude product was purified by column chromatography (developing solvent: toluene) to thus obtain 3.8 g of the exemplified compound A-022. The obtained exemplified compound A-022 was identified by NMR and mass spectrum.

Other compounds expressed by the general formula (1) can be also synthesized by reference to the disclosure of the specification of the present application and a known technique.

The above described compound expressed by the general formula (1) may be used singly or two or more of the compounds may be used in combination. The film of the present embodiment preferably contains at least one or more of the compounds expressed by the general formula (1), and retardation can also be imparted by using a compound other than a compound expressed by the general formula (1) in addition to or as substitute for the compound expressed by the general formula (1).

<Other Retardation Increasing Agents>

Examples of other retardation increasing agents include a compound expressed by the general formula (I) in JP 2012-7015, a retardation expression agent 1 in JP 2005-352138, compounds expressed by the formula (I) and the formula (II) in Japanese Patent No. 3896404, and a compound having at least two aromatic rings described in Japanese Patent No. 4234823.

(b) Plasticizer

The film of the present invention can contain at least one plasticizer for the purpose of imparting processability to the film. A plasticizer can be used alone or two or more plasticizers may be used in mixture.

It is preferable to contain at least one plasticizer among plasticizers selected from the group consisting of a sugar ester compound, a polyester compound and an acrylic compound, which are described below, from the viewpoint that both effective control of moisture permeability and compatibility with a cellulose ester can be highly attained at the same time.

The plasticizer preferably has a molecular weight of 15000 or less, and more preferably has a molecular weight of 10000 or less from the viewpoint that both improvement in moist heat resistance and compatibility with a cellulose ester are simultaneously attained. When the compound having a molecular weight of 10000 or less is a polymer, the weight average molecular weight (Mw) is preferably 10000 or less. A preferable range of the molecular weight (Mw) is within the range from 100 to 10000, and more preferable range is within the range from 400 to 8000.

A weight average molecular weight of a plasticizer (Mw) is calculated using gel permeation chromatography (GPC) in the measurement conditions described below.

Solvent: methylene chloride

Columns: Shodex K806, K805, K803G (three columns manufactured by Showa Denko K.K. are connected to be used)

Column temperature: 25° C.

Sample concentration: 0.1% by mass

Detector: RI Model 504 (manufactured by GL SCIENCES INC.)

Pump: L6000 (manufactured by Hitachi, Ltd.)

Flow rate: 1.0 ml/min

Calibration curve: Standard polystyrene STK standard polystyrene (manufactured by TOSOH CORPORATION)), calibration curves from 13 samples having Mw=1000000 to 500 are used. 13 samples should be spaced approximately equally.

In order to particularly obtain the effects of the present invention, a compound having the molecular weight of 15000 or less is preferably contained within the range from 6 to 40 parts by mass with respect to 100 parts by mass of a cellulose ester, and more preferably within the range from 10 to 20 parts by mass. Containing within the above described ranges is preferable since both effective control of moisture permeability and compatibility with a cellulose ester can be simultaneously attained.

<Sugar Ester Compound>

The film in the present embodiment preferably contains a sugar ester compound other than a cellulose ester for the purpose of prevention of hydrolysis. Specifically, a sugar ester compound having 1 or more and 12 or less of at least one of a pyranose structure and a furanose structure, in which all or a part of OH groups in the structures are esterified, is preferably used as the sugar ester compound.

Examples of a sugar that is a material for synthesis of a sugar ester compound according to the present invention include materials as cited below, but the present invention is not limited thereto. Examples include glucose, galactose, mannose, fructose, xylose or arabinose, lactose, sucrose, nystose, 1F-fructosylnystose, stachyose, maltitol, lactitol, lactulose, cellobiose, maltose, cellotriose, maltotriose, raffinose or kestose. Other examples include gentiobiose, gentiotriose, gentiotetraose, xylotriose and galactosyl-sucrose.

A monocarboxylic acid to be used to esterify all or a part of OH groups in the pyranose structure or the furanose structure is not specifically limited, and a known aliphatic monocarboxylic acid, alicyclic monocarboxylic acid, aromatic monocarboxylic acid, and the like can be used. The carboxylic acid to be used may be used in one kind or may be used in two or more kinds in mixture.

Examples of a preferable aliphatic monocarboxylic acid include a saturated fatty acid such as acetic acid, propionic acid, butylic acid, isobutylic acid, valeric acid, capronic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachic acid, behenic acid, lignoceric acid, cerotic acid, heptacosanoic acid, montanic acid, melissic acid and lacceric acid, and an unsaturated fatty acid such as undecylenic acid, oleic acid, sorbic acid, linolic acid, linolenic acid, arachidonic acid and octenic acid.

As examples of a preferable aliphatic monocarboxylic acid, cyclopentane carboxylic acid, cyclohexane carboxylic acid, cyclooctane carboxylic acid and derivatives thereof can be cited.

Preferable examples of an aromatic monocarboxylic acid include an aromatic monocarboxylic acid formed by introducing 1 to 5 alkyl groups or alkoxy groups into the benzene ring of benzoic acid such as benzoic acid, phenyl acetic acid and toluic acid, an aromatic monocarboxylic acid having 2 or more benzene rings such as cinnamic acid, benzilic acid, biphenyl carboxylic acid, naphthalene carboxylic acid, tetralin carboxylic acid, or derivatives thereof, and benzoic acid is particularly preferable.

In particular, a sugar ester compound having a total average substitution degree expressed by the following general formula (FA) of 3.0 to 6.0 is preferably used in the film of the present embodiment.

[Chem. 21]

General Formula (FA)

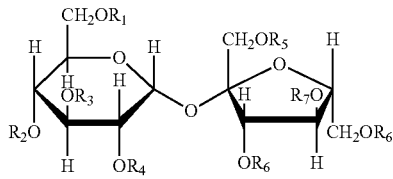

(In the formula, each of $R_1$ to $R_8$ independently represents a hydrogen atom, a substituted or unsubstituted alkylcarbonyl group, or a substituted or unsubstituted arylcarbonyl group, and $R_1$ to $R_8$ may be the same or different from one another.)

A compound expressed by the above described general formula (FA) has an average substitution degree of 3.0 to 6.0, and control of moisture permeability and compatibility with a cellulose ester can be thus highly attained at the same time.

In the present invention, a substitution degree of a compound expressed by the general formula (FA) means the number of hydroxyl groups which are replaced with substituents other than hydrogen out of 8 hydroxyl groups contained in the general formula (FA), that is, the number of groups contained among $R_1$ to $R_8$ in the general formula (FA) other than hydrogen. Therefore, when $R_1$ to $R_8$ are all replaced with substituents other than hydrogen, the substitution degree is the maximum value of 8.0, and when $R_1$ to $R_8$ are all hydrogen atoms, the substitution degree is 0.0.

As a compound having a structure expressed by the general formula (FA), it is hard to synthesize a compound made of single kind having the fixed number of hydroxyl groups and the fixed number of OR groups, and it is known to be obtained a compound in which several kinds of components having the different number of hydroxyl groups and different OR groups in the formula are mixed and, therefore, it is appropriate to use an average substitution degree as the substitution degree of the general formula (FA) in the present invention, and the average substitution degree can be measured from an area ratio of a chart showing distribution of substitution degrees by high performance liquid chromatography in a general method.

In the general formula (FA), $R_1$ to $R_8$ represent substituted or unsubstituted alkylcarbonyl groups, or substituted or unsubstituted arylcarbonyl groups, $R_1$ to $R_8$ may be the same or different (hereinafter, $R_1$ to $R_8$ are also called acyl groups). Specifically, examples of $R_1$ to $R_8$ include acyl groups derived from monocarboxylic acids which are used in synthesis of a sugar ester compound exemplified in the above description.

Hereinbelow, specific examples of the sugar ester compound according to the present invention will be cited, each of which is the case where some of $R_1$ to $R_8$ are the same substituents R, and the present invention is not limited thereto. In addition, polyester compounds are prescribed by the following reference numbers in examples described below. Note that, in the present invention, a sugar ester compound having a different substituent each for $R_1$ to $R_8$ can be used.

[Chem. 22]

| Number of | | Average substitution degree |
|---|---|---|
| FA-1 | —C(=O)—CH$_3$ | 3.3 |
| FA-2 | —C(=O)—CH$_3$ | 4.2 |
| FA-3 | —C(=O)—CH$_3$ | 5.5 |
| FA-4 | —C(=O)—CH$_3$ | 5.7 |
| FA-5 | —C(=O)—CH$_3$ | 6.0 |
| FA-6 | —C(=O)—C$_6$H$_5$ | 3.5 |
| FA-7 | —C(=O)—C$_6$H$_5$ | 4.0 |

[Chem. 22]

| Number of | | Average substitution degree |
|---|---|---|
| FA-8 | −C(=O)−C₆H₅ | 5.0 |
| FA-9 | −C(=O)−C₆H₅ | 5.5 |
| FA-10 | −C(=O)−C₆H₅ | 6.0 |
| FA-11 | −C(=O)−C₆H₅ | 6.5 |
| FA-12 | −C(=O)−C₆H₅ | 7.0 |
| FA-13 | −C(=O)−C₆H₅ | 7.5 |

[Chem. 23]

| Number of | | Average substitution degree |
|---|---|---|
| FA-14 | −C(=O)−C₆H₄−CH₃ | 3.2 |
| FA-15 | −C(=O)−C₆H₄−CH₃ | 4.4 |
| FA-16 | −C(=O)−C₆H₄−CH₃ | 5.5 |
| FA-17 | −C(=O)−C₆H₄−CH₃ | 6.0 |
| FA-18 | −C(=O)−CH₂−C₆H₅ | 3.0 |
| FA-19 | −C(=O)−CH₂−C₆H₅ | 4.0 |
| FA-20 | −C(=O)−CH₂−C₆H₅ | 5.5 |
| FA-21 | −C(=O)−CH₂−C₆H₅ | 6.0 |
| FA-22 | −C(=O)−C₆H₂(OCH₃)₃ | 3.1 |
| FA-23 | −C(=O)−C₆H₂(OCH₃)₃ | 4.7 |

[Chem. 24]

| Number of | | Average substitution degree |
|---|---|---|
| FA-24 | −C(=O)−C₆H₂(OCH₃)₃ | 5.3 |
| FA-25 | −C(=O)−C₆H₂(OCH₃)₃ | 6.0 |

| Number of | [Chem. 24] | Average substitution degree |
|---|---|---|
| FA-26 | 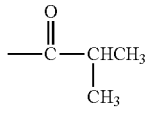 | 3.5 |
| FA-27 | 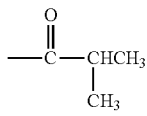 | 4.6 |
| FA-28 | 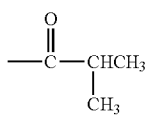 | 5.6 |

| Number of | [Chem. 24] | Average substitution degree |
|---|---|---|
| FA-29 | 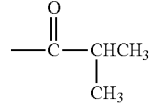 | 6.0 |

The film of the present embodiment preferably contains a sugar ester compound in an amount of 0.5 to 30% by mass of the entire film (100% by mass), and particularly preferably contains an amount of 2 to 15% by mass.

A sugar ester compound according to the present invention can be produced by reacting the above described sugar with an acylating agent (also called an esterifying agent, for example, acid halide such as acetyl chloride, anhydrides such as acetic anhydride), distribution of a substitution degree can be adjusted by an amount of an acylating agent, timing of addition, and an esterification reaction time, but by mixing a sugar ester compounds having a different substitution degree or mixing a compound that is purely isolated and has a different substitution degree, a component having a desired average substitution degree, a substitution degree of 4 or less, can be prepared.

(Synthesis Example: Synthesis Example of Sugar Ester Compound)

[Chem. 25]

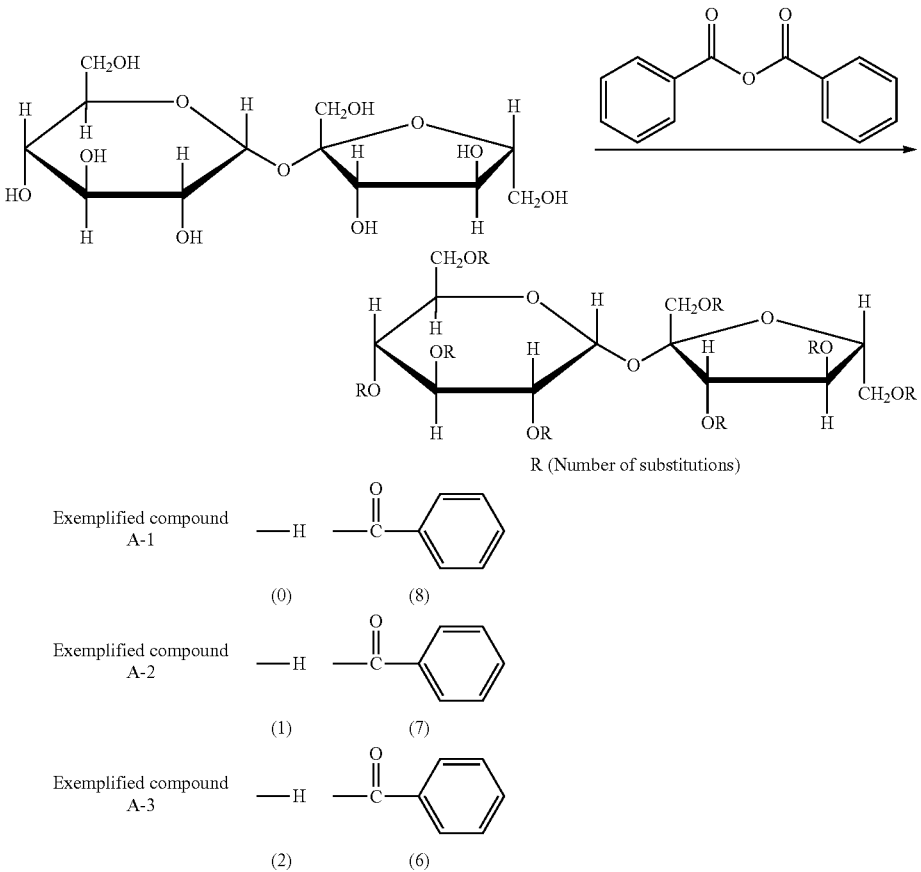

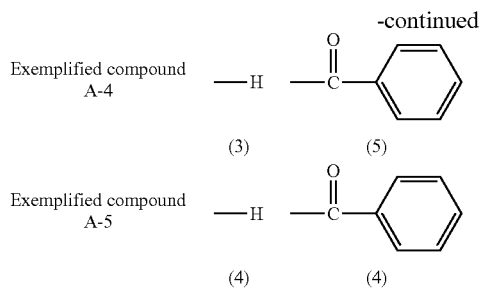

A four-necked flask equipped with a stirrer, a reflux condenser, a thermometer and a nitrogen gas inlet tube was charged with 34.2 g (0.1 mol) of sucrose, 135.6 g (0.6 mol) of benzoic anhydride and 284.8 g (3.6 mol) of pyridine, the temperature was increased while a nitrogen gas is bubbled from the nitrogen gas inlet tube with stirring, and an esterification reaction was carried out at 70° C. for 5 hours.

Next, the inside of the flask was reduced to the pressure of $4 \times 10^2$ Pa or less, and excessive pyridine was distilled off at 60° C., the inside of the flask was then reduced to the pressure of $1.3 \times 10$ Pa or less, the temperature was increased to 120° C., and a large part of benzoic anhydride and produced benzoic acid are distilled off. Then, thereto were subsequently added 1 L of toluene and 300 g of an aqueous 0.5% by mass sodium carbonate solution, the solution was stirred at 50° C. for 30 minutes and left to stand and the toluene layer was then separated. Finally, 100 g of water was added to the separated toluene layer to wash with water at normal temperature for 30 minutes, the toluene layer was then separated and toluene was distilled off under reduced pressure ($4 \times 10^2$ Pa or less) at 60° C. to thus obtain a sugar ester compound 1 that is a mixture of the compounds A-1, A-2, A-3, A-4, and A-5, etc.

When the obtained mixture was analyzed by a high performance liquid chromatography mass analysis (HPLC-MS), A-1 was 1.2% by mass, A-2 was 13.2% by mass, A-3 was 14.2% by mass, A-4 was 35.4% by mass, and A-5, etc. was 40.0% by mass. The average substitution degree was 5.2.

In the same manner, sugar ester compounds containing components as described in Table A were obtained by reacting benzoic anhydrides 158.2 g (0.70 mol), 146.9 g (0.65 mol), 135.6 g (0.60 mol) and 124.3 g (0.55 mol) with equimolecular amounts of pyridine.

TABLE A

[Chem. 26]

| Components | Number of moles of benzoic anhydride | | | |
|---|---|---|---|---|
| (mass %) | 0.70 | 0.65 | 0.60 | 0.55 |
| A-1 | 7.3 | 2.3 | 1.2 | 0.5 |
| A-2 | 28.4 | 18.8 | 13.2 | 7.0 |
| A-3 | 29.0 | 17.8 | 14.2 | 9.4 |
| A-4 | 26.4 | 34.0 | 35.4 | 26.5 |
| A-5, etc. | 8.8 | 27.1 | 40.0 | 56.7 |
| Average substitution degree | 6.0 | 5.4 | 5.2 | 4.7 |

Subsequently, a part of the obtained mixture was purified by column chromatography using silica gel to thus obtain A-1, A-2, A-3, A-4 and A-5, etc. each having a purity of 100%.

Meanwhile, A-5, etc. means a mixture of all compounds having substitution degrees of 4 or less, that is a mixture of compounds having substitution degrees of 4, 3, 2 and 1. In addition, the average substitution degree is calculated assuming that A-5, etc. has a substitution degree 4.

In the present invention, an average substitution degree was adjusted by adding a sugar ester having a nearly desired substitution degree and isolated A-1 to A-5, etc. by the method prepared herein.

<Measurement Conditions of HPLC-MS>
1) LC Part
Apparatus: Column oven manufactured by JASCO Corporation (JASCO CO-965), detector (JASCO UV-970-240 nm), pump (JASCO PU-980), degasser (JASCO DG-980-50)
Column: Inertsil ODS-3, particle diameter 5 μm, 4.6×250 mm (manufactured by GL Sciences Inc.)
Column temperature: 40° C.
Flow rate: 1 ml/min
Mobile phase: THF (1% acetic acid): $H_2O$ (50:50)
Injection amount: 3 μl
2) MS Part
Apparatus: LCQ DECA (manufactured by Thermo Quest K.K.
Ionization method: Electrospray ionization (ESI) method
Spray Voltage: 5 kV
Capillary temperature: 180° C.
Vaporizer temperature: 450° C.

<Polyester Compound>
A polyester compound is preferably contained in the present embodiment.

The polyester is not particularly limited and, for example, a polymer (polyester polyol) having a hydroxy group (hydroxyl group) in the end, which can be obtained by a condensation reaction of dicarboxylic acid or an ester forming derivative thereof with glycol or a polymer in which a hydroxy group in the end of the polyester polyol is sealed with monocarboxylic acid (end-sealed polyester) can be used. The ester forming derivative mentioned herein refers to an esterified product of dicarboxylic acid, dicarboxylic acid chloride, and dicarboxylic anhydride.

Use of a polyester compound expressed by the general formula (FB) described below is preferable from the viewpoint that both control of moisture permeability and compatibility with a cellulose ester are highly attained at the same time.

B-(G-A)$_n$-G-B            General formula (FB)

(In the formula, B represents a hydroxy group or a carboxylic acid residue, G represents an alkyleneglycol residue having 2 to 18 carbon atoms, an arylglycol residue having 6 to 12 carbon atoms or an oxyalkylene glycol residue having 4 to 12 carbon atoms, A represents an alkylene dicarboxylic acid residue having 4 to 12 carbon atoms or an aryl dicarboxylic acid residue having 6 to 12 carbon atoms, and n represents an integer of 1 or more.) In the general formula (FB), a polyester compound is constituted of a hydroxy group or a carboxylic acid residue represented by B, an alkyleneglycol residue, an oxyalkylene glycol residue or an arylglycol residue represented by G, and an alkylene dicarboxylic acid residue or aryl dicarboxylic acid residue represented by A and can be obtained by a reaction similar to a general ester compound.

Examples of a carboxylic acid component of a polyester compound expressed by the general formula (FB) include acetic acid, propionic acid, lactic acid, benzoic acid, paratertiary butyl benzoic acid, orthotoluic acid, methatoluic acid, paratoluic acid, dimethyl benzoic acid, ethyl benzoic acid, normal propylbenzoic acid, aminobenzoic acid, acetoxybenzoic acid, and aliphatic acids, each of which can be used alone or as a mixture of two or more kinds.

Examples of an alkylene glycol component having 2 to 18 carbon atoms of a polyester compound expressed by the general formula (FB) include: ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentylglycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 1,4-cyclohexanediol, 1,4-cyclohexanedimethanol, cyclohexanediethanol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol, which may be used alone or as a mixture of two or more kinds.

Since alkylene glycol having 2 to 12 carbon atoms is especially excellent in compatibility with a cellulose ester resin, it is especially desirable. Alkylene glycol having 2 to 6 carbon atoms is more preferable, and alkylene glycol having 2 to 4 carbon atoms is further more preferable.

Examples of an aryl glycol having 6 to 12 carbon atoms of a polyester compound expressed by the above described general formula (FB) include 1,4-benzenediol and 1,4-benzenedimethanol, which may be used alone or as a mixture of two or more kinds.

Examples of an oxyalkylene glycol component having 4 to 12 carbon atoms of a polyester compound expressed by the above described general formula (FB) include diethylene glycol, triethylene glycol, tetraethylene glycol, dipropylene glycol and tripropylene glycol, which may be used alone or as a mixture of two or more kinds.

Examples of an alkylene dicarboxylic acid component having 4 to 12 carbon atoms of a polyester compound expressed by the general formula (FB) include succinic acid, maleic acid, fumaric acid, glutaric acid, adipic acid, azelaic acid, sebacic acid and dodecane dicarboxylic acid, which may be used alone or as a mixture of two or more kinds.

Examples of an aryl dicarboxylic acid component having 6 to 12 carbon atoms of a polyester compound expressed by the general formula (FB) include phthalic acid, terephthalic acid, isophthalic acid, 1,5-naphthalene dicarboxylic acid and 1,4-naphthalene dicarboxylic acid.

A weight average molecular weight of a polyester compound expressed by the general formula (FB) is preferably within the range from 300 to 1500, and more preferably within the range from 400 to 1000. The acid value of the polyester compound is preferably 0.5 mgKOH/g or less and the hydroxy (hydroxyl group) value is preferably 25 mgKOH/g or less, and the acid value is more preferably 0.3 mgKOH/g or less and the hydroxy (hydroxyl group) value is more preferably 15 mgKOH/g or less.

A weight average molecular weight of a polyester compound is calculated by a measurement using gel permeation chromatography (GPC) according to the measurement conditions described below.

Solvent: Tetrahydrofuran (THF)
Columns: TSKgel G2000HXL (Two columns manufactured by TOSOH CORPORATION are used in connection)
Column temperature: 40° C.
Sample concentration: 0.1% by mass
Apparatus: HLC-8220 (manufactured by TOSOH CORPORATION)
Flow rate: 1.0 ml/min
Calibration curve: Calibration curve by PStQuick F (manufactured by TOSOH CORPORATION) is used.

Hereinbelow, specific compounds of a polyester compound expressed by the general formula (FB), which can be used in the present invention, will be described, but the present invention is not limited thereto. In addition, polyester compounds are prescribed by the reference numbers described below in the following examples.

[Chem. 27]

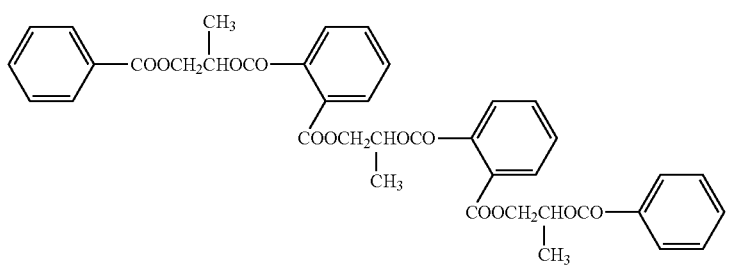

FB-1

Mw: 696

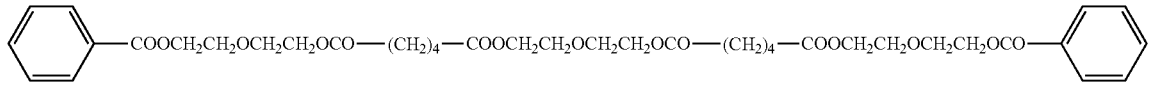

FB-2

Mw: 746

-continued
FB-3
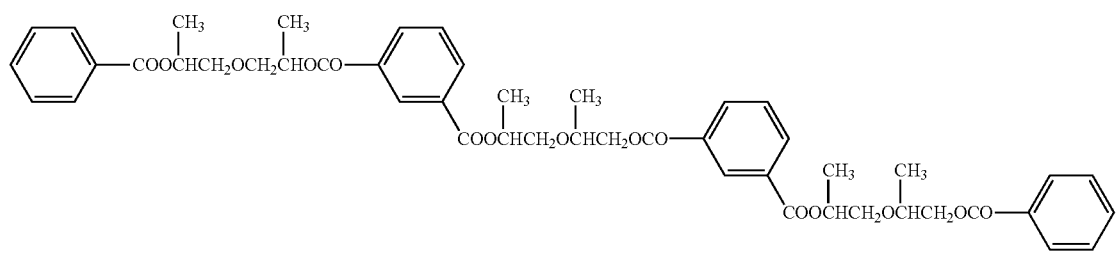
Mw: 830
FB-4
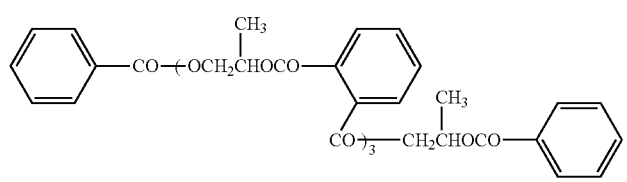
Mw: 886
FB-5
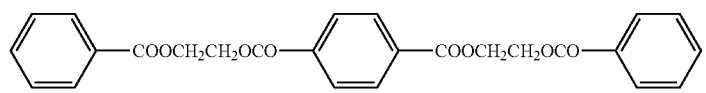
Mw: 462
FB-6
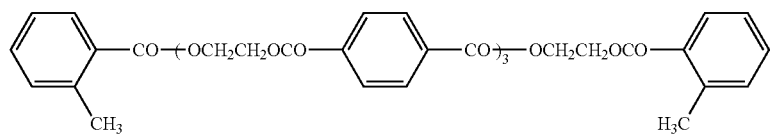
Mw: 874
[Chem. 28]
FB-7
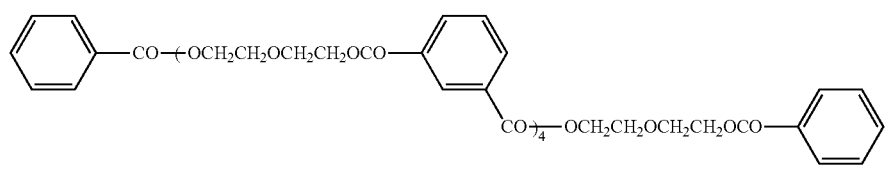
Mw: 1258
FB-8
Mw: 1494
FB-9
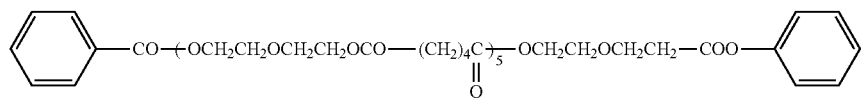
Mw: 1394
FB-10
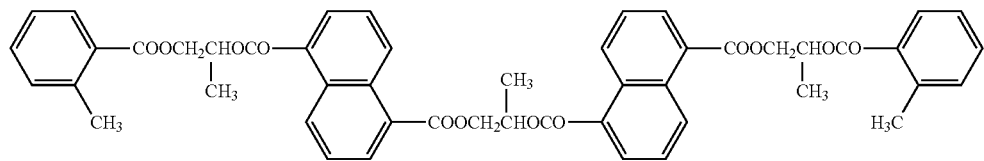
Mw: 852

-continued
FB-11
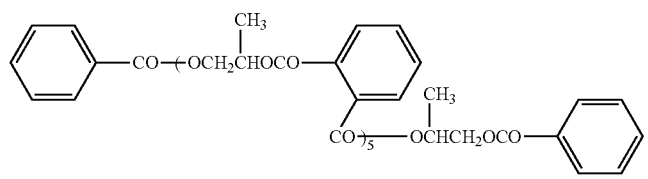
Mw: 1314
FB-12
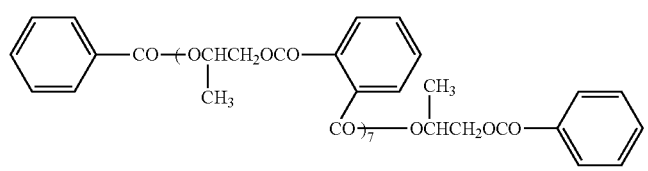
Mw: 1726
FB-13
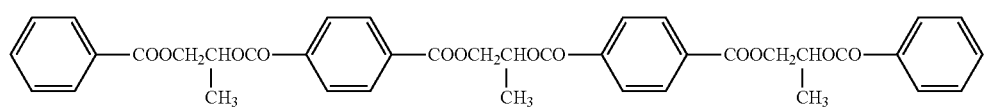
Mw: 696
[Chem. 29]
FB-14
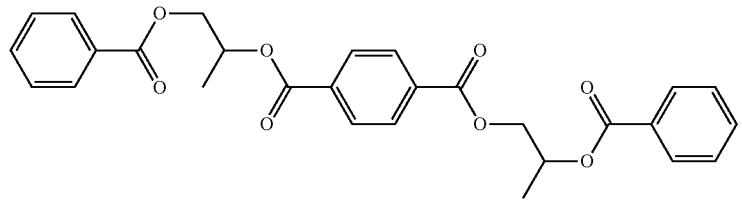
Mw: 491
FB-15
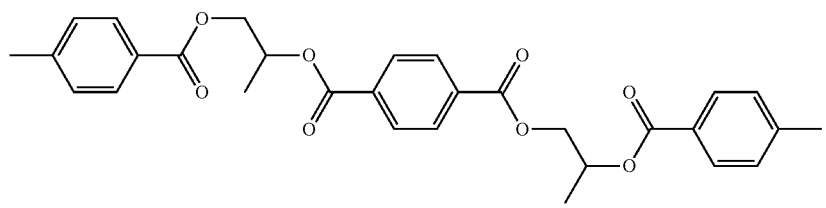
Mw: 519
FB-16
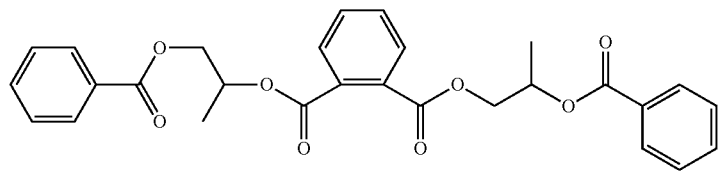
Mw: 491
FB-17
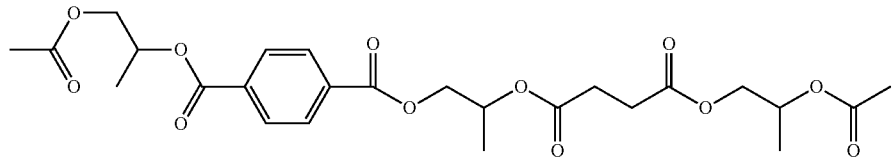
Mw: 525

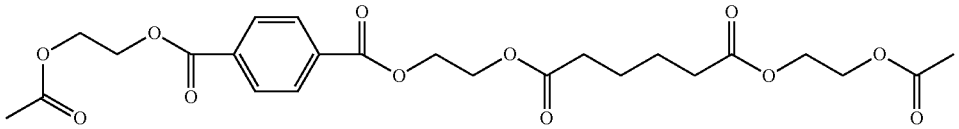

FB-18

Mw: 510

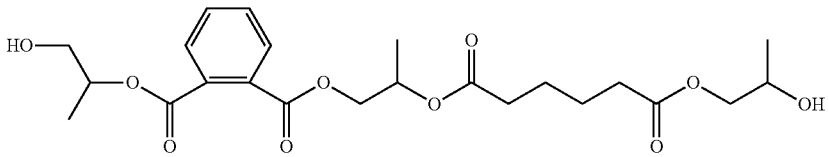

FB-19

Mw: 469

The film of the present embodiment contains a polyester compound in an amount of preferably 0.1 to 30% by mass, and particularly preferably 0.5 to 10% by mass with respect to the entire film (100% by mass).

<Acrylic Compound>

In the present embodiment, an acrylic compound is preferably contained for the purpose of water resistance of the film. The acrylic compound is not particularly limited, and examples thereof include polymers having repeating units derived from at least one acrylic monomer selected from the group consisting of (meth)acrylic acid, a (meth)acrylic acid ester, (meth)acrylamides and (meth)acrylonitrile.

In particular, as the acrylic compound, an acrylic compound containing 50 to 99% by mass of a methyl methacrylate unit and 1 to 50% by mass of the total amount of other monomer units copolymerizable with the methyl methacrylate unit is preferable.

Examples of the other copolymerizable monomers include alkyl methacrylate having an alkyl group with 2 to 18 carbon atoms; alkyl acrylate having an alkyl group with 1 to 18 carbon atoms; vinyl monomers having an amide group such as acryloylmorpholine and N,N-dimethyl acrylamide; methacrylic acid esters or acrylic acid esters having an alicyclic hydrocarbon group with 5 to 22 carbon atoms in an ester moiety; α, β-unsaturated acids such as acrylic acid and methacrylic acid; unsaturated group-containing divalent carboxylic acids such as maleic acid, fumaric acid and itaconic acid; aromatic vinyl compounds such as styrene and α-methylstyrene; α, β-unsaturated nitrile such as acrylonitrile and methacrylonitrile; maleic anhydride, maleimide, N-substituted maleimide, and glutaric anhydride, which can be used alone or in combination of two or more monomers.

In addition, an acrylic compound used in the present invention may have a ring structure, and concrete examples thereof include a lactone ring structure, a glutaric anhydride structure, a glutarimide structure, an N-substituted maleimide structure and a maleic anhydride structure, and a pyran ring structure.

Among these examples, from the viewpoint of heat decomposition resistance and flowability of a copolymer, the other copolymerizable monomer is preferably alkyl acrylate having an alkyl group with 1 to 18 carbon atoms, a vinyl monomer having an amide group such as acryloylmorpholine and dimethyl acrylamide, a methacrylic acid ester or an acrylic acid ester having an alicyclic hydrocarbon group with 5 to 22 carbon atoms in an ester moiety, an N-substituted maleimide structure, a pyran ring structure, and the like.

Specific examples of the alkyl acrylate having an alkyl group with 1 to 18 carbon atoms include methyl acrylate, ethyl acrylate, n-propyl acrylate, n-butyl acrylate, s-butyl acrylate, and 2-ethylhexylacrylate, and a preferable example includes methyl acrylate.

Specific examples of the vinyl monomer having an amide group include acrylamide, N-methylacrylamide, N-butylacrylamide, N,N-dimethylacrylamide, N,N-diethylacrylamide, acryloylmorpholine, N-hydroxyethylacrylamide, acryloylpyrrolidine, acryloylpiperidine, methacrylamide, N-methylmethacrylamide, N-butylmethacrylamide, N,N-dimethylmethacrylamide, N,N-diethylmethacrylamide, methacryloyl morpholine, N-hydroxyethylmethacrylamide, methacryloylpyrrolidine, methacryloylpiperidine, N-vinylformamide, N-vinylacetoamide and vinylpyrrolidone. Preferable examples include acryloylmorpholine, N,N-dimethylacrylamide, N-butylacrylamide, vinylpyrrolidone and 2-hydroxyethyl methacrylate.

Specific examples of the methacrylic acid ester or acrylic acid ester having an alicyclic hydrocarbon group with 5 to 22 carbon atoms in an ester moiety include cyclopentyl acrylate, cyclohexyl acrylate, methylcyclohexyl acrylate, trimethylcyclohexyl acrylate, norbornyl acrylate, norbornylmethyl acrylate, cyanonorbornyl acrylate, isobornyl acrylate, bornyl acrylate, menthyl acrylate, fenchyl acrylate, adamantyl acrylate, dimethyladamantyl acrylate, tricyclo[5.2.1.0$^{2,6}$]deca-8-yl acrylate, tricyclo[5.2.1.0$^{2,6}$]deca-4-methyl acrylate, cyclodecyl acrylate, cyclopentylmethacrylate, cyclohexylmethacrylate, methylcyclohexyl methacrylate, trimethylcyclohexyl methacrylate, norbornyl methacrylate, norbornylmethyl methacrylate, cyanonorbornyl methacrylate, phenylnorbornyl methacrylate, isobornyl methacrylate, bornyl methacrylate, menthyl methacrylate, fenchyl methacrylate, adamantyl methacrylate, dimethyladamantyl methacrylate, tricyclo[5.2.1.0$^{2,6}$]deca-8-yl methacrylate, tricyclo[5.2.1.0$^{2,6}$]deca-4-methyl methacrylate, cyclodecyl methacrylate, and dicyclopentanyl methacrylate.

Preferable examples include isobornyl methacrylate, dicyclopentanyl methacrylate and dimethyladamantyl methacrylate.

Specific examples of the N-substituted maleimide include N-methyl maleimide, N-ethyl maleimide, N-propyl maleimide, N-i-propylmaleimide, N-butylmaleimide, N-i-butylmaleimide, N-t-butyl maleimide, N-lauryl maleimide, N-cyclohexyl maleimide, N-benzyl maleimide, N-phenyl maleimide, N-(2-chlorophenyl)maleimide, N-(4-chlorophenyl)maleimide, N-(4-bromophenyl)maleimide, N-(2-methylphenyl)maleimide, N-(2-ethylphenyl)maleimide, N-(2-methoxyphenyl)maleimide, N-(2,4,6-trimethylphenyl) maleimide, N-(4-benzylphenyl)maleimide and N-(2,4,6-tribromophenyl)maleimide.

Preferable examples include N-methyl maleimide, N-cyclohexyl maleimide and N-phenyl maleimide.

Commercially available products can be directly used as these monomers.

The acrylic compound has a weight average molecular weight (Mw) preferably within the range of 15000 or less, more preferably within the range of 10000 or less, and further more preferably within the range from 5000 to 10000, from the viewpoint that both control of moisture permeability and compatibility with a cellulose ester are simultaneously attained.

Note that the weight average molecular weight (Mw) of the acrylic compound according to the present invention is calculated by a measurement using gel permeation chromatography (GPC) under the measurement conditions described below.

Solvent: Tetrahydrofuran
Column: TSKgel SuperHM-M (manufactured by TOSOH CORPORATION)
Column temperature: 40° C.
Sample concentration: 0.1% by mass
Apparatus: HLC-8220 (manufactured by TOSOH CORPORATION)
Flow rate: 0.6 ml/min
Calibration curve: Standard polystyrene STK standard polystyrene (manufactured by TOSOH CORPORATION), calibration curves from 13 samples having Mw=1000000 to 500 are used. 13 samples should be spaced approximately equally.

A production method of an acrylic compound is not particularly limited and any of known methods such as suspension polymerization, emulsion polymerization, mass polymerization, and solution polymerization may be used. As a polymerization initiator, general peroxide-based and azo-based polymerization initiators can be used, or a redox-based polymerization initiators can also be used. As for the polymerization temperature, polymerization can be carried out within the range from 30 to 100° C. in suspension or emulsion polymerization, and within the range from 80 to 160° C. in mass or solution polymerization. Polymerization can also be carried out using alkyl mercaptan, or the like, as a chain transfer agent in order to control a reduced viscosity of an obtained copolymer.

The acrylic copolymer can be added within the range from 1 to 30 parts by mass with respect to 100 parts by mass of a cellulose ester.

<Other Plasticizers>

A styrene compound can also be added to the film of the present embodiment for the purpose of improvement in water resistance of the film in addition to or in place of the above described sugar ester compounds, polyester compounds, and acrylic compounds.

(Styrene Compound)

The styrene compound may be a single polymer of a styrene monomer or a copolymer of a styrene monomer and a copolymerizable monomer other than the styrene monomer. A ratio of containing a structural unit derived from a styrene monomer in the styrene compound can be preferably from 30 to 100% by mol, and more preferably from 50 to 100% by mol in order that the molecular structure has a certain level or more of bulkiness.

The styrene monomer is preferably a compound expressed by the formula (A) described below.

[Chem. 30]

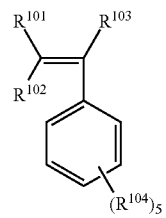

Formula (A)

$R^{101}$ to $R^{103}$ in the formula (A) each independently represent a hydrogen atom, or an alkyl group having 1 to 30 carbon atoms or an aryl group. $R^{104}$ represents a hydrogen atom, an alkyl group having 1 to 30 carbon atoms, a cycloalkyl group, an aryl group, an alkoxy group having 1 to 30 carbon atoms, an aryloxy group, an alkyloxycarbonyl group having 2 to 30 carbon atoms, an aryloxycarbonyl group, an alkylcarbonyloxy group having 2 to 30 carbon atoms, an arylcarbonyloxy group, a hydroxyl group, a carboxyl group, a cyano group, an amino group, an amide group, and a nitro group. These groups may each further have a substituent (for example, a hydroxyl group, a halogen atom, and an alkyl group). $R^{104}$ may be the same or different respectively and form a ring by bonding one another.

Examples of the styrene monomer include styrene; alkyl substituted styrenes such as α-methyl styrene, β-methyl styrene, and p-methyl styrene; halogen substituted styrenes such as 4-chlorostyrene and 4-bromostyrene; hydroxystyrenes such as p-hydroxystyrene, α-methyl-p-hydroxystyrene, 2-methyl-4-hydroxystyrene and 3,4-dihydroxystyrene; vinylbenzyl alcohols; alkoxy substituted styrenes such as p-methoxystyrene, p-tert-butoxystyrene and m-tert-butoxystyrene; vinyl benzoic acids such as 3-vinyl benzoic acid and 4-vinyl benzoic acid; 4-vinylbenzyl acetate; 4-acetoxystyrene; amide styrenes such as 2-butylamidestyrene, 4-methylamidestyrene and p-sulfoneamidestyrene; aminostyrenes such as 3-aminostyrene, 4-aminostyrene, 2-isopropenyl aniline and vinylbenzyldimethylamine; nitrostyrenes such as 3-nitrostyrene and 4-nitrostyrene; cyanostyrenes such as 3-cyanostyrene and 4-cyanostyrene; vinylphenylacetonitrile; arylstyrenes such as phenyl styrene, and indenes. The styrene monomers may be used alone or in combination of two or more kinds.

Examples of a copolymerizable monomer combined with a styrene monomer include a (meth)acrylic acid ester compound expressed by the formula (B) described below, acid anhydrides such as maleic anhydride, citraconic anhydride, cis-1-cyclohexene-1,2-dicarboxylic anhydride, 3-methyl-cis-1-cyclohexene-1,2-dicarboxylic anhydride, 4-methyl-cis-1-cyclohexene-1,2-dicarboxylic anhydride, nitrile group-containing radical polymerizable monomers such as acrylonitrile and methacrylonitrile; amide bond-containing radical polymerizable monomers such as acrylamide, methacrylamide and trifluoromethane sulfonylaminoethyl(meth) acrylate; vinyl fatty acids such as vinyl acetate; chlorine-containing radical polymerizable monomers such as vinyl chloride and vinylidene chloride; and conjugated diolefins such as 1,3-butadiene, isoprene and 1,4-dimethylbutadiene, and an preferable example includes a (meth)acrylic acid ester compound expressed by the formula (B) described below or maleic anhydride.

[Chem. 31]

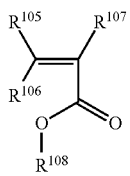

Formula (B)

$R^{105}$ to $R^{107}$ in the formula (B) each independently represent a hydrogen atom or an alkyl group having 1 to 30 carbon atoms or an aryl group. $R^{108}$ represents a hydrogen atom, an alkyl group having 1 to 30 carbon atoms, a cycloalkyl group, or an aryl group. These groups may each also further have a substituent (for example, a hydroxyl group, a halogen atom and an alkyl group).

Examples of the (meth)acrylic acid ester compound include methyl(meth)acrylate, ethyl(meth)acrylate, (i-, n-)propyl(meth)acrylate, (n-, i-, s-, tert-)butyl(meth)acrylate, (n-, i-, s-)pentyl(meth)acrylate, (n-, i-) hexyl(meth)acrylate, (n-, i-) heptyl(meth)acrylate, (n-, i-)octyl(meth)acrylate, (n-, i-) nonyl(meth)acrylate, (n-, i-)myristyl(meth)acrylate, (2-ethylhexyl)(meth)acrylate, (ε-caprolactone)(meth)acrylate, (2-hydroxyethyl)(meth)acrylate, (2-hydroxy propyl)(meth)acrylate, (3-hydroxy propyl)(meth)acrylate, (4-hydroxybutyl)(meth)acrylate, (2-hydroxybutyl)(meth)acrylate, (2-methoxyethyl)(meth)acrylate, (2-ethoxyethyl)(meth)acrylate phenyl acrylate, phenyl(meth)acrylate, (2 or 4-chlorophenyl)(meth)acrylate, (2 or 3 or 4-ethoxycarbonyl-phenyl)(meth)acrylate, (o or m or p-tolyl)(meth)acrylate, benzyl(meth)acrylate, phenethyl(meth)acrylate, (2-naph-thyl)(meth)acrylate, cyclohexyl(meth)acrylate, (4-methyl-cyclohexyl)(meth)acrylate, and (4-ethylcyclohexyl)(meth)acrylate.

Specific examples of the styrene compound include a styrene/maleic anhydride copolymer, a styrene/acrylic acid ester copolymer, a styrene/hydroxystyrene copolymer, and a styrene/acetoxystyrene copolymer. In particular, styrene/maleic anhydride copolymer is preferable.

The styrene compound can be added in an amount within the range from 1 to 30 parts by mass with respect to 100 parts by mass of a cellulose ester.

(Others)

In the film of the present embodiment, a known plasticizer having a molecular weight of 15000 or less, preferably 10000 or less can also be used in addition to or in place of the above described sugar ester compound, polyester compound, acrylic compound and styrene compound. The other plasticizer is not particularly limited and is preferably selected from polyvalent carboxylic acid ester plasticizer, glycolate plasticizer, a phthalic acid ester plasticizer, a fatty acid ester plasticizer and a polyvalent alcohol ester plasticizer. Among them, a preferable plasticizer is a polyvalent alcohol ester plasticizer.

From the viewpoint of effectively controlling moisture permeability, examples of a preferable polyvalent alcohol ester plasticizer include compounds described in paragraphs (0127) to (0170) in JP 2010-32655. In particular, pentaerythritol tetrabenzoate is preferably used.

These plasticizers are preferably contained in an amount within the range from 6 to 40 parts by mass, and more preferably within the range from 10 to 20 parts by mass with respect to 100 parts by mass of a cellulose ester.

(c) Hydrogen Bonding Compound

The film of the present embodiment preferably contains a hydrogen bonding compound in order to reduce fluctuation in a retardation value Rt(590) due to variation of humidity.

The hydrogen bonding compound preferably contains at least plural functional groups selected from a hydroxy group, an amino group, a thiol group and a carboxylic acid group in one molecule, more preferably contains plural different functional groups in one molecule, and particularly preferably contains a hydroxy group and a carboxylic acid group in one molecule.

The hydrogen bonding compound preferably contains 1 or 2 aromatic rings as the nucleus, and a value obtained by dividing the number of the above described functional groups contained in one molecule by the molecular weight of the compound is preferably 0.01 or more.

The above described effect is presumed to be on the grounds that the hydrogen bonding compound is bonded (hydrogen bond) to a site of interaction (hydrogen bond) between the cellulose ester and a water molecule and acts so as to suppress variation in electric charge distribution due to desorption of the water molecule.

Specific examples of the compound include compounds described in the paragraph [0029] in JP 2011-227508, and 3-methyl salicylate is preferably used.

The hydrogen bonding compound can be added in an amount within the range from 1 to 30 parts by mass with respect to 100 parts by mass of cellulose ester.

(d) Other Optional Components

The retardation film according to the present embodiment can contain other optional components such as an antioxidant, a coloring agent, an ultraviolet absorber, a matting agent, acrylic particles, a hydrogen bonding solvent, and an ionic surfactant. These components can be contained in an amount within the range from 0.01 to 20 parts by mass with respect to 100 parts by mass of a cellulose ester.

<Antioxidant>

In the film of the present embodiment, generally known antioxidants can be used as the antioxidant. In particular, respective lactone-based, sulfur-based, phenol-based, double bond-based, hindered amine-based, phosphorus-based compounds can be preferably used.

Examples of the above described lactone-based compounds include "IrgafosXP40 and IrgafosXP60 (product names)" which are commercially available from BASF Japan Co., Ltd.

Examples of the above described sulfur-based compounds include "Sumilizer TPL-R" and "Sumilizer TP-D" which are commercially available from Sumitomo Chemical Co., Ltd.

As the above described phenol-based compound, a compound having the structure of 2,6-dialkylphenol is preferable, and examples thereof include "Irganox1076" and "Irganox1010" which are commercially available from BASF Japan Co., Ltd. and "ADEKASTAB AO-50" which is commercially available from ADEKA Co., Ltd.

The above described double bond-based compounds are commercially available from Sumitomo Chemical Co., Ltd. as the product names of "Sumilizer GM" and "Sumilizer GS". In general, a double bond-based compound is preferably added in an amount within the range from 0.05 to 20% by mass, and preferably within the range from 0.1 to 1% by mass to a resin.

Examples of the above described hindered amine-based compounds include "Tinuvin144" and "Tinuvin770" which are commercially available from BASF Japan Co., Ltd., and "ADK STAB LA-52" which is commercially available from ADEKA Co., Ltd.

Examples of the above described phosphorus-based compounds include "SumilizerGP" which is commercially available from Sumitomo Chemical Co., Ltd., "ADK STAB PEP-24G", "ADK STAB PEP-36" and "ADK STAB 3010" which are commercially available from ADEKA Co., Ltd., "IRGAFOS P-EPQ" which is commercially available from BASF Japan Co., Ltd., and "GSY-P101" which is commercially available from Sakai Chemical Industry Co., Ltd.

A compound having an epoxy group as described in U.S. Pat. No. 4,137,201 can also be further contained as an acid scavenger.

Amounts of adding these antioxidants and the like are suitably determined according to a step when used for recycling, and are generally added within the range from 0.05 to 20% by mass, and preferably within the range from 0.1 to 1% by mass, with respect to a resin (cellulose ester) that is the primary material of the film.

Synergistic effects can be obtained by using several kinds of different compounds of these antioxidants in combination rather than using only one kind. For example, a combination use of lactone-based, phosphorus-based, phenol-based and double bond-based compounds are preferable.

<Coloring Agent>

The film of the present invention preferably contains a coloring agent in order to adjust color tone within the range where the effect of the present invention is not damaged. The coloring agent means a dye or a pigment, and in the present invention indicates one having effects of turning a color tone of a liquid crystal screen into a blue tone or adjusting a yellow index and reducing a haze.

Various dyes and pigments can be used as the coloring agent, and anthraquinone dyes, azo dyes, phthalocyanine dyes, and the like, are effective.

<Ultraviolet Absorber>

The film of the present invention preferably contains an ultraviolet absorber for the purpose of imparting an ultraviolet absorbing function since it is preferably used in a polarizing plate in the visible side and backlight side.

The ultraviolet absorber is not particularly limited and examples thereof include benzotriazole-based, 2-hydroxybenzophenone-based or salicylic acid phenyl ester-based ultraviolet absorbers. For instance, triazoles such as 2-(5-methyl-2-hydroxyphenyl)benzotriazole, 2-[2-hydroxy-3,5-bis($\alpha,\alpha$-dimethylbenzyl)phenyl]-2H-benzo triazole and 2-(3,5-di-t-butyl-2-hydroxyphenyl)benzotriazole, and benzophenones such as 2-hydroxy-4-methoxybenzophenone, 2-hydroxy-4-octoxybenzophenone and 2,2'-dihydroxy-4-methoxybenzophenone can be cited.

Note that, among ultraviolet absorbers, an ultraviolet absorber having a molecular weight of 400 or more is preferable from the viewpoint that weather resistance can be effectively improved with addition of a relatively small amount since such an ultraviolet absorber hardly sublimes, or hardly vaporizes due to having a high boiling point and is thus hardly scattered even at the time of drying the film at a high temperature.

Examples of an ultraviolet absorber having a molecular weight of 400 or more include a benzotriazole-based ultraviolet absorber such as 2-[2-hydroxy-3,5-bis($\alpha,\alpha$-dimethylbenzyl)phenyl]-2-benzotriazole and 2,2-methylenebis[4-(1,1,3,3-tetrabutyl)-6-(2H-benzotriazole-2-yl)phenol]; a hindered amine-based ultraviolet absorber such as bis(2,2,6,6-tetramethyl-4-piperidyl)sebacate and bis(1,2,2,6,6-pentamethyl-4-piperidyl)sebacate; and a hybrid-based ultraviolet absorber having both of the hindered phenol and hindered amine structures in a molecule such as 2-(3,5-di-t-butyl-4-hydroxybenzyl)-2-n-butylmalonic acid bis(1,2,2,6,6-pentamethyl-4-piperidyl) and 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethyl piperidine, which can be used alone or in combination of two or more kinds. Among these examples, 2-[2-hydroxy-3,5-bis($\alpha,\alpha$-dimethylbenzyl)phenyl]-2-benzotriazole and 2,2-methylenebis[4-(1,1,3,3-tetrabutyl)-6-(2H-benzotriazole-2-yl)phenol] are particularly preferable.

As these ultraviolet absorbers, commercially available products may also be used and, for example, Tinuvin series such as such as Tinuvin 109, Tinuvin 171, Tinuvin 234, Tinuvin 326, Tinuvin 327, Tinuvin 328 and Tinuvin 928 manufactured by BASF Japan Co., Ltd., or 2,2'-methylenebis[6-(2H-benzotriazole-2-yl)-4-(1,1,3,3-tetramethylbutyl)phenol] (molecular weight 659; LA31 manufactured by ADEKA Co., Ltd. as an example of an commercially available product) can be preferably used.

The above described ultraviolet absorbers can be used alone or in combination of two or more kinds.

An amount in use of an ultraviolet absorber is not uniform according to a kind of ultraviolet absorbers, use conditions, and the kike, and is generally added within the range from 0.05 to 10% by mass, and preferably within the range from 0.1 to 5% by mass with respect to a resin (cellulose ester).

<Matting Agent>

In the film of the present invention, fine particles to give a sliding property (a matting agent) are preferably added.

As a matting agent, both of an inorganic compound and an organic compound may be used as long as they do not damage transparency of an obtained film and have heat resistance in melting. These matting agents can be used alone or in combination of two or more kinds.

Both transparency and a sliding property can be highly attained at the same time by using particles with different particle sizes and shapes (such as needle shape and spherical shape) in combination.

Among them, silicon dioxide which is excellent in transparency (haze) is particularly preferably used since it has a refractive index close to the above described acrylic copolymer and a cellulose ester used as a resin to be phase-solubilized.

As specific examples of silicon dioxide, commercially available products having product names of aerosil 200V, aerosil R972V, aerosil R972, R974, R812, 200, 300, R202, OX50, TT600 and NAX50 (manufactured by NIPPON AEROSIL CO., Ltd.), SEAHOSTAR KEP-10, SEAHOSTAR KEP-30 and SEAHOSTAR KEP-50 (manufactured by Nippon Shokubai Co., Ltd.), Sylophobic 100 (manufactured by Fuji Silysia Chemical Co., Ltd.), Nipsil E220A (manufactured by Nippon Silica Kogyo Co., Ltd.), and ADMAFINE SO (manufactured by Admatechs Co., Ltd.) can be preferably used.

As a shape of a particle, an amorphous shape, a needle shape, a flat shape, a spherical shape, and the like, can be used without particular limitation and, in particular, use of a spherical particle is preferable since good transparency of an obtained film can be attained.

The size of a particle is preferably smaller than the wavelength of the visible light since, when the particle size is close to the wavelength of the visible light, light is scattered and transparency deteriorates, and more preferably ½ or less than the wavelength of the visible light. When the particle size is too small, there is a case of not improving a sliding property and the particle size is therefore particularly preferably within the range from 80 nm to 180 nm. Note that the particle size means a size of an aggregate when the particle is the aggregate of primary particles. In addition, when the particle is not in a spherical shape, the particle size means a diameter of a circle corresponding to its projected area.

A matting agent is preferably added in an amount within the range from 0.05 to 10% by mass, and preferably within the range from 0.1 to 5% by mass with respect to a resin (cellulose ester).

<Acrylic Particles>

The film of the present invention may contain acrylic particles described in WO 2010/001668 within the range where transparency can be maintained for the purpose of improving brittleness of the film.

Examples of commercially available products of such a multilayer structured acrylic particle complex include "METABLEN W-341" manufactured by Mitsubishi Rayon Corporation, "Kane Ace" manufactured by Kaneka Corporation, "PARALOID" manufactured by Kureha Corporation, "Acryloid" manufactured by Rohm and Haas Co., "Staphyloid" manufactured by Ganz Chemical Corporation, Chemisnow MR-2G, MS-300X (which are manufactured by Soken Chemical & Engineering Co., Ltd.) and "PARAPET SA" manufactured by Kuraray Corporation, which can be used alone or in combination of two or more kinds.

<Hydrogen Bonding Solvent>

In the present invention, when a film is produced in a solution flow-casting method, a hydrogen bonding solvent can be added to a solvent for dissolving constituting materials of the film for the purpose of adjusting (reducing) the solution viscosity. As described in "Intermolecular and Surface Forces" by J. N. Israel Achivili (translated by Tamotsu Kondo and Hiroyuki Oshima, McGraw-Hill Publishing Company, 1991), hydrogen bonding solvents refer to organic solvents which are capable of resulting in "bonding" via a hydrogen atom, which is formed between an electrically negative atom (oxygen, nitrogen, fluorine, or chlorine) and a hydrogen atom that has formed a covalent bond with the above electrically negative atom, and namely refer to organic solvents which exhibit a large bonding moment and incorporate any of the hydrogen containing bonds such as O—H (an oxygen hydrogen bond), N—H (a nitrogen hydrogen bond), or F—H (a fluorine hydrogen bond) so that adjacent molecules can be arranged with each other.

By forming a stronger hydrogen bond between the resin and a hydrogen bonding solvent than an intramolecular hydrogen bond of an acrylic copolymer and a cellulose ester resin, or a mixture itself of other resins for phase-solubilizing, variation in a solution viscosity can be expected.

In a solution flow-casting method conducted in the present invention, a part or the total amount of a hydrogen bonding solvent can also be used as a solvent for dissolution to the resin solution in use for the purpose of reducing peeling force at the time of film production in addition to adjusting the solution viscosity.

<Ionic Surfactant>

An ionic surfactant is preferably added to the film of the present invention for the purpose of reducing peeling force in film production.

Examples of an ionic surfactant that can be used in the present invention include cationic surfactants, anionic surfactants and amphoteric surfactants.

Examples of the cationic surfactants include an aliphatic amine salt, an aliphatic quaternary ammonium salt, a benzalkonium salt, benzethonium chloride, a pyridinium salt and an imidazolium salt.

Examples of the anionic surfactants include higher alcohol ($C_8$ to $C_{22}$) sulfuric acid ester salts (e.g., sodium salt of lauryl alcohol sulfate, sodium salt of octyl alcohol sulfate, an ammonium salt of lauryl alcohol sulfate, "Teepol-81" (product name, manufactured by Shell Chemicals Corporation), and disodium alkyl sulfate), aliphatic alcohol phosphoric acid ester salts (e.g., a sodium salt of cetyl alcohol phosphoric acid ester), alkylaryl sulfonic acid salts (e.g., sodium salt of dodecylbenzene sulfonic acid, sodium salt of isopropylnaphthalene sulfonic acid, sodium salt of dinaphthalene disulfonic acid, and sodium salt of methanitrobenzene sulfonic acid), sulfonic acid salts of alkylamide (e.g., $C_{17}H_{33}CON(CH_3)CH_2SO_3Na$), and sulfonic acid salts of dibasic fatty acid esters (e.g., sodium sulfosuccinate dioctyl ester and sodium sulfosuccinate dihexyl ester). Among these anionic surfactants, sulfuric acid salts and sulfonic acid salts are particularly preferably used.

Examples of the amphoteric surfactants include carboxy betaine type, sulfobetaine type, amino carboxylic acid salt, and imidazolium betaine.

In particular, an anionic surfactant is preferable in the present invention. The above described surfactant is preferably used in an amount from 0.01% by mass or more and 5% by mass or less, more preferably from 0.05% by mass or more and 3% by mass or less, further more preferably from 0.2% by mass or more and 2% by mass or less with respect to the total amount of a resin constituting the film. When the adding amount is larger than this range, a surfactant is deposited from the film, a hygroscopic property of the film is increased and a quality that is unfavorable for the quality of an optical film is exhibited. When the adding amount is less than this range, the effect of the present invention of using a surfactant cannot be obtained.

As described above, the retardation film of the present invention (1) has a film thickness of 15 μm or more and less than 40 μm, (2) has a film thickness variation of 0 to 4 μm both in the widthwise direction and the lengthwise direction, (3) satisfies an Rt humidity fluctuation expressed by the above described formula (1) of 1% to 12%. Examples of control factors of the above described (1) to (3) include (a) flow-casting conditions of a dope and a molten product, (b) stretching conditions, (c) a kind and a substitution degree of an acyl group in a cellulose ester, (d) a kind and an adding amount of a retardation increasing agent, and (e) a kind and an adding amount of a plasticizer, and at least two among the control factors are controlled. A substitution degree of a cellulose ester and at least one of the above described control factors are preferably controlled, a substitution degree of a cellulose ester and at least two of the above described control factors are more preferably controlled, and a substitution degree of a cellulose ester and at least three of the above described control factors are furthermore preferably controlled.

For example, the retardation film according to one embodiment of the present invention has a total substitution degree of a cellulose ester of 2.1 to 2.5 (preferably 2.15 to 2.35), and contains at least one kind of a retardation increasing agent (preferably a retardation increasing agent expressed by the above described general formula (I)).

The retardation film according to another embodiment of the present invention has a total substitution degree of a cellulose ester of 2.1 to 2.5 (preferably 2.15 to 2.35), and contains at least one plasticizer selected from the group consisting of a sugar ester compound, a polyester compound, and an acrylic compound. The plasticizer more preferably contains a sugar ester compound.

The retardation film according to another embodiment of the present invention also has a total substitution degree of a cellulose ester of 2.1 to 2.5 (preferably 2.15 to 2.35) and contains a hydrogen bonding compound.

(Physical Properties of Film)

Hereinbelow, physical properties, and the like, of the retardation film in the present invention will be explained.

(Transparency)

As an index for judging transparency of the film of the present invention, a haze value (turbidity) is used. In particular, a liquid crystal display used outside is required to obtain sufficient brightness and high contrast even in a well-lighted place, a haze value is preferably 1.0% or less, and more preferably 0.5% or less. When the film is used as a scattering film, the haze value may exceed the above described range.

The film of the present invention preferably has a total light transmittance of 90% or more, and more preferably 93% or more. The practical upper limit is about 99%.

The haze value and transmittance can be measured using a haze meter.

A film that satisfies the above described physical properties can also be preferably used as a polarizing plate protecting film for a large-size liquid crystal display or a liquid crystal display for an outside use.

(Production Method of Film)

Next, a method for producing the retardation film of the present invention will be explained. The present invention is not limited thereto.

For a method for producing the film of the present invention, production methods such as a general inflation method, T-die method, calendaring method, cutting method, flow-casting method, emulsion method, and hot press method can be employed, but the solution flow-casting film production method or the melt flow-casting film production method is preferable for the film production method from the viewpoints of suppression of coloration, suppression of contaminant defects, and suppression of optical defects such as die line, and the solution flow-casting method is particularly preferable in order to obtain a uniform surface.

<Solution Flow-Casting Film Production Method>

When a film is produced by a solution flow-casting method, a method for producing the film of the present invention preferably includes a step of preparing a dope by dissolving a cellulose ester and the above described additives into a solvent (dissolution step; dope preparation step), a step of flow-casting the dope on a seamless metallic support that unlimitedly transfers (flow-casting step), a step of drying the flow-cast dope as a web (solvent evaporation step), a step of peeling off from the metallic support (peeling step), a step of drying, stretching and maintaining the width (stretching, width maintenance, drying step), and a step of winding the finished film (winding step).

FIG. 1 is a view schematically showing one example of a dope preparation step, and a flow-casting step and a drying step (solvent evaporation step) in a preferable solution flow-casting film production method that is preferable for the present invention.

A large aggregate is removed from a charge furnace 41 by a filter 44 to send a solution to a stock tank 42. Then, various additive solutions are added to a main dope dissolution furnace 1 from the stock tank 42.

The main dope is then filtered in a main filter 3, and the additive solutions are added to the main dope from 16 inlinely.

In many cases, the main dope may contain a return material in an amount of about 10 to 50% by mass.

The return material means a material obtained by finely crushing a retardation film, and a material obtained by cutting both sides of a film and a film whole cloth that is out of specification because of scratch, and the like, which are generated at the time of producing a retardation film, are used.

In addition, materials obtained by previously pelletizing a cellulose ester, other additives, and the like are preferably used as raw materials of a resin used in preparation of a dope.

Hereinbelow, each step will be explained.

1) Dissolution Step (Dope Preparation Step)

This step is a step of forming a dope by dissolving a cellulose ester into a solvent mainly containing a good solvent to the cellulose ester in a dissolution furnace while stirring the cellulose ester, depending on a case, with other compounds, or a step of forming a dope that is a main dissolving solution by mixing, depending on a case, other compound solutions into the cellulose ester solution.

The concentration of the cellulose ester in a dope is desirably higher since a dry load after flow-casting onto a metallic support can be reduced, but when the concentration of the cellulose ester is too high, a load at the time of filtration is increased and filtration accuracy deteriorates. A concentration to satisfy both points is preferably from 10 to 35% by mass, and more preferably from 15 to 25% by mass.

A solvent used in a dope may be used solely or in combination of two or more kinds, and a use of a good solvent and a poor solvent of a cellulose ester in mixture is preferable from the viewpoint of production efficiency, and a use of a larger amount of a good solvent is preferable from the viewpoint of solubility of the cellulose acetate.

As preferable ranges of mixing ratios of a good solvent and a poor solvent, the good solvent is from 70 to 98% by mass, and a poor solvent is from 2 to 30% by mass. The good solvent is defined to be a solvent that dissolves a cellulose ester to be used singly as a good solvent and the poor solvent is defined to be a solvent that does not swell or dissolve a cellulose ester singly as a poor solvent. Therefore, a good solvent and a poor solvent are changed depending on an average substitution degree of a cellulose ester.

A good solvent used in the present invention is not particularly limited and examples thereof include organic halogen compounds such as methylene chloride, dioxorans, acetone, methyl acetate and methyl acetoacetate. Particularly preferable examples include methylene chloride and methyl acetate.

A poor solvent used in the present invention is not particularly limited and examples such as methanol, ethanol, n-butanol, cyclohexane and cyclohexanone are preferably used. In addition, 0.01 to 2% by mass of water is preferably contained in a dope.

For a solvent used for dissolution of a cellulose ester, a solvent that is removed from a film by drying in a film production step is recovered and the solvent is recycled to be used.

In the recovered solvent, additives added in cellulose acetate, for example, a plasticizer, an ultraviolet absorber, a polymer and a monomer component may be contained in a trace amount in cases, but even though these additives are contained, the solvent can be preferably recycled, and can also be purified, if necessary, to be recycled.

As a method of dissolving a cellulose ester when the above described dope is prepared, a general method can be employed. Specifically, various dissolution methods can be employed; such as a method of performing under the ambient pressure, a method of performing under a temperature below the boiling point of the main solvent, a method of performing under a temperature above the boiling point of the main solvent while applying a pressure, a method of performing a cooling dissolving method as described in JP H09-95544, JP H09-95557 or JP H09-95538, and a method of performing under a high pressure as described in JP H11-21379. In particular, a method of performing under a temperature of the boiling point or higher of the main solvent while applying a pressure is preferable, which can heat at the boiling point or higher under the ambient pressure when heating and pressurization are combined.

A method of dissolving the cellulose ester by stirring while heating at a temperature within the range from a boiling point or higher of a solvent under a normal pressure to a temperature at which the solvent does not boil under pressurization is also preferable since generation of undissolved block substances called gel and lump is prevented.

In addition, a method of mixing cellulose acetate with a poor solvent to be humidified or swollen and then further adding a good solvent to dissolve cellulose acetate is also preferably used.

Pressurization may be carried out by a method of pressing an inert gas such as a nitrogen gas or a method of increasing a vapor pressure of a solvent by heating. Heating is preferably carried out from the outside and, for example, a jacket type is preferable since it is easy to control temperature.

A heating temperature after adding a solvent is preferably high from the viewpoint of solubility of cellulose acetate, but when the heating temperature is too high, a required pressure is increased and productivity thus deteriorates.

A heating temperature is preferably from 45 to 120° C., more preferably from 60 to 110° C., and further more preferably from 70° C. to 105° C. In addition, a pressure is adjusted so that a solvent does not boil at a preset temperature.

A cooling dissolution method is also preferably employed, thereby making it possible to dissolve a cellulose ester into a solvent such as methyl acetate.

Next, this cellulose ester solution (dope during dissolution or after dissolution) is preferably filtered using an appropriate filter medium such as filter paper.

As a filter medium, one having a small absolute filtration accuracy is preferable in order to remove undissolved substances, and the like, but a too small absolute filtration accuracy causes a problem such that clogging of a filter medium easily occurs. Therefore, a filter medium with an absolute filtration accuracy of 0.008 mm or less is preferable, a filter medium with an absolute filtration accuracy of 0.001 to 0.008 mm is more preferable, and a filter medium with an absolute filtration accuracy of 0.003 to 0.006 mm is further more preferable.

A material of a filter medium is not particularly limited, and a general filter medium can be used, and a plastic filter medium such as polypropylene, Teflon (registered trademark) and a metallic filter medium such as stainless steel are preferable because of no falling of fibers, and the like.

Impurities, particularly, a luminescent spot foreign matter, which is contained in the raw material cellulose acetate, is preferably removed and reduced by filtration.

The luminescent spot foreign matter means a spot (foreign matter) from which leaked light is seen from the opposite side when two polarizing plates are placed in a crossed nichol state, a film, or the like, is placed between the polarizing plates, and light is irradiated from a side of one polarizing plate to observe from the other side of polarizing plate, and the number of luminescent spots having a diameter of 0.01 mm or more is preferably 200 spots/cm$^2$ or less.

The number of luminescent spots is more preferably 100 spots/cm$^2$ or less, more preferably 50 spots/m$^2$ or less, and further more preferably 0 to 10 spots/cm$^2$ or less. In addition, luminescent spots with a diameter of 0.01 mm or less are preferably less.

Filtration of a dope can be carried out by a general method, a method of filtering while heating at a boiling point of a solvent or higher under a normal pressure and at a temperature within a range where the solvent does not boil under pressurization is preferable since a difference in filtration pressures before and after filtration (called differential pressure) is small.

The temperature is preferably from 45 to 120° C., more preferably from 45 to 70° C., and furthermore preferably from 45 to 55° C.

The filtration pressure is preferably small. The filtration pressure is preferably 1.6 MPa or less, more preferably 1.2 MPa or less, and further more preferably 1.0 MPa or less.

2) Flow-Casting Step

Subsequently, a dope is flow-cast (cast) on a metallic support. That is, this step is a step of sending a dope solution to a pressurized die 30 through a feeding pump (for example, a high pressure metering gear pump) and flow-casing the dope at a flow-casting position on a metallic support such as a seamless metallic belt 31 that endlessly transfers, for example, a stainless steel belt, or a rotating metallic drum from a pressurized die slit.

A pressurized die with which a uniform thickness is more easily obtained by adjusting the slit shape at the tip of a die is preferable. A pressurized die includes a coat-hanger die and a T die, either of which are preferably used. Two pressurized dies may be provided on a metallic support to increase a film producing rate and divide an amount of a dope to superimpose film layers. Alternatively, it is also desirable to obtain a film with a laminated structure by a co-flow-casting method to conduct flow-casting of plural dopes simultaneously.

The width of casting is preferably 1.4 m or more from the viewpoint of productivity. The width is more preferably from 1.4 to 4 m. In the case of above 4 m, there are possibilities of containing streaks in a production step and lowering stability in a transportation step after the production step. The width is further more preferably from 2.2 to 3.5 m from the viewpoints of transportation properties and productivity.

A metallic support in the flow-casting (casting) step is preferably a material with a mirror-finished surface and, as a metallic support, a stainless steel belt or a drum finished by plating the surface with a mold is preferably used.

A surface temperature of a metallic support in the flow-casting step is from −50° C. to a temperature of less than a boiling point of a solvent, the temperature is preferably high since a dry speed of a web can accelerate, but in the case of a too high temperature, a web may foam or flatness may deteriorate.

A preferable temperature of a metallic support is from 0 to 55° C., and more preferably from 25 to 50° C. Alternatively, peeling from a drum in the state of containing a large amount of a residual solvent after gelating a web by cooling is also a preferable method.

A method of controlling a temperature of a metallic support is not particularly limited, and examples include a method of blowing warm air or cold air to a metallic support and a method of bringing warm water into contact with the backside of a metallic support. The method of using warm water is preferable since heat transfer is effectively performed and a time until the temperature of the metallic support becomes constant is thus short. When warm air is used, air at a higher temperature than a desired temperature may be used.

3) Solvent Evaporation Step

The step is a step of heating a web (a dope film formed after the dope is flow-cast on a support for flow-casting is referred to as a web) on a support for flow-casting to evaporate the solvent.

In order to evaporate a solvent, there are a method of blowing an air from the web side and/or a method of heat-transferring from the back surface of a support using a liquid and a method of heat-transferring from both surfaces of a web using radiant heat, and the method of heat-transferring from the back surface using a liquid is preferable because of good drying efficiency. In addition, the above methods may also be preferably used in combination. The web on a support after flow-casting is preferably dried on the support under an atmosphere at 40 to 100° C. In order to keep under the atmosphere at 40 to 100° C., it is desirable that a warm air at the temperature is blown to the upper surface of the web or the web is heated by means of the infrared ray, or the like.

The web is preferably peeled off from a support within 30 to 120 seconds from the viewpoints of surface quality, moisture permeability and peeling properties.

4) Peeling Step

Subsequently, a web is peeled off from a metallic support. That is, the step is a step of peeling a web from which a solvent evaporates on the metallic support at a peeling position. The peeled web is sent to the next step.

A temperature at a peeling position on a metallic support is preferably set within the range from −50 to 40° C., more preferably within the range from 10 to 40° C., and the most preferably within the range from 15 to 30° C.

The amount of the residual solvent on the metallic support at the time of peeling the web is suitably adjusted depending on a degree of a drying condition, the length of the metallic support, and the like. The amount of the residual solvent at the time of peeling the web from the metallic support is preferably from 10 to 150% by mass in order that a retardation film shows preferable flatness. In the case of peeling it when the amount of the residual solvent is larger, if the web is too soft, the web may lose a flatness at the time of peeling, or apt to cause twist or longitudinal streak by the peeling tension, accordingly, the amount of the residual solvent at the time of peeling is determined in view of both of an economic speed and a quality. The amount of residual solvent at the time of peeling is more preferably from 20 to 40% by mass or from 60 to 130% by mass, and particularly preferably from 20 to 30% by mass or from 70 to 120% by mass.

The amount of the residual solvent is defined by the following formula in the present invention:

$$\text{Residual solvent amount(mass \%)} = \{(M-N)/N\} \times 100$$

wherein M represents a mass of a sample taken at any time during or after manufacturing a web or a film, and N represents a mass after heating M at 115° C. for 1 hour.

A peeling tension at the time of peeling a film from a metallic support is preferably 300 N/m or less. It is more preferably within the range from 196 to 245 N/m, and when wrinkles are easily included in peeling, it is preferable to peel at a tension of 190 N/m or less. It is preferable to peel at a peeling tension of 300 N/m or less.

5) Steps of Drying•Stretching•Maintaining Width (Drying)

In a step of drying a retardation film, a web is peeled from a metallic support and further dried, and an amount of a residual solvent is preferably 1% by mass or less, and more preferably 0.1% by mass or less, and particularly preferably 0 to 0.01% by mass or less.

In the film drying step, a web is dried while conveying it generally by a roll drying method (a method of drying a web by passing it alternately among a plurality of rolls arranged up and down) or a tenter method. For example, after peeling, a web is dried by using a drying apparatus 35 of conveying the web by passing it alternately among a plurality of rolls arranged in the drying apparatus and/or a tenter stretching apparatus 34 of conveying the web by clipping the both ends of the web with clips.

A technique of drying a web is not particularly limited, and can be generally carried out by hot air, infrared rays, heating rolls, microwave, and the like, but the drying is preferably conducted by use of hot air from the viewpoint of easiness and simplicity. Too rapid drying is apt to lose flatness of a completed film. Drying at a high temperature is preferably carried out from 8% by mass or less of a residual solvent. Throughout the whole, drying is usually carried out within the range from 40 and 250° C. Drying is particularly preferably carried out within the range from 40 to 200° C. A drying temperature is preferably increased in stages.

When a tenter stretching apparatus is used, it is preferable to use an apparatus capable of independently controlling either side of a gripped length (a distance from initiation of gripping to termination of gripping) of a film by a side-to-side gripping means of a tenter. In addition, it is preferable to intentionally form sections having different temperatures for the purpose of improvement in flatness in the tenter step.

It is also preferable to provide a neutral zone so that each section does not cause interference among sections having different temperatures.

(Stretching•Width Maintenance)

Subsequently, a web is preferably treated by stretching from a metallic support at least in one direction. By the stretching treatment, orientation of molecules in the film can be controlled. In order to obtain desired retardation values Ro and Rth in the present invention, a retardation film takes the structure of the present invention and, furthermore, a conveying tension is preferably controlled and a refractive index is preferably controlled by a stretching operation. For example, decreasing or increasing a tension in the lengthwise direction makes it possible to fluctuate a retardation value.

As a specific stretching method, the film can be biaxially stretching or uniaxially stretching sequentially or simultaneously in the lengthwise direction of the film (film production direction; flow-casting direction; MD direction) and in the direction perpendicular to the film plane, that is, the widthwise direction (TD direction). Preferable is a biaxially stretched film obtained by carrying out biaxial stretching in the flow-casting direction (MD direction) and the widthwise direction (TD direction), and the retardation film according to the present invention may be a uniaxially stretched film or an unstretched film. Note that the stretching operation may be performed dividedly in multiple stages. In addition, when biaxial stretching is carried out, simultaneous biaxial stretching may be conducted or biaxial stretching may be performed in stages. In this case, in stages means that, for example, stretching in different stretching directions can be sequentially carried out, stretching in the same direction is divided in multiple stages and stretching in the different direction can be added to any of the stages. That is, for example, stretching steps as follows are possible.

Stretching in the flow-casting direction→stretching in the widthwise direction→stretching in the flow-casting direction→stretching in the flow-casting direction Stretching in the widthwise direction→stretching in the widthwise direction→stretching in the flow-casting direction→stretching in the flow-casting direction In addition, simultaneous biaxial stretching also includes the case of stretching in one direction and shrinking the other side by easing a tension.

Each of draw ratios in the directions of two axes that are perpendicular to each other is finally preferably within the range from 0.8 to 1.5 times in the flow-casting direction and preferably within the range from 1.1 to 2.5 times in the widthwise direction, and more preferably within the range from 0.8 to 1.0 times in the flow-casting direction and more preferably within the range from 1.2 to 2.0 times in the widthwise direction.

A stretching temperature is usually preferably within the temperature range from Tg of a resin constituting a film to Tg+60° C. Stretching is usually carried out at a stretching temperature preferably from 120° C. to 200° C., more preferably from 150° C. to 200° C., and further more preferably from above 150° C. to 190° C. or less.

Stretching is carried out at a residual solvent in the film at the time of stretching of preferably from 20 to 0%, and more preferably from 15 to 0%. For example, the film is preferably stretched with a residual solvent at 155° C. of 11%, or preferably stretched with a residual solvent at 155° C. of 20. Alternatively, the film is preferably stretched with a residual solvent at 160° C. of 11%, or preferably stretched with a residual solvent at 160° C. of less than 1%.

A method of stretching a web is not particularly limited. Examples thereof include a method of having a circumferential velocity difference among a plurality of rolls and stretching in the lengthwise direction by use of the roll circumferential velocity difference among the rolls, a method of fixing both ends of a web with clips or pins and extending intervals among the clips or pins in the conveying direction to stretch the web in the lengthwise direction, a method of extending a web in the lateral direction and stretching it in the lateral direction in the same manner, and a method of extending a web in the lengthwise and lateral directions at the same time to stretch the web in both of the lengthwise and lateral directions. As a matter of course, these methods may be used in combination. Among them, a web is particularly preferably stretched in the widthwise direction (the lateral direction) by a tenter method of gripping both ends of the web with clips, or the like.

In addition, in the case of a so-called tenter method, when a clip part is driven in a linear drive mode, smooth stretching can be carried out and a risk such as rupture can be reduced, thus being preferable.

The maintenance of a width or stretching in the lateral direction in a film production step is preferably performed by a tenter, which may be either of pin tenter or clip tenter.

The slow axis or fast axis in the retardation film of the present invention exists in the film plane, and when an angle made with the film production direction is assumed to be θ1, θ1 is preferably −1° or more and +1° or less, and more preferably −0.5° or more and +0.5° or less.

This θ1 can be defined as an orientation angle, and a measurement of θ1 can be conducted by using an automatic birefringence analyzer, KOBRA-21ADH (Oji Scientific Instruments). To satisfy the above described respective relationships by θ1 can contribute to obtaining high brightness in a displayed image and suppressing and preventing light leakage, and can also contribute to attaining accurate color reproduction in a liquid crystal display.

6) Winding Step

Finally, an obtained web (finished film) is winded to thus obtain a retardation film. More specifically, the step is a step of winding a web as a retardation film by a winder 37 after the residual solvent amount in the web is 2% by mass or less, and a film with good size stability can be obtained by setting the residual solvent amount to 0.4% by mass or less. The web is particularly preferably winded within the range from 0.00 to 0.10% by mass.

For a winding method, a generally used method may be employed, and examples thereof include a constant torque method, a constant tension method, a taper tension method, and a program tension control method having a constant internal stress, which may be used properly.

Before winding, ends are slit and cut out to have a width to be a product and, in order to prevent attaching and scratches during winding, a knurling process (embossing process) may be carried out on the both ends. A method of the knurling process can be conducted by processing a metallic ring having an uneven pattern in the side surface by heating or pressurization. Note that a film is usually deformed in gripped parts in the both ends of the film with clips and the gripped parts cannot be used as a product and is therefore removed. When degradation of a material due to heat does not occur, the material is recycled after recovery.

The film of the present invention is preferably a long film, which specifically indicates a film with about 100 m to 10000 m and is generally in a form provided in the roll shape. In addition, the width of the film is preferably from 1.4 to 4 m, and more preferably from 2 to 3 m in order to satisfy demands of increasing a size of a liquid crystal display and production efficiency.

<Melt Flow-Casting Film Production Method>

The retardation film of the present invention also can be produced in a melt flow-casting method.

The melt film production method means a method of heat-melting a composition containing a cellulose ester and the above described additives to a temperature showing flowability and then flow-casting the molten product containing the fluid cellulose.

Molding methods by heat-melting can be specifically classified into melt extraction molding method, a press molding method, an inflation method, an injection molding method, a blow molding method, a stretch molding method, and the like. Among these molding methods, a melt extraction method is preferable from the viewpoints of mechanical strength and surface precision. Plural raw materials used in the melt extraction method are usually preferably kneaded to be pelletized in advance.

Pelletization may be carried out by a known method and can be conducted, for example, by supplying a dried cellulose ester, a plasticizer, and other additives to an extruder by a feeder, kneading by use of a single screw or twin screw extruder, extruding in a strand shape from a die, cooling with water or air-cooling, and cutting.

The additives may be mixed before supplying in an extruder or may be supplied by a separate feeder respectively.

Additives with small amounts such as particles and an antioxidant are preferably mixed in advance in order to be uniformly mixed.

It is preferred that an extruder has suppressed shearing stress, is capable of pelletizing in order not to degrade a resin (such as reduction in molecular weight, coloration, and generation of gel) and processes at a temperature as low as possible. For example, in the case of a twin screw extruder, deep groove screws are used and rotating them in the same direction is preferable. The intermeshing type is preferable from the viewpoint of uniformity of kneading.

A pellet obtained as described above is used to produce a film. As a matter of course, it is possible that powder being a raw material is directly supplied to an extruder by a feeder without pelletization to directly produce a film.

A melting temperature when the above described pellet is extruded using a single screw type or twin screw type extruder is within the temperature range from 200 to 300° C., after removing foreign matters by filtering with a leaf disc type filter, or the like, the pellet is flow-cast in a film shape from a T-die, and the film is nipped by a cooling roller and an elastic touch roller and solidified on the cooling roller.

When the pellet is introduced from a feed hopper to an extruder, a method of preventing oxidative decomposition, or the like, under vacuum or with a reduced pressure, or in an inert gas atmosphere is also preferable.

Extraction is preferably conducted at a stable extrusion flow rate by introducing a gear pump, etc. In addition, a stainless fiber sintered filter is preferably used as a filter used for removal of foreign matters. The stainless fiber sintered filter is obtained by preparing a state of an intricately intertwisting stainless fiber material and then compressing and sintering contact parts to be unified, and a density is changed by a size of fiber and a compression amount to adjust filtration accuracy.

Additives such as a plasticizer and particles may be previously mixed with a resin, or may be kneaded in the middle of an extruder. In order to add them uniformly, a mixing device such as a static mixer is preferably used.

When a film is nipped by a cooling roller and an elastic roller, a film temperature in the touch roller side is preferably set within the temperature range from Tg to Tg+110° C. A known roller can be used for a roller having a surface made of an elastic material, which is used for such an application.

An elastic touch roller is also referred to as a compression roller. As an elastic touch roller, a commercially available product can also be used.

It is preferred that tension is controlled to prevent deformation of a film when the film is peeled off from a cooling roller.

In addition, the film obtained as described above is preferably stretched by the stretching operation described above after undergoing a step of contacting a cooling roller.

For a stretching method, a known roller stretching machine, a tenter, and the like, can be preferably used. The specific conditions are the same as the case of the solution flow-casting method.

Finally, in the same manner as in the case of the solution flow-casting method, a film obtained as described above is winded to thus obtain a retardation film.

<Structures of Polarizing Plate and Liquid Crystal Display>

Structures of a polarizing plate and a liquid crystal display both having the retardation film of the present invention will be explained by referring to a figure.

Figure 2:
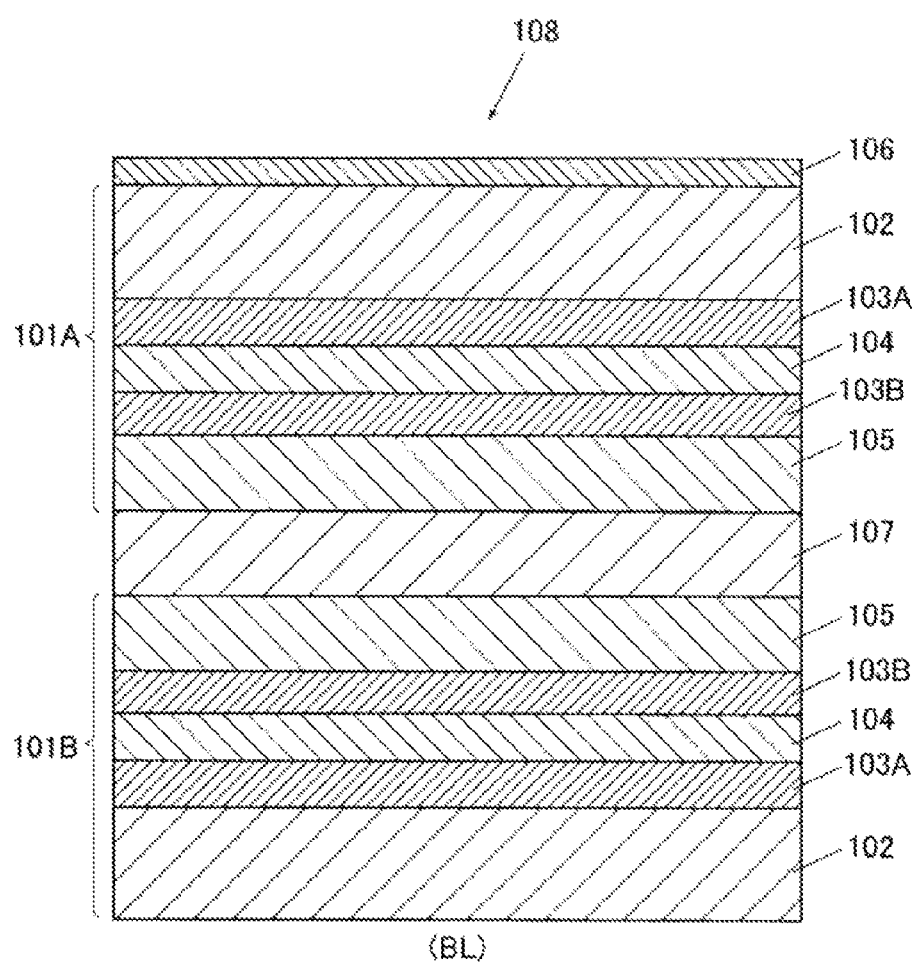
FIG. 2 is a schematic sectional view showing one example of the structure of the liquid crystal display according to one embodiment of the present invention.

FIG. 2 is a schematic sectional view showing one example of a polarizing plate having the retardation film of the present invention and a structure of a liquid crystal display having the polarizing plate.

It is a preferable embodiment that the polarizing plate 101A according to one embodiment of the present invention has a structure in which at least a protecting film 102, an active energy ray curable adhesive agent 103A and a polarizer 104 are laminated in this order, and an active energy ray curable adhesive agent 103B and the retardation film 105 according to the present invention are further laminated to the polarizer surface opposite to the surface on which the protecting film is arranged. That is, the polarizing plate 101A has a structure in which the retardation film 105 according to the present invention is adhered to the polarizer 104 with the active energy ray curable adhesive agent 103B.

In addition, for example, a functional layer 106 such as an antiglare layer, an antireflection layer, an antifouling layer and a hard coat layer may be further provided in the outside (outermost surface) of the protecting film 102, if necessary.

The liquid crystal display 108 is preferably structured by laminating the retardation film 105 in the polarizing plate 101A to a liquid crystal cell 107 with a pressure sensitive adhesive, an adhesive agent, or the like, and laminating the retardation film 105 of the present invention in the polarizing plate 101B having the same structure as the polarizing plate 101A to the liquid crystal cell surface in the opposite side of the surface (back light side: described as BL in the figure) onto which the polarizing plate 101A and the liquid crystal cell 107 are laminated.

<Adhesive Agent>

In the embodiment shown in FIG. 2, the retardation film 105 and the polarizer 104 are adhered with an active energy ray curable adhesive agent 103B. Use of an active energy ray curable adhesive agent is preferable since moisture permeability can be effectively controlled. However, the present invention can use not only an active energy ray curable adhesive agent, but also a curable pressure sensitive adhesive such as a urethane pressure sensitive adhesive, an epoxy pressure sensitive adhesive, an aqueous polymer-isocyanate pressure sensitive adhesive and a thermosetting acrylic pressure sensitive adhesive, a moisture-setting urethane pressure sensitive adhesive, an aerobiotic pressure sensitive adhesive such as polyether methacrylate type, ester-based methacrylate type and oxidation type polyether methacrylate, a cyanoacrylate-based instant pressure sensitive adhesive, an acrylate and peroxide-based two-component instant pressure sensitive adhesive, and the like. The above described pressure sensitive adhesive may be one-component type or may be two-component type that is used by mixing two liquids or more before its use. An adhesive agent may be a solvent based adhesive agent containing an organic solvent as a medium, an aqueous adhesive agent containing water as the primary component such as an emulsion type, a colloid dispersion type and an aqueous solution type, or a solvent-free type adhesive agent. A concentration of an adhesive agent solution may be suitably determined according to a film thickness after adhesion, a coating method, coating conditions, and the like, and is generally from 0.1 to 50% by mass.

(Active Energy Ray Curable Adhesive Agent)

Active energy ray curable adhesive agents include the cationic polymerization type and the radical polymerization type. A preferable example of an active energy ray curable adhesive agent that can be suitably used in the present invention includes an active energy ray curable adhesive agent composition containing the following respective components ($\alpha$) to ($\delta$).

($\alpha$) A cationic polymerizable compound
($\beta$) A photo-cationic polymerization initiator
($\gamma$) A photosensitizer showing the maximum absorption to light at a wavelength longer than 380 nm
($\delta$) A naphthalene-based photosensitizing aid (A Cationic Polymerizable Compound ($\alpha$))

A cationic polymerizable compound ($\alpha$) that is the primary component of an active energy ray curable adhesive agent composition and a component to give adhesive force by polymerization curing may be a compound that is cured by cationic polymerization, and specifically preferably contains an epoxy compound having at least two epoxy groups in the molecule. Epoxy compounds include an aromatic epoxy compound having an aromatic ring in the molecule, an alicyclic epoxy compound having at least two epoxy groups in the molecule in which at least one of the epoxy groups is bound to an alicyclic ring, and an aliphatic epoxy compound without having an aromatic ring in the molecule in which one carbon atom in a ring (usually an oxirane ring) containing an epoxy group and two carbon atoms bound to the epoxy group is bound to another aliphatic carbon atom. An active energy ray curable adhesive agent composition used in the present invention preferably contains a cationic polymerizable compound (α) that includes, in particular, a composition containing an epoxy resin without containing an aromatic ring, an alicyclic epoxy compound as the primary component. When a cationic polymerizable compound containing an alicyclic epoxy compound as the primary component is used, a cured product having high storage elasticity is given, and the polarizer hardly breaks in a polarizing plate obtained by adhering a retardation film and a polarizer with the cured product (adhesive agent layer).

An alicyclic epoxy compound is a compound having at least two epoxy groups in the molecule in which at least one of the epoxy groups is bound to an alicyclic ring. Herein, an epoxy group bound to an alicyclic ring means that, as shown in the following formula (ep), two bonds of an epoxy group (—O—) are directly bound to two carbon atoms (generally adjacent carbon atoms) which constitute an alicyclic ring, respectively. In the following general formula (ep), m represents an integer from 2 to 5.

[Chem. 32]

General Formula (ep)

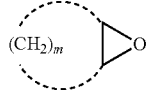

A compound obtained by bonding a group in the form of removing one or plural hydrogen atoms in $(CH_2)_m$ to another chemical structure in the general formula (ep) can be an alicyclic epoxy compound. Hydrogen constituting an alicyclic ring may be suitably substituted with a linear alkyl group such as a methyl group and an ethyl group. In particular, a compound having an epoxycyclopentane ring (wherein m=3 in the above described formula (ep)) or an epoxycyclohexane ring (wherein m=4 in the above described formula (ep)) is preferable.

Among alicyclic epoxy compounds, any of the following compounds (ep-1) to (ep-11) is more preferable since they are easily available and an effect of enhancing storage elasticity of a cured product is large.

[Chem. 33]

(ep-1)
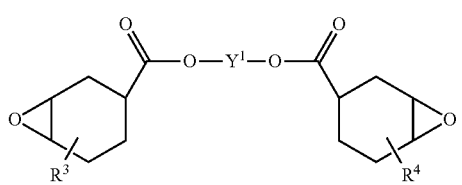

(ep-2)
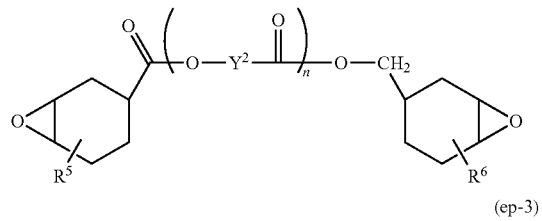

(ep-3)
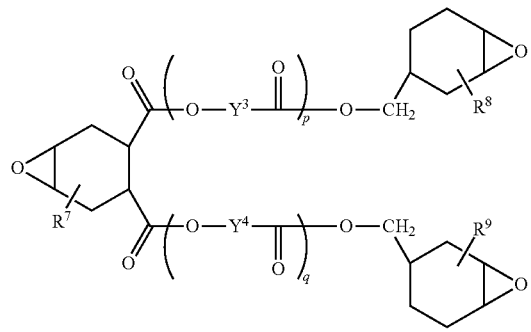

(ep-4)
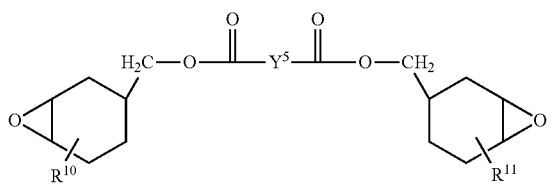

(ep-5)
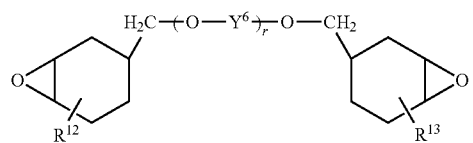

(ep-6)

(ep-7)

(ep-8)
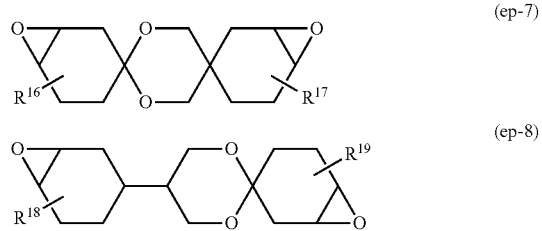

(ep-9)

(ep-10)
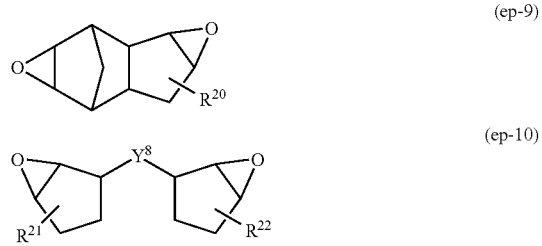
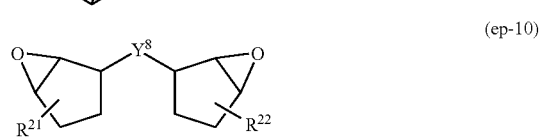

(ep-11)

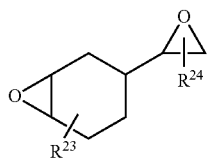

In the above described formulas, $R^3$ to $R^{24}$ each independently represent a hydrogen atom or an alkyl group having 1 to 6 carbon atoms, and when $R^3$ to $R^{24}$ are alkyl groups, a site bonding to an alicyclic ring is any number of the 1-position to 6-position. An alkyl group having 1 to 6 carbon atoms may have a linear chain or a branched chain, and may have an alicyclic ring. $Y^8$ represents an oxygen atom or an alkanediyl group having 1 to 20 carbon atoms. $Y^1$ to $Y^7$ may each independently have a linear chain or a branched chain, and represents an alkanediyl group having 1 to 20 carbon atoms which may have an alicyclic ring. n, p, q and r each independently represent an integer from 0 to 20.

Among compounds expressed by the above described formulas (ep-1) to (ep-11), an alicyclic diepoxy compound expressed by the formula (ep-2) is preferable since it is easily available. The alicyclic diepoxy compound expressed by the formula (ep-2) is an ester compound of 3,4-epoxycyclohexyl methanol (an alkyl group having 1 to 6 carbon atoms may be bound to its cyclohexane ring) and 3,4-epoxycyclohexane carboxylic acid (an alkyl group having 1 to 6 carbon atoms may be bound to its cyclohexane ring). Specific examples of such an ester compound include 3,4-epoxycyclohexylmethyl-3,4-epoxycyclohexanecarboxylate (a compound expressed by the formula (ep-2) wherein $R^5=R^6=H$, n=0) and 3,4-epoxy-6-methylcyclohexylmethyl-3,4-epoxy-6-methylcyclohexanecarboxylate (a compound expressed by the formula (ep-2) wherein $R^5$=6-methyl, $R^6$=6-methyl, n=0).

In addition, it is effective to use an epoxy resin that substantially does not have an alicyclic epoxy group in combination with an alicyclic epoxy compound. By using a compound having an alicyclic epoxy compound as the primary component and using an epoxy resin that substantially does not have an alicyclic epoxy group in combination with the alicyclic epoxy compound as the cationic polymerizable compound, adhesiveness between a polarizer and a retardation film can be more enhanced while keeping high storage elasticity of a cured product. The epoxy resin that substantially does not have an alicyclic epoxy group referred to herein is a compound having a ring (generally an oxirane ring) containing an epoxy group and two carbon atoms to which the epoxy group is bonded in its molecule and bonding one of the carbon atoms to another aliphatic carbon atom. Examples thereof include polyglycidyl ethers of polyvalent alcohols (phenol). Among them, a diglycidyl ether compound expressed by the general formula (ge) described below is preferable since it is easily available and an effect of enhancing adhesiveness between a polarizer and a retardation film is large.

[Chem. 34]

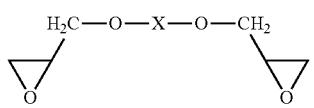

General formula (ge)

[In the formula, X represents a direct bond, a methylene group, an alkylidene group having 1 to 4 carbon atoms, an alicyclic hydrocarbon group, O, S, $SO_2$, SS, SO, CO, OCO or a substituent selected from the group consisting of three substituents expressed by the following formulas (ge-1) to (ge-3), and the alkylidene group may be substituted with a halogen atom.]

[Chem. 35]

(ge-1)

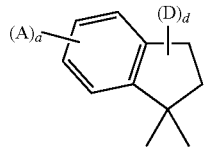
(ge-2)

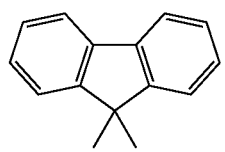
(ge-3)

In the formula (ge-1), $R^{25}$ and $R^{26}$ each independently represent a hydrogen atom, an alkyl group having 1 to 3 carbon atoms, a phenyl group that may be substituted with an alkyl group having 1 to 10 carbon atoms or an alkoxy group, or a cycloalkyl group having 3 to 10 carbon atoms that may be substituted with an alkyl group having 1 to 10 carbon atoms or an alkoxy group, and $R^{25}$ and $R^{26}$ may be connected each other to form a ring.

In the formula (ge-2), A and D each independently represent an alkyl group having 1 to 10 carbon atoms, which may be substituted with a halogen atom, an aryl group having 6 to 20 carbon atoms, which may be substituted with a halogen atom, an arylalkyl group having 7 to 20 carbon atoms, which may be substituted with a halogen atom, and a heterocyclic group having 2 to 20 carbon atoms, which may be substituted with a halogen atom, or a halogen atom, and a methylene group in the alkyl group, aryl group or arylalkyl group may be interrupted by an unsaturation bond, —O— or S—. In the formula, "a" represents an integer from 0 to 4, and "d" represents an integer from 0 to 4.

Examples of a diglycidyl ether compound expressed by the general formula (ge) include bisphenol-type epoxy resins such as a diglycidyl ether of bisphenol A, a diglycidyl ether of bisphenol F and a diglycidyl ether of bisphenol S; multifunctional epoxy resins such as a glycidyl ether of tetrahydroxyphenylmethane, a glycidyl ether of tetrahydroxybenzophenone and epoxidized polyvinylphenol; a polyglycidyl ether of an aliphatic polyvalent alcohol; a polyglycidyl ether of an alkylene oxide adduct of an aliphatic polyvalent alcohol; and a diglycidyl ether of alkyleneglycol, and, in particular, a polyglycidyl ether of an aliphatic polyvalent alcohol is preferable.

As the above described aliphatic polyvalent alcohol, examples thereof include aliphatic polyvalent alcohols having carbon atoms within the range from 2 to 20. More specifically, examples thereof include aliphatic diol such as ethyleneglycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6- hexanediol, 1,7-heptanediol, 3,5-heptanediol, 1,8-octanediol, 2-methyl-1,8-octanediol, 1,9-nonanediol, and 1,10-decanediol; alicyclic diol such as cyclohexane dimethanol, cyclohexanediol, hydrogenated bisphenol A, and hydrogenated bisphenol F; and tri- or polyvalent polyol such as trimethylol ethane, trimethylol propane, hexitols, pentitols, glycerin, polyglycerin, pentaerythritol, dipentaerythritol, and tetramethylol propane.

When an alicyclic epoxy compound and an epoxy resin that does not substantially contain an alicyclic epoxy group are used in combination, as blending ratios of the both compounds, the alicyclic epoxy compound is preferably contained in an amount from 50 to 95% by mass, and the epoxy resin that does not substantially contain an alicyclic epoxy group is preferably contained in an amount of 5% by mass or more based on the whole amount of the cationic polymerizable compound. By blending an alicyclic epoxy compound in an amount of 50% by mass or more with respect to the whole cationic polymerizable compound, a storage elasticity at 80° C. of a cured product is 1000 MPa or more, and in a polarizing plate in which the polarizer and a retardation film are adhered with such a cured product (an adhesive agent layer), the polarizer hardly breaks. In addition, by blending an epoxy resin that does not substantially contain an alicyclic epoxy group in an amount of 5% by mass or more with respect to the whole cationic polymerizable compound, adhesiveness between the polarizer and the retardation film is improved. The amount of the epoxy resin that does not substantially contain an alicyclic epoxy group is allowed to be until 50% by mass based on the whole amount of the cationic polymerizable compound when the cationic polymerizable compound is a two-component base with an alicyclic epoxy compound, but when the amount is too large, a storage elasticity of a cured product is reduced, the polarizer easily breaks, and the amount is therefore preferably 45% by mass or less based on the whole amount of the cationic polymerizable compound.

When an alicyclic epoxy compound and an epoxy resin that does not substantially contain an alicyclic epoxy group as described above are used in combination as a cationic polymerizable compound ($\alpha$) which constitutes the active energy ray curable adhesive agent composition according to the present invention, another cationic polymerizable compound may be contained in addition to these components in the ranges to be amounts described above respectively. Examples of the other cationic polymerizable compound include epoxy compounds except for the formulas (ep-1) to (ep-11) and the general formula (ge) and oxetane compounds.

Epoxy compounds except for the formulas (ep-1) to (ep-11) and the formula (ge) include an alicyclic epoxy compound having an epoxy group bound to at least one alicyclic ring in the molecule except for the formulas (ep-1) to (ep-11), an aliphatic epoxy compound having an oxirane ring bound to an aliphatic carbon atom except for the formula (ge), an aromatic epoxy compound having an aromatic ring and an epoxy group in the molecule, a hydrogenated epoxy compound obtained by hydrogenating an aromatic ring in an aromatic epoxy compound, and the like.

Examples of the alicyclic epoxy compound having an epoxy group bound to at least one alicyclic ring in the molecule except for the formulas (ep-1) to (ep-11) include a diepoxide of vinylcyclohexanes such as 4-vinylcyclohexene diepoxide and 1,2:8,9-diepoxylimonene.

Examples of the aliphatic epoxy compound having an oxirane ring bound to an aliphatic carbon atom except for the general formula (ge) include a triglycidyl ether of glycerin, a triglycidyl ether of trimethylolpropane, and a diglycidyl ether of polyethyleneglycol.

The aromatic epoxy compound having an aromatic ring and an epoxy group in the molecule can be a glycidyl ether of an aromatic polyhydroxy compound having at least two phenolic hydroxy groups (hydroxyl groups) in the molecule, and specific examples thereof include a diglycidyl ether of bisphenol A, a diglycidyl ether of bisphenol F, a diglycidyl ether of bisphenol S, and a glycidyl ether of a phenol novolac resin.

The hydrogenated epoxy compound obtained by hydrogenating an aromatic ring in an aromatic epoxy compound can be obtained by selectively carrying out a hydrogenation reaction under pressurization to an aromatic polyhydroxy compound having at least two phenolic hydroxy groups in the molecule, which is a raw material of the above described aromatic epoxy compound, under the presence of a catalyst, and glycidyl-etherifying the obtained hydrogenated polyhydroxy) compound. Specific examples thereof include a diglycidyl ether of hydrogenated bisphenol A, a diglycidyl ether of hydrogenated bisphenol F, and a diglycidyl ether of hydrogenated bisphenol S.

Among epoxy compounds except for these formulas (ep-1) to (ep-11) and the general formula (ge), in the case of blending a compound having an epoxy group bound to an alicyclic ring and being classified into an alicyclic epoxy compound defined above, the compound is used within the range where a sum with an alicyclic epoxy compound expressed by the formulas (ep-1) to (ep-11) does not exceed 95% by mass, based on the total amount of the cationic polymerizable compound.

An oxetane compound that can be an optional cationic polymerizable compound is a compound having a 4-membered ring ether (oxetanyl group) in the molecule. Specific examples thereof include 3-ethyl-3-hydroxymethyloxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, bis[(3-ethyl-3-oxetanyl)methyl]ether, 3-ethyl-3-(2-ethylhexyloxymethyl)oxetane, 3-ethyl-3-(cyclohexyloxymethyl)oxetane, phenol novolac oxetane, 1,3-bis[3-ethyl oxetane-3-yl)methoxy]benzene, oxetanylsilsesquioxane and oxetanyl silicate.

By blending an oxetane compound in a ratio of 30% by mass or less based on the whole amount of the cationic polymerizable compound, an effect of improving curability can be expected as compared to a case of using only an epoxy compound as a cationic polymerizable compound.

(Photo-Cationic Polymerization Initiator ($\beta$))

In the present invention, a cationic polymerizable compound as described above is cationically polymerized by active energy ray irradiation and cured to form an adhesive agent layer and, therefore, a photo-cationic polymerization initiator ($\beta$) is preferably blended in the active energy ray curable adhesive agent composition.

A photo-cationic polymerization initiator generates cation species or Lewis acid by irradiation of active energy rays such as visible light ray, ultraviolet ray, X ray and electron ray to initiate a polymerization reaction of a cationic polymerizable compound ($\alpha$). The photo-cationic polymerization initiator catalytically acts with light and is thus excellent in storage stability and workability even when mixed in the cationic polymerizable compound ($\alpha$). Examples of a compound generating cation species and Lewis acid by irradiation of active energy ray include aromatic diazonium salts; onium salts such as aromatic iodonium salts and aromatic sulfonium salts; and iron-arene complex.

Examples of aromatic diazonium salts include benzene diazonium hexafluoroantimonate, benzene diazonium hexafluorophosphate, and benzene diazonium hexafluoroborate.

Examples of aromatic iodonium salts include diphenyliodonium tetrakis(pentafluorophenyl)borate, diphenyliodonium hexafluorophosphate, diphenyliodonium hexafluoroantimonate, and di(4-nonylphenyl)iodonium hexafluorophosphate.

Examples of aromatic sulfonium salts include triphenylsulfoniumhexafluorophosphate, triphenylsulfonium hexafluoroantimonate, triphenylsulfonium tetrakis(pentafluorophenyl)borate, 4,4'-bis[diphenylsulfonio]diphenyl sulfide bishexafluorophosphate, 4,4'-bis[di(β-hydroxyethoxy)phenylsulfonio]diphenyl sulfide bishexafluoroantimonate, 4,4'-bis[di(β-hydroxyethoxy)phenylsulfonio]diphenyl sulfide bishexafluorophosphate, 7-[di(p-toluyl)sulfonio]-2-isopropylthioxanthone hexafluoroantimonate, 7-[di(p-toluyl)sulfonio]-2-isopropylthioxanthone tetrakis(pentafluorophenyl)borate, 4-phenylcarbonyl-4'-diphenylsulfonio-diphenyl sulfide hexafluorophosphate, 4-(p-tert-butylphenylcarbonyl)-4'-diphenylsulfonio-diphenyl sulfide hexafluoroantimonate, and 4-(p-tert-butylphenylcarbonyl)-4'-di(p-toluyl)sulfonio-diphenyl sulfide tetrakis(pentafluorophenyl)borate.

Examples of an iron-arene complex include xylene-cyclopentadienyl iron (II) hexafluoroantimonate, cumene-cyclopentadienyl iron (II) hexafluorophosphate, and xylene-cyclopentadienyl iron (II) tris(trifluoromethylsulfonyl)methanide.

These photo-cationic polymerization initiators may be used alone or in mixing two or more kinds. Among them, in particular, an aromatic sulfonium salt is preferably used since curability is excellent because of having ultraviolet absorbing characteristics even in the region of a wavelength around 300 nm, and a cured product having favorable mechanical strength and adhesion strength can be provided.

A blending amount of the photo-cationic polymerization initiator (β) is set within the range from 1 to 10 parts by mass with respect to 100 parts by mass of the whole cationic polymerizable compound (α). By blending a photo-cationic polymerization initiator in an amount of 1 part by mass or more per 100 parts by mass of the cationic polymerizable compound (α), the cationic polymerizable compound (α) can be sufficiently cured and high mechanical strength and adhesion strength can be given to an obtained polarizing plate. On the other hand, when the amount is large, a hygroscopic property of a cured product becomes high due to increasing an ionic substance in the cured product, and there is a possibility of reducing durability performance of a polarizing plate; therefore, an amount of the photo-cationic polymerization initiator (β) is 10 parts by mass or less per 100 parts by mass of the cationic polymerizable compound (α).

A blending amount of the photo-cationic polymerization initiator (β) is preferably 2 parts by mass or more and also preferably 6 parts by mass or less per 100 parts by mass of the cationic polymerizable compound (α).

(Photosensitizer (γ))

The active energy ray curable adhesive agent composition according to the present invention contains a photosensitizer (γ) showing the maximum absorption for a light at a wavelength of longer than 380 nm in addition to a cationic polymerizable compound (α) containing an epoxy compound as described above and a photo-cationic polymerization initiator (β). The above described photo-cationic polymerization initiator (β) shows the maximum absorption at a wavelength around 300 nm or shorter than 300 nm, generates cation species or Lewis acid by sensitizing a light at a wavelength around 300 nm to initiate cationic polymerization of the cationic polymerizable compound (α), and a photosensitizer (γ) showing the maximum absorption for a light at a wavelength longer than 380 nm is blended so as to sensitize to a light at a wavelength of longer than 300 nm as well.

As such a photosensitizer (γ), an anthracene compound expressed by the general formula (at) described below is advantageously used.

[Chem. 36]

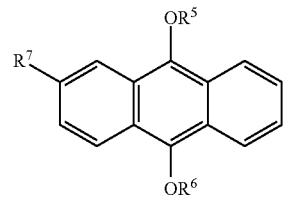

General formula (at)

[In the formula, $R_5$ and $R_6$ each independently represent an alkyl group having 1 to 6 carbon atoms or an alkoxyalkyl group having 2 to 12 carbon atoms. $R_7$ represents a hydrogen atom or an alkyl group having 1 to 6 carbon atoms.]

Specific examples of an anthracene compound expressed by the general formula (at) include 9,10-dimethoxyanthracene, 9,10-diethoxyanthracene, 9,10-dipropoxyanthracene, 9,10-diisopropoxyanthracene, 9,10-dibutoxyanthracene, 9,10-dipentyloxyanthracene, 9,10-dihexyloxyanthracene, 9,10-bis(2-methoxyethoxy)anthracene, 9,10-bis(2-ethoxyethoxy)anthracene, 9,10-bis(2-butoxyethoxy)anthracene, 9,10-bis(3-butoxypropoxy)anthracene, 2-methyl or 2-ethyl-9,10-dimethoxyanthracene, 2-methyl or 2-ethyl-9,10-diethoxyanthracene, 2-methyl or 2-ethyl-9,10-dipropoxyanthracene, 2-methyl or 2-ethyl-9,10-diisopropoxyanthracene, 2-methyl or 2-ethyl-9,10-dibutoxyanthracene, 2-methyl or 2-ethyl-9,10-dipentyloxyanthracene, and 2-methyl or 2-ethyl-9,10-dihexyloxyanthracene.

By blending a photosensitizer (γ) as described above to an active energy ray curable adhesive agent composition, curability of the active energy ray curable adhesive agent composition is improved as compared to a case of not blending it. By containing a blending amount of a photosensitizer (γ) of 0.1 part by mass or more with respect to 100 parts by mass of a cationic polymerizable compound (α) that constitutes the active energy ray curable adhesive agent composition, an effect of improving curability is exhibited. On the other hand, a large blending amount of a photosensitizer (γ) causes a problem such as depositing at the time of storage at a low temperature, or the like, and, therefore, the blending amount is 2 parts by mass or less with respect to 100 parts by mass of the cationic polymerizable compound (α). From the viewpoint of keeping neutral gray of a polarizing plate, it is advantageous that a blending amount of a photosensitizer (γ) is small within the range of appropriately keeping an adhesion property between a polarizer and a retardation film. For example, an amount of a photosensitizer (γ) is preferably within the range from 0.1 to 0.5 part by mass, and more preferably within the range from 0.1 to 0.3 part by mass, with respect to 100 parts by mass of the cationic polymerizable compound (α).

(Photosensitizing Aid (δ))

The active energy ray curable adhesive agent composition according to the present invention can contain a naphthalene-based photosensitizing aid (δ) expressed by the general formula (nf) described below in addition to the above described cationic polymerizable compound (α) containing an epoxy compound, photo-cationic polymerization initiator (β) and photosensitizer (γ).

[Chem. 37]

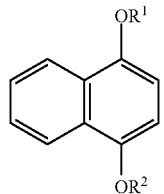

General formula (nf)

[In the formula, $R^1$ and $R^2$ each represent an alkyl group having 1 to 6 carbon atoms.]

Specific examples of the naphthalene-based photosensitizing aid (δ) include 1,4-dimethoxynaphthalene, 1-ethoxy-4-methoxynaphthalene, 1,4-diethoxynaphthalene, 1,4-dipropoxynaphthalene and 1,4-dibutoxynaphthalene.

In the active energy ray curable adhesive agent composition according to the present invention, by blending a naphthalene-based photosensitizing aid (δ), curability of the active energy ray curable adhesive agent composition is improved as compared to a case of not blending it. By containing a blending amount of the naphthalene-based photosensitizing aid (δ) of 0.1 part by mass or more with respect to 100 parts by mass of the cationic polymerizable compound (α) that constitutes the active energy ray curable adhesive agent composition, an effect of improving curability is exhibited. On the other hand, a large blending amount of the naphthalene-based photosensitizing aid (δ) causes a problem such as depositing at the time of storage at a low temperature; therefore, the blending amount is 10 parts by mass or less with respect to 100 parts by mass of the cationic polymerizable compound (α). The blending amount is preferably 5 parts by mass or less with respect to 100 parts by mass of the cationic polymerizable compound (α).

The active energy ray curable adhesive agent composition according to the present invention can further contain additive components as other components that are optional components as long as the effect of the present invention is not damaged. As the additive components, the following additives can be blended in addition to the above described photo-cationic polymerization initiator and photosensitizer (γ): a photosensitizer other than the photosensitizer (γ), a thermal cationic polymerization initiator, polyols, an ion trapping agent, an antioxidant, a photostabilizer, a chain transfer agent, a tackifier, a thermoplastic resin, a filler, a fluidity adjusting agent, a plasticizer, a defoaming agent, a leveling agent, a pigment and an organic solvent.

When additive components are contained, a use amount of the additive components is preferably 1000 parts by mass or less with respect to 100 parts by mass of the above described cationic polymerizable compound (α). When the use amount is 1000 parts by mass or less, effects of improvement in storage stability, prevention of discoloration, improvement in a curing speed, and securing a good adhesion property due to combining the cationic polymerizable compound (α), the photo-cationic polymerization initiator (β), the photosensitizer (γ) and the photosensitizing aid (δ), which are essential components of the active energy ray curable adhesive agent composition used in the present invention, can be preferably exhibited.

In one preferable example of an active energy ray curable adhesive agent that can be suitably used in the present invention, an N-substituted amide monomer having a hydroxy group is contained as a curable component of the active energy ray curable adhesive agent. At least one hydroxy group may be contained in a substituent that is bonded to a nitrogen atom (N) forming an amide group, and two or more hydroxy groups may be contained in it. For the N-substituted amide monomer having a hydroxy group, either monofunctional, or di- or polyfunctional amide monomer can be used. In addition, one kind of such an N-substituted amide monomer having a hydroxy group is selected, or 2 or more kinds thereof can be combined to be used.

An N-substituted amide monomer having a hydroxy group shows a preferable adhesion property also to a polarizer having a low moisture ratio and a retardation film using a material with a low moisture permeability. In particular, the following monomer shows a preferable adhesion property. Examples of the N-substituted amide monomer include N-hydroxyethyl(meth)acrylamide, N-(2,2-dimethoxy-1-hydroxyethyl)-(meth)acrylamide, N-hydroxymethyl(meth) acrylamide, p-hydroxyphenyl(meth)acrylamide, and N,N'-(1,2-dihydroxyethylene)bis(meth)acrylamide. Among these compounds, N-hydroxyethyl(meth)acrylamide is preferable. Note that (meth)acrylamide means an acrylamide group and/or methacrylamide group.

As a curable component, another monomer can be contained in addition to the N-substituted amide monomer having a hydroxy group. Examples of the other monomer that can be used as a curable component include a compound having a (meth)acryloyl group and a compound having a vinyl group. As the other monomer used as a curable component, either a monofunctional, or di- or polyfunctional monomer can be used. Such a curable component can be used alone or in combination of two or more kinds.

As the other monomer used as the curable component described above, for example, an N-substituted amide monomer other than an N-substituted amide monomer having a hydroxy group is preferably used. The N-substituted amide monomer is expressed by the general formula (N) described below.

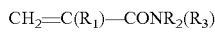

$CH_2=C(R_1)-CONR_2(R_3)$    General formula (N)

In the above described general formula (N), $R_1$ represents a hydrogen atom or a methyl group, $R_2$ represents a hydrogen atom or a mercapto group, an amino group or a linear or branched alkyl group with 1 to 4 carbon atoms, which may have a quaternary ammonium group, and $R_3$ represents a hydrogen atom or a linear or branched alkyl group having 1 to 4 carbon atoms. However, the case where $R_2$ and $R_3$ simultaneously represent hydrogen atoms is excluded. In addition, $R_2$ and $R_3$ are bound to form a 5-membered ring or 6-membered ring which may contain an oxygen atom.

In the above described general formula (N), examples of the linear or branched alkyl group having 1 to 4 carbon atoms in $R_2$ or $R_3$ include a methyl group, an ethyl group, an isopropyl group and a t-butyl group, and examples of the alkyl group having an amino group include an aminomethyl group and an aminoethyl group. In addition, when $R_2$ and $R_3$ are bound to form a 5-membered ring or 6-membered ring which may contain an oxygen atom, a heterocyclic ring having nitrogen is contained. Examples of the heterocyclic ring include a morpholine ring, a piperidine ring, a pyrrolidone ring, and a piperazine ring.

Specific examples of the N-substituted amide monomer include N-methyl(meth)acrylamide, N,N-dimethyl(meth) acrylamide, N,N-diethyl(meth)acrylamide, N-isopropyl acrylamide, N-butyl(meth)acrylamide, N-hexyl(meth)acrylamide, N-methylol (meth)acrylamide, N-methylol-N-propane(meth)acrylamide, aminomethyl(meth)acrylamide, aminoethyl(meth)acrylamide, mercaptomethyl(meth)acrylamide and mercaptoethyl(meth)acrylamide. In addition, examples of a heterocyclic ring-containing monomer having a heterocyclic ring include N-acryloylmorpholine, N-acryloylpiperidine, N-methacryloylpiperidine and N-acryloylpyrrolidine. These N-substituted amide monomers can be used alone or in combination of two or more kinds.

When an N-substituted amide monomer having a hydroxy group and an N-substituted amide monomer expressed by the above described general formula (N) are used in combination as curable components, a combination of N-hydroxyethyl(meth)acrylamide and N-acryloylmorpholine is preferable from the viewpoints of durability, a coating property and an adhesion property. In addition, in the case of the combination, the ratio of N-hydroxyethyl(meth)acrylamide with respect to the total amount of N-hydroxyethyl (meth)acrylamide and N-acryloylmorpholine is preferably 40% by mass or more for the purpose of attaining a good adhesion property. The ratio is more preferably from 40 to 95% by mass, and further more preferably from 60 to 90% by mass.

As a monomer that can be used in combination with the N-substituted amide monomer having a hydroxy group as a curable component, in addition to the above described monomers, examples as a compound having a (meth)acryloyl group include various epoxy(meth)acrylates, urethane (meth)acrylates, polyester (meth)acrylates, and various (meth)acrylic monomers. Among these compounds, epoxy (meth)acrylate, in particular, monofunctional (meth)acrylate having an aromatic ring and a hydroxy group is preferably used.

Various monofunctional (meth)acrylates each having an aromatic ring and a hydroxy group can be used as the monofunctional (meth)acrylate having an aromatic ring and a hydroxy group. The hydroxy group may exist as a substituent of the aromatic ring, but preferably exists as an organic group bonding the aromatic ring and (meth)acrylate (a hydrocarbon group, in particular, a hydrocarbon group bound to an alkylene group).

An example of the above described monofunctional (meth)acrylate having an aromatic ring and a hydroxy group includes a reaction product of a monofunctional epoxy compound having an aromatic ring and (meth)acrylic acid. Examples of the monofunctional epoxy compound having an aromatic ring include a phenylglycidyl ether, a t-butylphenylglycidyl ether, and a phenylpolyethyleneglycolglycidyl ether. Specific examples of the monofunctional (meth) acrylate having an aromatic ring and a hydroxy group include 2-hydroxy-3-phenoxypropyl(meth)acrylate, 2-hydroxy-3-t-butylphenoxypropyl(meth)acrylate and 2-hydroxy-3-phenylpolyethyleneglycolpropyl(meth)acrylate.

In addition, an example of a compound having a (meth) acryloyl group include a carboxy group monomer. A carboxy group monomer is also preferable in the viewpoint of an adhesion property. Examples of the carboxy group monomer include (meth)acrylic acid, carboxyethyl(meth)acrylate and carboxypentyl(meth)acrylate. Among these compounds, acrylic acid is preferable.

In addition to the above described compounds, examples of the compound having a (meth)acryloyl group include alkyl(meth)acrylate having 1 to 12 carbon atoms such as methyl(meth)acrylate, ethyl(meth)acrylate, n-butyl(meth) acrylate, 2-ethylhexyl(meth)acrylate, isooctyl(meth)acrylate, isononyl(meth)acrylate and lauryl(meth)acrylate; alkoxyalkyl(meth)acrylate monomers such as methoxyethyl (meth)acrylate and ethoxyethyl(meth)acrylate; hydroxy group-containing monomers such as 2-hydroxyethyl(meth) acrylate, 2-hydroxypropyl(meth)acrylate, 4-hydroxybutyl (meth)acrylate, 6-hydroxyhexyl(meth)acrylate, 8-hydroxyoctyl(meth)acrylate, 10-hydroxydecyl(meth)acrylate, 12-hydroxylauryl(meth)acrylate and (4-hydroxymethylcyclohexyl)-methyl acrylate; acid anhydride group-containing monomers such as maleic anhydride and itaconic anhydride; a caprolactone adduct of acrylic acid; sulfonic acid group-containing monomers such as styrene sulfonic acid, allyl sulfonic acid, 2-(meth)acrylamide-2-methylpropane sulfonic acid, (meth)acrylamidepropane sulfonic acid, sulfopropyl(meth)acrylate and (meth)acryloyloxynaphthalene sulfonic acid; and phosphoric acid group-containing monomers such as 2-hydroxyethylacryloyl phosphate. Examples thereof also include nitrogen-containing monomers such as (meth)acrylamide; maleimide, N-cyclohexylmaleimide, N-phenylmaleimide; alkylaminoalkyl(meth)acrylate monomers such as aminoethyl(meth)acrylate, aminopropyl(meth) acrylate, N,N-dimethylaminoethyl(meth)acrylate, t-butylaminoethyl(meth)acrylate, and 3-(3-pyrinidyl)propyl(meth) acrylate; and succinimide monomers such as N-(meth) acryloyloxymethylene succinimide, N-(meth)acryloyl-6-oxyhexamethylene succinimide and N-(meth)acryloyl-8-oxyoctamethylene succinimide.

In addition to the above described curable components, a di- or polyfunctional curable component can be used. As the di- or polyfunctional curable component, di- or polyfunctional (meth)acrylate, in particular, di- or polyfunctional epoxy(meth)acrylate is preferable. Di- or polyfunctional epoxy (meth)acrylate is obtained by a reaction of a polyfunctional epoxy compound and (meth)acrylic acid. Various kinds of examples can be cited as the polyfunctional epoxy compound. Examples of the polyfunctional epoxy compound include an aromatic epoxy resin, an alicyclic epoxy resin and an aliphatic epoxy resin.

Examples of the aromatic epoxy resin include bisphenol-type epoxy resins such as a diglycidyl ether of bisphenol A, a diglycidyl ether of bisphenol F and a diglycidyl ether of bisphenol S; novolac-type epoxy resins such as a phenol novolac epoxy resin, a cresol novolac epoxy resin and a hydroxybenzaldehyde phenol novolac epoxy resin; and polyfunctional epoxy resins such as a glycidyl ether of tetrahydroxyphenylmethane, a glycidyl ether of tetrahydroxybenzophenone, and epoxidized polyvinylphenol.

Examples of the alicyclic epoxy resin include hydrogenated products of the above described aromatic epoxy resins and epoxy resins such as cyclohexane-based epoxy resins, cyclohexylmethyl ester-based epoxy resins, dicyclohexylmethyl ether-based epoxy resins, spiro-based epoxy resins and tricyclodecane-based epoxy resins.

Examples of the aliphatic epoxy resin include a polyglycidyl ether of aliphatic polyvalent alcohols or their alkylene oxide adducts. Examples thereof include a diglycidyl ether of 1,4-butanediol, a diglycidyl ether of 1,6-hexanediol, a triglycidyl ether of glycerin, a triglycidyl ether of trimethylolpropane, a diglycidyl ether of polyethyleneglycol, a diglycidyl ether of propyleneglycol, and a polyglycidyl ether of polyetherpolyol obtained by adding one or two or more alkylene oxides (such as ethylene oxide and propylene oxide) to an aliphatic polyvalent alcohol such as ethylene glycol, propylene glycol and glycerin.

The epoxy equivalent weight of the above described epoxy resin is usually within the range from 30 to 3000 g/equivalent weight, and preferably within the range from 50 to 1500 g/equivalent weight.

The above described di- or more polyfunctional epoxy (meth)acrylate is preferably epoxy(meth)acrylate of an aliphatic epoxy resin, in particular, epoxy (meth)acrylate of a difunctional aliphatic epoxy resin is preferable.

As a curable component in an active energy ray curable adhesive agent, an N-substituted amide monomer having a hydroxy group is used, and as a monomer used in combination with it, an N-substituted amide monomer expressed by the general formula (1) described above is preferable. Note that when monofunctional (meth)acrylate having an aromatic ring and a hydroxy group is used in combination as the curable component, the monofunctional (meth)acrylate is set within the range preferably from 0 to 50% by mass, more preferably from 1 to 40% by mass, and further more preferably from 5 to 30% by mass, with respect to the ratio of the N-substituted amide monomer having a hydroxy group.

When an epoxy compound is used as a monomer to be used in combination, the epoxy compound is set within the range preferably from 0 to 50% by mass, more preferably from 1 to 30% by mass, and further more preferably from 5 to 15% by mass, with respect to the ratio of the N-substituted amide monomer having a hydroxy group.

The active energy ray curable adhesive agent contains a curable component and, in addition to the above described component, additives may be suitably added if needed. The active energy ray curable adhesive agent can be used in a form of the electron ray curable type or the ultraviolet curable type. When the adhesive agent is used in the electron ray curable type, it is not particularly required to have the adhesive agent contain a photopolymerization initiator, but when used in the ultraviolet curable type, a photopolymerization initiator is used. An amount in use of a photopolymerization initiator is usually within the range from about 0.1 to 10 parts by mass, and preferably within the range from about 0.5 to 3 parts by mass per 100 parts by mass of the curable component.

Examples of the additives include a sensitizer for increasing a curing speed and curing sensitivity by an electron ray, which is typified by a carbonyl compound, and the like, an adhesion accelerator typified by a silane coupling agent and ethylene oxide, an additive for improving wettability with a retardation film, an additive for improving mechanical strength and processability, which is typified by an acryloxy group compound and a hydrocarbon-based additive (natural or synthesized resin), an ultraviolet absorber, an anti-aging agent, a dye, a processing aid, an ion trapping agent, an antioxidant, a tackifier, a filler (except for metallic compound filler), a plasticizer, a leveling agent, a defoaming agent, and an antistatic agent. In addition, oxetanes and polyols may also be contained.

Note that a coating method and a curing method of the active energy ray curable adhesive agent will be hereinafter described.

<Polarizer>

A polarizer that is the primary constituent of a polarizing plate is a device that only transmits a light of a polarizing surface in a constant direction, and a currently known typical polarizer is a polyvinyl alcohol-based polarizing film. The polyvinyl alcohol-based polarizing film includes a polarizing film obtained by dyeing a polyvinyl alcohol film with iodine and a polarizing film obtained by dyeing with a dichroic dye.

As the polarizer, a polarizer obtained by forming an aqueous polyvinyl alcohol solution into a film and uniaxially stretching the film and then dyeing or uniaxially stretching the film after dyeing, and then conducing a durability treatment preferably with a boron compound can be used. The film thickness of the polarizer is preferably within the range from 5 to 30 μm, and particularly preferably within the range from 5 to 15 μm.

An ethylene-modified polyvinyl alcohol having a content of an ethylene unit of 1 to 4% by mol, a polymerization degree of 2000 to 4000 and a saponification degree of 99.0 to 99.99% by mol, which is described in JP 2003-248123 and JP 2003-342322, is also preferably used. In particular, an ethylene-modified polyvinyl alcohol film having a hot water cutting temperature within the range from 66 to 73° C. is preferably used. A polarizer using this ethylene-modified polyvinyl alcohol film is excellent in polarization performance and durability and also has less color shades, and is thus particularly preferably used in a large-sized liquid crystal display.

<Protecting Film>

It is preferred in the polarizing plate of the present invention that, as shown in FIG. 2, a protecting film 102 is further laminated onto the polarizer surface opposite to the surface on which the retardation film of the present invention is disposed, with an active energy ray curable adhesive agent according to need.

The protecting film can be available as a marketed product, and examples thereof include KONICA MINOLTA TAC KC4UE, KC8UE, KC8UX, KC5UX, KC8UY, KC4UY, KC4CZ, KC6UA, KC4UA and KC2UA (all are manufactured by Konica Minolta Advanced Layers, Inc.).

In particular, a protecting film arranged in the visible side is preferably provided with functional layers such as a hard coat layer, an antistatic layer, an antireflection layer, a slippery layer, an adhesion layer, an antiglare layer, and a barrier layer.

<Method for Producing Polarizing Plate>

A polarizing plate can be produced by laminating the retardation film of the present invention on one surface of a polarizer using an active energy ray curable adhesive agent. When an adhesion property is different in both surfaces of the retardation film, lamination to one surface with a better adhesion property is preferable.

Hereinbelow, one example of a method for producing a polarizing plate using an active energy ray curable adhesive agent will be explained.

A polarizing plate can be manufactured by a production method including an adhesive agent coating step of forming an adhesive agent layer by coating the active energy ray curable adhesive agent described below to at least one of adhesion surfaces of a polarizer and a retardation film, a lamination step of laminating the polarizer and the retardation film with the adhesive agent, and a curing step of curing the adhesive agent layer in a state of adhering the polarizer and the retardation film with the adhesive agent layer. In addition, the method may include a pre-treatment step of conducting an adhesion facilitating treatment on the surface to adhere the polarizer in the retardation film.

(Pre-Treatment Step)

In the pre-treatment step, the surface for adhering to the polarizer in the retardation film is subjected to an adhesion facilitating treatment. When a retardation film and a protecting film are respectively adhered on both surfaces of the polarizer, the adhesion facilitating treatment is carried out on each of the retardation film and the protecting film. In the following adhesive agent coating step, the surface that underwent the adhesion facilitating treatment is treated as the laminating surface with the polarizer, and the adhesion facilitating treatment is conducted on a surface of laminating with an active energy ray curable adhesive agent in both of the surfaces of the retardation film. Examples of the adhesion facilitating treatment include a corona treatment and a plasma treatment.

(Adhesive Agent Coating Step)

In the adhesive agent coating step, the above described active energy ray curable adhesive agent is coated on at least one adhesion surface of a polarizer and a retardation film. When the active energy ray curable adhesive agent is directly coated on a surface of the polarizer or the retardation film, a coating method thereof is not particularly limited. For example, various wet coating methods such as doctor blade, wire bar, die coater, comma coater and gravure coater can be employed. In addition, a method of flow-casting the active energy ray curable adhesive agent between the polarizer and the retardation film and then pressurizing by a roller, or the like, to be uniformly extended can also be employed.

(Lamination Step)

The film is treated in the lamination step after coating the active energy ray curable adhesive agent in the above described method. In this lamination step, for example, when the active energy ray curable adhesive agent is coated on the surface of the polarizer in the prior coating step, the retardation film is laminated thereon. When the active energy ray curable adhesive agent is coated on the surface of the retardation film in the prior coating step, the polarizer is laminated thereon. In addition, when the active energy ray curable adhesive agent is flow-cast between the polarizer and the retardation film, the polarizer and the retardation film are laminated in the state. Even when a retardation film and a protecting film are adhered to both surfaces of the polarizer, in the case of using the active energy ray curable adhesive agent for the both surfaces, the retardation film and the protecting film are laminated respectively on the both surfaces of the polarizer with the active energy ray curable adhesive agent. In general, the film is pressurized from the both surfaces by pinching with rollers, or the like, in this state (when the retardation film is laminated on one surface of the polarizer, the film is pressurized from the polarizer side and the retardation film side, and when the retardation film and the protecting film are laminated on both surfaces of the polarizer, the film is pressurized from the sides of the retardation film and the protecting film of the both surfaces). Metals, rubbers, or the like, can be used for a material of the rollers. Rollers arranged on both surfaces may be made from the same material or different materials.

(Curing Step)

In the curing step, an uncured active energy ray curable adhesive agent is irradiated with an active energy ray to cure the active energy ray curable adhesive agent containing a cationic polymerizable compound (for example, epoxy compound or oxetane compound) and a radical polymerizable compound (for example, acrylate-based compound and acrylamide-based compound) to adhere a polarizer and a retardation or to adhere a polarizer and a retardation film, which are laminated with the active energy ray curable adhesive agent. When the retardation film is laminated on one surface of the polarizer, an active energy ray may be irradiated either from the polarizer side or the retardation film side. In addition, when the retardation film and the protecting film are laminated on both surfaces of the polarizer, it is advantageous that an active energy ray is irradiated in the state of laminating the retardation film and the protecting film respectively with the active energy ray curable adhesive agent on the both surfaces of the polarizer to simultaneously cure the active energy ray curable adhesive agent on the both surfaces.

As an active energy ray applied for curing, a visible light ray, an ultraviolet ray, an X ray, an electron ray, and the like, can be used, but an electron ray and an ultraviolet ray can be generally preferably used since handling is easy and a curing speed is sufficient.

As irradiation conditions of an electron ray, any appropriate conditions capable of curing the above described adhesive agent can be employed. For example, in electron ray irradiation, an accelerating voltage is preferably within the range from 5 to 300 kV, and more preferably within the range from 10 to 250 kV. When the accelerating voltage is less than 5 kV, the electron ray does not reach the adhesive agent and there is a possibility of insufficiency in curing, and when the accelerating voltage exceeds 300 kV, osmotic force of permeating a sample is too strong, the electron ray is bounced back, and there is a possibility of giving damages to a retardation film and a polarizer. An exposure dose is within the range from 5 to 100 kGy, and preferably within the range from 10 to 75 kGy. Less than 5 kGy of the exposure dose results in that an adhesive agent is insufficient in curing, and 100 kGy or more of the exposure dose results in giving damages to a retardation film and a polarizer to reduce mechanical strength and cause yellowing, and predetermined optical characteristics cannot be obtained.

As irradiation conditions of an ultraviolet ray, any appropriate conditions capable of curing the above described adhesive agent can be employed. An irradiation dose of an ultraviolet ray as an accumulated light quantity is preferably within the range from 50 to 1500 $mJ/cm^2$, and more preferably within the range from 100 to 500 $mJ/cm^2$.

When the above described production method is carried out in a continuous line, a line speed is preferably within the range from 1 to 500 m/min, more preferably within the range from 5 to 300 m/min, and furthermore preferably within the range from 10 to 100 m/min, depending on a curing time of an adhesive agent. When the line speed is too slow, productivity is poor, or damage to a retardation film is too large and a polarizing plate capable of standing a durability test, and the like, cannot be produced. When the line speed is too fast, curing of an adhesive agent is insufficient and a desired adhesion property cannot be obtained in cases.

In the polarizing plate thus obtained, a thickness of an adhesive agent is not particularly limited, is generally within the range from 0.01 to 10 μm, and preferably within the range from 0.5 to 5 μm.

<Liquid Crystal Display>

The polarizing plate of the present invention can be preferably used in a liquid crystal display. In a liquid crystal display using the polarizing plate of the present invention, color unevenness of the liquid crystal display due to containing water hardly occurs since a retardation film having a low moisture permeability is used.

A glass used for a panel in the liquid crystal display has a thickness preferably within the range from 0.3 to 0.7 mm, and more preferably within the range from 0.3 to 0.5 mm. The polarizing plate of the present invention is hardly deformed and is thus preferably used particularly when the glass thickness is small.

Lamination between the surface of the polarizing plate in the side of the retardation film of the present invention and at least one surface of a liquid crystal cell can be carried out in a known technique. These surfaces may be laminated with an adhesion layer in some cases.

A mode (driving mode) of a liquid crystal display is not particularly limited, and a liquid crystal display having various driving modes such as STN, TN, OCB, HAN, VA (MVA, PVA), IPS and OCB can be used.

In particular, the retardation film of the present invention has a high retardation value and is thus preferably provided in a VA (MVA, PVA)-type (vertically alignment type) liquid crystal display as an optical compensation film (retardation film) to magnify a viewing angle. That is, according to one embodiment of the present invention, a vertically alignment type liquid crystal display having the above described polarizing plate on at least one surface of the liquid crystal cell is provided.

Providing a polarizing plate containing the retardation film of the present invention in these liquid crystal displays makes it possible to obtain a liquid crystal display which is excellent in durability (moist heat resistance) and, at the same time, has a suppressed variation in phase differences and is excellent in visibility with no unevenness in a liquid crystal display even if the liquid crystal display has a 30-type or larger sized screen.

EXAMPLES

Hereinbelow, the present invention will be specifically illustrated by reference to examples; however, the invention is not intended to be limited to the examples. Note that an expression of "part" or "%" is used in examples and means "part by mass" or "% by mass" unless otherwise specifically notified.

<Production of Optical Film 101>
<Particle Dispersion Solution 1>

Fine particles (matting agent) (Aerosil R812 manufactured by Nippon Aerosil Co., Ltd.) 11 parts by mass Ethanol 89 parts by mass After stirring and mixing the above components for 50 minutes with a dissolver, the resultant mixture was dispersed with Manthon Gaulin.

<Particle Added Solution 1>

The particle dispersion solution 1 was gradually added to a dissolution furnace charged with methylene chloride while sufficiently stirring. Further, the reaction solution was dispersed in an attritor so that the particle diameter of the secondary particle has a predetermined size. The dispersion solution was filtrated by a Finemet NF manufactured by Nippon Seisen Co., Ltd. to thus prepare the particle added solution 1.

Methylene chloride 99 parts by mass
Particle Dispersion Liquid 15 Parts by Mass

The main dope solution with the composition shown below was prepared. First, methylene chloride and ethanol were added to a pressure dissolution furnace. The pressure dissolution furnace containing the solvents was charged with cellulose acetate having an acetyl substitution degree of 2.00 while stirring the mixture. The mixture was heated and completely dissolved while stirring. The reaction solution was filtered by use of a filter paper Azumi #244 (manufactured by Azumi Filter Paper Co., Ltd.) to thus prepare the main dope solution.

<Composition of Main Dope Solution>
Methylene chloride 370 parts by mass
Ethanol 35 parts by mass
Cellulose acetate (diacetyl cellulose: acetyl group substitution degree of 2.35, weight average molecular weight (Mw) of 185000) 100 parts by mass Retardation increasing agent (compound A-022 expressed by the general formula (1)) 4 parts by mass
Plasticizer (compound FA-9 expressed by the general formula FA) 10 parts by mass
Particle added solution 11 part by mass The above components were charged into a sealed main dissolution furnace 1 and dissolved while stirring the mixture to thus prepare a dope solution.

The solvent was evaporated until the residual solvent amount in the flow-cast film was 75% on the stainless belt support, and the film was then peeled off from the stainless belt support at a peeling tension of 130 N/m. The peeled retardation film was stretched in the widthwise direction at 30% (1.3 times) (1.0 time in the flow-casting direction) using a tenter while heating the film at 160° C. The residual solvent at the time of initiation of stretching was 15%.

Subsequently, drying was terminated while a dry zone was transported with a large number of rolls. A drying temperature was adjusted at 130° C. and a transportation tension was adjusted at 100 N/m. As described above, an optical film 101 having a dried film thickness of 10 μm and a roll length of 4000 m was thus obtained.

[Production of Optical Films 102 to 108: Change in Film Thickness]

Optical films 102 to 108 were produced in the same manner as the production of the optical film 101 described above except for flow-casting the dope 1 on a stainless band support so that the films have film thicknesses as shown in Table 1.

[Production of Optical Films 201 to 205: Change in Substitution Degree]

Optical films 201 to 205 were produced in the same manner as the production of the optical film 105 described above except for using cellulose esters having substitution degrees shown in Table 2 in preparation of dopes.

[Production of Optical Film 301: Change in Acyl Group]

An optical film 301 was produced in the same manner as the production of the optical film 105 described above except for using a cellulose ester (cellulose acetate propionate (described as CAP), weight average molecular weight (Mw) of 185000) shown in Table 3 as the kind of the cellulose ester in preparation of a dope.

[Production of Optical Films 401 to 404: Change in Amount of Increasing Agent]

Optical films 401 to 404 were produced in the same manner as the production of the optical film 105 described above except for changing the amount in use of the retardation increasing agent as shown in Table 4 in preparation of dopes.

[Production of Optical Films 501 to 504: Change in Amount of Plasticizer]

Optical films 501 to 504 were produced in the same manner as the production of the optical film 105 described above except for changing the amount in use of the plasticizer as shown in Table 5 in preparation of dopes.

[Production of Optical Films 601 to 614: Change in Kind of Increasing Agent]

Optical films 601 to 614 were produced in the same manner as the production of the optical film 105 described above except for changing the kind of the retardation increasing agent as shown in Table 6 in preparation of dopes.

[Production of Optical Films 701 to 708: Change in Kind of Plasticizer]

Optical films 701 to 708 were produced in the same manner as the production of the optical film 105 described above except for changing the kind of the plasticizer as shown in Table 7 in preparation of dopes.

[Production of Optical Films 801 to 809: Changes in Amount of Increasing Agent and Amount of Plasticizer]

Optical films 801 to 809 were produced in the same manner as the production of the optical film 105 described above except for changing the amount in use of the retardation increasing agent and/or the amount in use of the plasticizer as shown in Table 8 in preparation of dopes.

[Production of Optical Film 901: Changes in Amount of Increasing Agent and Substitution Degree]

An optical film 901 was produced in the same manner as the production of the optical film 105 described above except for using a cellulose ester having a substitution degree as shown in Table 9 and changing the amount in use of the retardation increasing agent as shown in Table 9 in preparation of a dope.

[Production of Optical Films 1001 to 1017: Changes in Amount of Increasing Agent, Kind of Plasticizer, and Kind and Substitution Degree of Cellulose Ester]

Optical films 1001 to 1007 were produced in the same manner as the production of the optical film 105 described above except for changing the amount in use of the retardation increasing agent and the kind of the plasticizer as shown in Table 10 in preparation of dopes.

Optical films 1008 to 1014 were produced in the same manner as the production of the optical film 105 described above except for using a cellulose ester having a substitution degree as shown in Table 10 and changing the amount in use of the retardation increasing agent and the kind of the plasticizer as shown in Table 10 in preparation of dopes.

Optical films 1015 to 1017 were produced in the same manner as the production of the optical film 105 described above except for using a cellulose ester (cellulose acetate propionate (described as CAP), a weight average molecular weight of (Mw) of 185000) shown in Table 10 for the kind of cellulose ester, and changing the amount in use of the retardation increasing agent and the kind of the plasticizer as shown in Table 10 in preparation of dopes.

[Production of Optical Films 1101 to 1128: Use of Hydrogen Bonding Compound Surfactant]

A hydrogen bonding compound and/or a surfactant was used in place of or in addition to a plasticizer for preparation of a dope in the above described production of the optical film 105. Furthermore, optical films 1101 to 1128 were manufactured in the same manner except for changing the amount in use of the retardation increasing agent, the kind of the plasticizer, and the substitution degree and the kind of the cellulose ester as described in Table 11.

Note that as substituents in a cellulose ester, an acetyl group is expressed as Ac, and a propionyl group is expressed as Pr in tables. The sum of substitution degrees in both of the groups indicates the total substitution degree of acyl groups in a cellulose ester.

(Measurement of Weight Average Molecular Weight)

A weight average molecular weight of a cellulose ester was measured using gel permeation chromatography. The measurement conditions are as follows.

Solvent: methylene chloride
Columns: Shodex K806, K805 and K803G (Three columns manufactured by Showa Denko Co., Ltd. were used in connection)
Column temperature: 25° C.
Sample concentration: 0.1% by mass
Detector: RI Model 504 (manufactured by GL Sciences Inc.)
Pump: L6000 (manufactured by Hitachi, Co., Ltd.)
Flow rate: 1.0 ml/min
Calibration curve: Standard polystyrene STK standard polystyrene (manufactured by Tosoh Corporation), calibration curves from 13 samples having Mw=1000000 to 500 are used. 13 samples should be spaced approximately equally.

The details of the compounds described as abbreviations in Tables 1 to 11 are as follows.

<Retardation Increasing Agent>

As a retardation increasing agent, in addition to the above exemplified compound A-022, exemplified compounds A-002, A-009, A-026, A-032, A-037, A-041, A-043, A-051, A-073, A-097, A-106, A-115 and A-133, and compounds expressed by C-1 to C-3 shown below were used.

[Chem. 38]

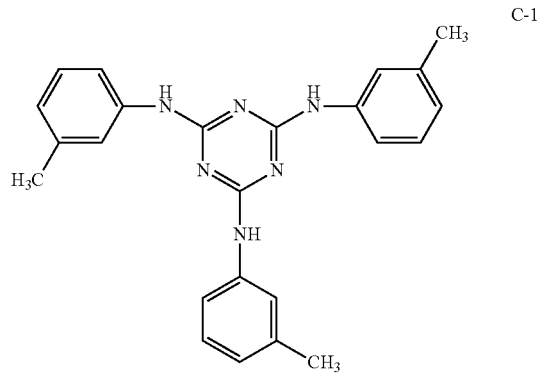

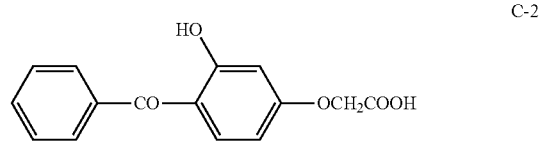

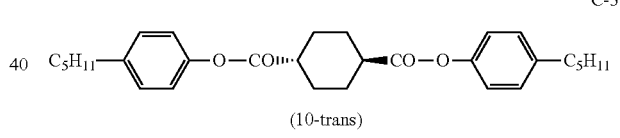

(10-trans)

<Plasticizers: Sugar Ester Compounds: Expressed by FA-3 and 8 to 12 in Table>

As a sugar ester compound, FA-3 and 8 to 12 which are exemplified compounds of a compound expressed by the general formula (FA) were used.

<Plasticizer: Polyester Compound: Expressed by FB-14 to 16 in Table>

FB-14 that is an exemplified compound of a compound expressed by the general formula (FB) as a polyester compound was prepared according to the synthesis method described below. In addition, FB-15 to FB-16 were also prepared in the same manner as the synthesis method of FB-14.

<Synthesis of Ester Compound FB-14>

A 2 L-four neck flask equipped with a thermometer, a stirrer and a reflux condenser was charged with 251 g of 1,2-propyleneglycol, 278 g of phthalic anhydride, 91 g of adipic acid, 610 g of benzoic acid and 0.191 g of tetraisopropyl titanate as an esterification catalyst, and the temperature was increased to 230° C. in a nitrogen gas flow while stirring the mixture. A dehydration condensation reaction was carried out for 15 hours and, after completion of the reaction, unreacted 1,2-propylene glycol was distilled off under reduced pressure at 200° C. to thus obtain an ester compound. The acid value was 0.10 mg/g, and the molecular weight was 491.

<Plasticizers: Acrylic Compounds: Described as Acryl 1 and Acryl 2 in Tables>

[Synthesis of Acrylic Copolymer 1 (Acryl 1)]

A 40 liter-volume polymerization reaction device made from SUS, which is equipped with a stirrer, was charged with 24 liters of deionic water, and 36 g of sodium sulfate was added thereto as a dispersion stabilizing aid and stirred to be dissolved. In addition, in another container equipped with a stirrer, 12 g of 2,2'-azobisisobutyronitrile as a polymerization initiator, 24 g of n-octylmercaptan as a chain transfer agent and 24 g of a stearyl alcohol as a releasing agent were added to a monomer mixture of 9600 g of methyl methacrylate and 2400 g of 2-hydroxyethyl methacrylate, and the mixture was stirred to be dissolved. Thus obtained monomer mixture dissolved with the polymerization initiator, chain transfer agent and releasing agent was charged in the above described 40 liter-volume polymerization reaction device made from SUS, which is equipped with a stirrer (deionic water, dispersion stabilizer and dispersion stabilizing aid are contained) and stirred for 15 minutes at 175 rpm with nitrogen substitution. Then, the temperature was increased to 80° C. to initiate polymerization, and after completion of polymerization exothermic peak, a heat treatment was carried out at 115° C. for 10 minutes to complete the polymerization. The obtained bead-shaped polymer was filtered, washed with water, and dried at 80° C. for 24 hours to obtain an acrylic copolymer 1 of methyl methacrylate and 2-hydroxyethyl methacrylate. The weight average molecular weight measured using GPC was 8000.

[Synthesis of Acrylic Copolymer 2 (Acryl 2)]

The same synthesis was carried out as the synthesis of the acrylic compound 1 except for changing 2-hydroxyethyl methacrylate into methyl acrylate to obtain an acrylic copolymer 2 of methyl methacrylate and methyl acrylate. The weight average molecular weight measured using GPC was 12000.

<Plasticizers: Styrene Compounds: Described as Styrenes 1 to 4 in Tables>

Styrene 1: SMA base resin SMA1000 manufactured by Sartomer Co.

Styrene 2: SMA ester resin SMA2625 manufactured by Sartomer Co.

Styrene 3: styrene/MMA copolymer (composition ratio: 50%/50%, MMA: methyl methacrylate, molecular weight: 5000)

Styrene 4: styrene/hydroxystyrene copolymer (composition ratio: 50%/50%, molecular weight: 5000)

<Other Compounds in Table>

Hydrogen bonding compound: 3-methyl salicylate, molecular weight of 150

Ionic surfactant: sodium dodecyl benzene sulfonate (ELECUT S-412-2 manufactured by Takemoto Oil & Fat Co., Ltd.)

<<Evaluation of Optical Film>>

The following measurements and evaluations of each of characteristic values described below were carried out on each of the optical films prepared above.

(Measurement of Film Thickness and Film Thickness Variation)

Film thicknesses (μm) were measured at 100 points with each interval of 10 mm in the widthwise direction or the lengthwise direction of a film using a micrometer, and an average value of the film thicknesses is defined to be a film thickness (μm). In addition, a difference between the maximum value and the minimum value of the film thicknesses in the widthwise direction or the lengthwise direction is defined to be a film thickness variation (μm) in the widthwise direction or the lengthwise direction.

The film thickness variation was evaluated based on the following indices.

⊙: A film thickness variation in the widthwise direction and the lengthwise direction is 1.5 μm or less.

◯: A film thickness variation in the widthwise direction and the lengthwise direction is more than 1.5 μm and 2.5 μm or less.

Δ: A film thickness variation in the widthwise direction and the lengthwise direction is more than 2.5 μm and 4 μm or less.

X: A film thickness variation in the widthwise direction and/or the lengthwise direction is more than 4 μm.

(Measurement of Retardation Value)

Retardation values Ro and Rt expressed by the formulas described below were measured in the prepared optical films at a wavelength of 590 nm under the environment at a temperature of 23° C. and a relative humidity of 55%, using an automatic birefringence analyzer, KOBRA-21ADH (Oji Scientific Instruments).

Specifically, a three-dimensional refractive index measurement was carried out on an optical film at 10 points at a wavelength of 590 nm under the environment at 23° C., 55% RH to find an average value of refractive indices of $n_x$, $n_y$, and $n_z$, thereafter calculating a retardation value Ro in the in-plane direction and a retardation value Rt in the thickness direction according to the following formulas.

$$Ro(590)=(n_x-n_y) \times d \qquad \text{Formula (i):}$$

$$Rt(590)=\{(n_x+n_y)/2-n_z\} \times d \qquad \text{Formula (ii):}$$

[In the formula (i) and the formula (ii), $n_x$ represents a refractive index in the direction x in which a refractive index becomes the maximum in the film plane direction. $n_y$ represents a refractive index in the direction y perpendicular to the direction x in the film plane direction. $n_z$ represents a refractive index in the film thickness direction z. d represents a film thickness (nm).]

(Measurement of Retardation Value Due to Humidity Fluctuation)

An optical film was humidity-controlled at 23° C. and 20% RH for 5 hours and an Rt value then measured in the same environment was assumed to be $Rt_{20\%}$ (590), and the same film was subsequently humidity-controlled at 23° C. and 80% RH for 5 hours and an Rt value then measured in the same environment was assumed to be $Rt_{80\%}(590)$ to find a variation amount ΔRt by the formula described below.

$$\Delta Rt = |Rt_{20\%}(590) - Rt_{80\%}(590)|$$

Further, the humidity-controlled samples were kept again in the environment of 23° C. and 55% RH for 5 hours, thereafter measuring the retardation values, and the fluctuation was confirmed to be a reversible fluctuation. When the number of this value is smaller, a film shows stability to humidity fluctuation.

An Rt humidity fluctuation was found according to the formula (1) described below using the above obtained ΔRt.

Formula (1) Rt humidity fluctuation=ΔRt/(Rt(590) value measured after standing still the film under the environment at 23° C. and a relative humidity of 55% for 5 hours)×100

An Rt humidity fluctuation was evaluated based on the following indices.

⊙: An Rt humidity fluctuation is 1.0% or more and less than 4.0%.

○: An Rt humidity fluctuation is 4.0% or more and less than 8.0%.

Δ: An Rt humidity fluctuation is 8.0% or more and 12.0% or less.

X: An Rt humidity fluctuation is less than 1% or more than 12%.

The constituent contents of the optical films and results of the above described evaluations are collectively shown in Tables 1 to 11 described below.

<<Production of Polarizing Plate>>

<Active Energy Ray Curable Adhesive Agent: Use of Cationic Polymerization-Type Adhesive Agent (Described as Cationic Polymerization-Type in Tables)>

[Production of Polarizing Plate 101]

(Production of Polarizer)

A polyvinyl alcohol film with a thickness of 30 μm was swollen with water at 35° C. The obtained film was immersed into an aqueous solution containing 0.075 g of iodine, 5 g of potassium iodide and 100 g of water for 60 seconds, and further immersed into an aqueous solution containing 3 g of potassium iodide, 7.5 g of boric acid and 100 g of water at 45° C. The obtained film was uniaxially stretched in the condition of a stretching temperature at 55° C. and a draw ratio of 5 times. This uniaxially stretched film was washed with water and then dried to thus obtain a polarizer with a thickness of 10 μm.

(Preparation of Active Energy Ray Curable Adhesive Agent Solution, Cationic Polymerization-Type, Described as Cationic Polymerization-Type in Tables)

After mixing respective components described below, the mixture was degassed to prepare an active energy ray curable adhesive agent solution. Note that triaryl sulfonium hexafluorophosphate was blended as a 50% propylene carbonate solution and the solid content of triaryl sulfonium hexafluorophosphate was described below.

| | |
|---|---|
| 3,4-epoxycyclohexylmethyl-3,4-epoxycyclohexane carboxylate | 45 parts by mass |
| Epolead GT-301 (alicyclic epoxy resin manufactured by Daicel Corporation) | 40 parts by mass |
| 1,4-butanedioldiglycidyl ether | 15 parts by mass |
| Triaryl sulfonium hexafluorophosphate | 2.3 parts by mass |
| 9,10-dibutoxyanthracene | 0.1 part by mass |
| 1,4-diethoxy naphthalene | 2.0 parts by mass |

(Preparation of Polarizing Plate 101)

A polarizing plate 101 constituted of the structure of the polarizing plate 101A in FIG. 2 was prepared according to the method described below. Numerical values in parentheses indicate the numbers of respective constituent elements described in FIG. 2.

First, a KC6UA film (manufactured by Konica Minolta Advanced Layers Co., Ltd.) was prepared as a protecting film (102), the active energy ray curable adhesive agent solution prepared above was coated to have a thickness of 5 μm, using a micro gravure coater (gravure roller: #300, rotational speed of 140%/line speed) and an active energy ray curable adhesive agent (103A) was formed.

Subsequently, the active energy ray curable adhesive agent solution prepared above was coated on the optical film 101 (101) prepared above in the same manner as described above to have the thickness of 5 μm and an active energy ray curable adhesive agent (103B) was formed.

The polyvinyl alcohol-iodine-based polarizer (104) produced above was arranged between the active energy ray curable adhesive agents (103A) and (103B), and laminated by a roller machine to obtain a laminated product formed by laminating the protecting film 1 (102)/active energy ray curable adhesive agent (103A)/polarizer (104)/active energy ray curable adhesive agent (103B)/optical film 101 (105). In this procedure, the slow axis of the optical film (105) and the absorption axis of the polarizer (104) are perpendicular to each other to laminate the respective components by a roller machine.

This laminated product was irradiated with an electron ray from both surface sides to prepare a polarizing plate 101 (101A).

The line speed was 20 m/min, the accelerating voltage was 250 kV, and the exposure dose was 20 kGy.

[Preparation of Polarizing Plates 102 to 108, 201 to 205, 301, 401 to 404, 501 to 504, 601 to 614, 701 to 708, 801 to 809, 901, 1001 to 1017, and 1101 to 1128]

Polarizing plates 102 to 108, 201 to 205, 301, 401 to 404, 501 to 504, 601 to 614, 701 to 708, 801 to 809, 901, 1001 to 1017, and 1101 to 1128 were prepared in the same manner as the preparation of the polarizing plate 101 except for changing the optical film 101 into optical films described in Tables 1 to 11.

<Active Energy Ray Curable Adhesive Agent: Use of Radical Polymerization Type Adhesive Agent (Described as Radical Polymerization Type in Tables)>

[Production of Polarizing Plate 1201]

(Production of Polarizer)

A polyvinyl alcohol film with a thickness of 70 μm was swollen with water at 35° C. The obtained film was immersed into an aqueous solution containing 0.075 g of iodine, 5 g of potassium iodide and 100 g of water for 60 seconds, and further immersed into an aqueous solution containing 3 g of potassium iodide, 7.5 g of boric acid and 100 g of water at 45° C. The obtained film was uniaxially stretched in the condition of a stretching temperature at 55° C. and a draw ratio of 5 times. This uniaxially stretched film was washed with water and then dried to thus obtain a polarizer with a thickness of 25 μm.

(Preparation of Active Energy Ray Curable Adhesive Agent Solution: Radical Polymerization Type, Described as Radical Polymerization Type in Tables)

A solution obtained by blending 3 parts by mass of a photopolymerization initiator (manufactured by BASF Japan Limited; product name IRGACURE 127) into 100 parts by mass of N-hydroxyethylacrylamide was used as a photocurable adhesive agent solution R.

(Production of Polarizing Plate)

A polarizing plate 1201 constituted of the structure of the polarizing plate 101A in FIG. 2 was manufactured according to the method described below. Numerical values in parentheses indicate the numbers of respective constituent elements described in FIG. 2.

First, the optical film 105 produced above was used as a retardation film (105), and the active energy ray curable adhesive agent solution R prepared above was coated to have a thickness of 5 μm, using a micro gravure coater (gravure roller: #300 rotational speed of 140%/line speed) and a photocurable resin layer (103B) was formed.

Subsequently, a Konica Minolta TAC KC4UY film (manufactured by Konica Minolta Advanced Layers, Co., Ltd.) was used as a protecting film (102), the photocurable adhesive agent solution R prepared above was coated in the same manner as described above to have a thickness of 5 μm and a photocurable resin layer (103A) was formed.

The polyvinyl alcohol-iodine-based polarizer (104) prepared above was arranged between the photocurable resin layers (103A) and (103B), and laminated by a roller machine to obtain a laminated product formed by laminating the protecting film (102)/photocurable resin layer (103A)/polarizer (104)/photocurable resin layer (103B)/retardation film (105). In this procedure, the slow axis of the retardation film (105) and the absorption axis of the polarizer (104) are perpendicular to each other to laminate the respective components by a roller machine. This laminated product was irradiated with an electron ray from both surface sides in the conditions of the line speed at 20 m/min, the accelerating voltage at 250 kV and the exposure dose of 20 kGy to prepare a polarizing plate 1201 (101A).

<Use of Polyvinyl Alcohol Adhesive Agent (Described as Polyvinyl Alcohol in Tables)>

[Production of Polarizing Plate 1202]

(Production of Polarizer)

A polyvinyl alcohol film having an average thickness of 52 µm and a water content of 4.4% was continuously treated in the order of preliminary swelling, dyeing, uniaxial stretching in a wet method, a fixing treatment, drying, and a thermal treatment to prepare a polarizer. That is, a PVA film was immersed into water at a temperature of 30° C. for 30 seconds to be preliminarily swollen, and immersed into an aqueous solution having an iodine concentration of 0.4 g/liter and a potassium iodide concentration of 40 g/liter at a temperature of 35° C. for 3 minutes to be swollen. Subsequently, the film was uniaxially stretched by 6 times in an aqueous solution having a boric acid concentration of 4% at 50° C. in the condition of a tensile strength added to the film of 700 N/m, and immersed into an aqueous solution having a potassium iodide concentration of 40 g/liter, a boric acid concentration of 40 g/liter and a zinc chloride concentration of 10 g/liter at a temperature of 30° C. for 5 minutes to conduct a fixing treatment. Then, the polyvinyl alcohol film was taken out and dried with hot air at temperature of 40° C., and further thermally treated at a temperature of 100° C. for 5 minutes. The obtained polarizer had an average thickness of 25 µm, and for polarization performance, a transmittance was 43.0%, a polarization degree was 99.5%, and a dichroic ratio was 40.1.

(Lamination)

According to the following steps a to e, the optical film 105 prepared above as a retardation film and a Konica Minolta TAC KC4UY (triacetyl cellulose film manufactured by Konica Minolta Advanced Layers, Inc.) as a protecting film were laminated on the polarizer.

<Step a>

The above described polarizer was immersed into a stock tank containing a polyvinyl alcohol adhesive agent solution having a solid content of 2% by mass for 1 to 2 seconds.

<Step b>

The KC4UY film as a protecting film and the optical film 105 prepared above as a retardation film were subjected to an alkaline saponification treatment in the conditions described below, washed with water, neutralized and washed with water in this order, and then dried at 100° C. Subsequently, an excess adhesive agent attached to the polarizer immersed into the polyvinyl alcohol adhesive agent solution in the step a was lightly removed, the KC4UY film and the above described optical film 105 were pinched with this polarizer and arranged as laminated layers. That is, a laminated product obtained by laminating the protecting film (102)/polyvinyl alcohol adhesive agent (103A)/polarizer (104)/polyvinyl alcohol adhesive agent (103B)/retardation film (105) was obtained (structure of polarizing plate 101A in FIG. 2).

<Alkaline Saponification Treatment>

Saponification step 1.5 mol/L-KOH aqueous solution, 50° C., 45 seconds

Water washing step 30° C., 60 seconds

Neutralization step 10% by mass HCl aqueous solution, 30° C., 45 seconds

Water washing step 30° C., 60 seconds

<Step c>

The laminated product was laminated at a pressure of 20 to 30 N/cm$^2$ and a speed of about 2 m/min using two rotating rollers. In this step, lamination was conducted carefully so that bubbles were not contained.

<Step d>

The sample prepared in the above described step c was treated by drying in a dryer at a temperature of 80° C. for 5 minutes, and the polarizing plate 1202 constituted of the structure of the polarizing plate 101A in FIG. 2 was prepared.

<<Production of Liquid Crystal Display>>

Using a commercially available VA-type liquid crystal display (40-type display KLV-40J3000 manufactured by Sony Corporation), polarizing plates laminated on both surfaces of a liquid crystal cell were peeled off, and each polarizing plate prepared above was laminated on both surfaces of the liquid crystal cell as shown in FIG. 2 to produce a liquid crystal display. In this production, the direction of the absorption axis of the polarizing plate is controlled to the same direction with the polarizing plate that was previously laminated.

<<Evaluation of Polarizing Plate and Liquid Crystal Display>>

Each evaluation described below was carried out on respective liquid crystal displays produced above and respective polarizing plates used in the production.

(Evaluation of Moisture Resistance: Evaluation of Color Unevenness Due to Fluctuation in Moisture Content)

The liquid crystal display produced above was laid down and placed on a board, or the like, and Bemcot (manufactured by Asahi Kasei Fibers Corporation) was mounted on a part of a polarizing plate for evaluation to be perfused with water. Bemcot was covered with 100 µm of PET in order to avoid drying, a signal of a black state was input to a TV from a PC and the power of the TV was turned on and left for 24 hours (room temperature was set at 23° C. and panel temperature was set at 38° C.). After 24 hours, Bemcot was removed. L* being a part where Bemcot was present is assumed to be L* of a water immersion part and measured by an EZ Contrast (manufactured by ELDIM). L* being a part without Bemcot was assumed to be L* of a non-immersion part and measured by an EZ Contrast. Note that the measurement with an EZ Contrast was conducted by turning a TV to a black state in a color mode. In the conditions of water immersion, the power of the panel was turned on and Bemcot that was sufficiently perfused with water was attached to the polarizing plate and left for 24 hours in that state. Subsequently, L* of a water immersion part/L* of a non-immersion part was calculated and color unevenness was evaluated according to the following criteria.

⊙: 1.05 or more and 1.30 or less: No generation of color unevenness is recognized.

○: More than 1.30 and 1.55 or less: Generation of slightly weak color unevenness is recognized but the quality practically has no problem.

Δ: More than 1.55 and 1.80 or less: Generation of color unevenness is recognized and the quality practically has a problem.

X: More than 1.80 and less than 1.05: Intensive color unevenness is generated and the quality has a problem in moisture resistance.

(Evaluation of Display Unevenness)

After continuously lighting each liquid crystal display produced above under the environment at 40° C. and 90% RH for 400 hours, presence or absence of display unevenness (brightness unevenness) and streak unevenness in a screen was visually observed, and an evaluation of display unevenness was carried out according to the following criteria.

⊙: No generation of display unevenness and brightness unevenness is recognized.

○: Almost no generation of display unevenness and brightness unevenness is recognized.

Δ: Generation of slightly weak display unevenness and brightness unevenness is recognized, which is not concerned in image display and is practically within an acceptable range.

X: Generation of intensive display unevenness and brightness unevenness is recognized and the quality practically has a problem.

The structural contents of the optical film and results of the above described evaluations are collectively shown in Tables 1 to 12 described below.

TABLE 1

| Optical film No. | Cellulose ester Ac | Cellulose ester Pr | Total substitution degree | Retardation increasing agent Kind | Retardation increasing agent Amount | Plasticizer 1 Kind | Plasticizer 1 Amount | Plasticizer 2 Kind | Plasticizer 2 Amount | Hydrogen bonding compound Amount | Surfactant Amount | Film thickness (μm) | Variation in film thickness (μm) |
|---|---|---|---|---|---|---|---|---|---|---|---|---|---|
| 101 | 2.35 | — | 2.35 | A-022 | 4 | FA-9 | 10 | — | — | — | — | 10 | X |
| 102 | 2.35 | — | 2.35 | A-022 | 4 | FA-9 | 10 | — | — | — | — | 15 | ○ |
| 103 | 2.35 | — | 2.35 | A-022 | 4 | FA-9 | 10 | — | — | — | — | 20 | ⊙ |
| 104 | 2.35 | — | 2.35 | A-022 | 4 | FA-9 | 10 | — | — | — | — | 25 | ⊙ |
| 105 | 2.35 | — | 2.35 | A-022 | 4 | FA-9 | 10 | — | — | — | — | 30 | ⊙ |
| 106 | 2.35 | — | 2.35 | A-022 | 4 | FA-9 | 10 | — | — | — | — | 35 | ○ |
| 107 | 2.35 | — | 2.35 | A-022 | 4 | FA-9 | 10 | — | — | — | — | 40 | X |
| 108 | 2.35 | — | 2.35 | A-022 | 4 | FA-9 | 10 | — | — | — | — | 50 | X |

| Optical film No. | Rt humidity fluctuation (L*) | Ro (590) (nm) | Rt (591) (nm) | ΔRt (590) (nm) | Polarizing plate/ Liquid crystal display No. | Adhesive agent | Display unevenness | Durability (Color unevenness due to fluctuation in moisture content) | Remarks |
|---|---|---|---|---|---|---|---|---|---|
| 101 | ○ | 40 | 120 | 6 | 101 | Cationic polymerization type | X | ○ | Comparative example |
| 102 | ○ | 45 | 120 | 7 | 102 | Cationic polymerization type | ○ | ○ | Present invention |
| 103 | ⊙ | 50 | 120 | 3 | 103 | Cationic polymerization type | ⊙ | ⊙ | Present invention |
| 104 | ⊙ | 52 | 123 | 4 | 104 | Cationic polymerization type | ⊙ | ⊙ | Present invention |
| 105 | ⊙ | 50 | 125 | 4 | 105 | Cationic polymerization type | ⊙ | ⊙ | Present invention |
| 106 | ○ | 52 | 123 | 7 | 106 | Cationic polymerization type | ○ | ○ | Present invention |
| 107 | X | 55 | 125 | 17 | 107 | Cationic polymerization type | X | X | Comparative example |
| 108 | X | 55 | 130 | 20 | 108 | Cationic polymerization type | X | X | Comparative example |

TABLE 2

| Optical film No. | Cellulose ester Ac | Cellulose ester Pr | Total substitution degree | Retardation increasing agent Kind | Retardation increasing agent Amount | Plasticizer 1 Kind | Plasticizer 1 Amount | Plasticizer 2 Kind | Plasticizer 2 Amount | Hydrogen bonding compound Amount | Surfactant Amount | Film thickness (μm) | Variation in film thickness (μm) |
|---|---|---|---|---|---|---|---|---|---|---|---|---|---|
| 201 | 2 | — | 2 | A-022 | 4 | FA-9 | 10 | — | — | — | — | 30 | X |
| 202 | 2.15 | — | 2.15 | A-022 | 4 | FA-9 | 10 | — | — | — | — | 30 | ⊙ |
| 203 | 2.25 | — | 2.25 | A-022 | 4 | FA-9 | 10 | — | — | — | — | 30 | ⊙ |

TABLE 2-continued

| | | | | | | | | | | | | |
|---|---|---|---|---|---|---|---|---|---|---|---|---|
| 204 | 2.5 | — | 2.5 | A-022 | 4 | FA-9 | 10 | — | — | — | — | 30 | ○ |
| 205 | 2.7 | | 2.7 | A-022 | 4 | FA-9 | 10 | — | — | — | — | 30 | X |

| Optical film No. | Rt humidity fluctuation (L*) | Retardation value | | | Polarizing plate/ Liquid crystal display No. | Adhesive agent | Display unevenness | Durability (Color unevenness due to fluctuation in moisture content) | Remarks |
|---|---|---|---|---|---|---|---|---|---|
| | | Ro (590) (nm) | Rt (591) (nm) | ΔRt (590) (nm) | | | | | |
| 201 | ○ | 55 | 130 | 7 | 201 | Cationic polymerization type | X | ○ | Comparative example |
| 202 | ⊙ | 52 | 123 | 3 | 202 | Cationic polymerization type | ⊙ | ⊙ | Present invention |
| 203 | ⊙ | 50 | 120 | 4 | 203 | Cationic polymerization type | ⊙ | ⊙ | Present invention |
| 204 | ○ | 52 | 123 | 8 | 204 | Cationic polymerization type | ○ | ○ | Present invention |
| 205 | X | 45 | 120 | 17 | 205 | Cationic polymerization type | X | X | Comparative example |

TABLE 3

| Optical film No. | Cellulose ester | | Total substitution degree | Retardation increasing agent | | Plasticizer 1 | | Plasticizer 2 | | Hydrogen bonding compound Amount | Surfactant Amount | Film thickness (μm) | Variation in film thickness (μm) |
|---|---|---|---|---|---|---|---|---|---|---|---|---|---|
| | Ac | Pr | | Kind | Amount | Kind | Amount | Kind | Amount | | | | |
| 301 | 1.56 | 0.9 | 2.46 | A-022 | 4 | FA-12 | 10 | — | — | — | — | 30 | ○ |

| Optical film No. | Rt humidity fluctuation (L*) | Retardation value | | | Polarizing plate/ Liquid crystal display No. | Adhesive agent | Display unevenness | Durability (Color unevenness due to fluctuation in moisture content) | Remarks |
|---|---|---|---|---|---|---|---|---|---|
| | | Ro (590) (nm) | Rt (591) (nm) | ΔRt (590) (nm) | | | | | |
| 301 | ○ | 52 | 123 | 8 | 301 | Cationic polymerization type | ○ | ○ | Present invention |

TABLE 4

| Optical film No. | Cellulose ester | | Total substitution degree | Retardation increasing agent | | Plasticizer 1 | | Plasticizer 2 | | Hydrogen bonding compound Amount | Surfactant Amount | Film thickness (μm) | Variation in film thickness (μm) |
|---|---|---|---|---|---|---|---|---|---|---|---|---|---|
| | Ac | Pr | | Kind | Amount | Kind | Amount | Kind | Amount | | | | |
| 401 | 2.35 | — | 2.35 | — | — | FA-9 | 10 | — | — | — | — | 30 | Δ |
| 402 | 2.35 | — | 2.35 | A-022 | 2 | FA-9 | 10 | — | — | — | — | 30 | Δ |
| 403 | 2.35 | — | 2.35 | A-022 | 6 | FA-9 | 10 | — | — | — | — | 30 | ⊙ |
| 404 | 2.35 | — | 2.35 | A-022 | 8 | FA-9 | 10 | — | — | — | — | 30 | ○ |

TABLE 4-continued

| Optical film No. | Rt humidity fluctuation (L*) | Ro (590) (nm) | Rt (591) (nm) | ΔRt (590) (nm) | Polarizing plate/ Liquid crystal display No. | Adhesive agent | Display unevenness | Durability (Color unevenness due to fluctuation in moisture content) | Remarks |
|---|---|---|---|---|---|---|---|---|---|
| 401 | X | 30 | 110 | 16 | 401 | Cationic polymerization type | Δ | X | Comparative example |
| 402 | Δ | 48 | 123 | 12 | 402 | Cationic polymerization type | Δ | Δ | Present invention |
| 403 | ⊙ | 52 | 123 | 3 | 403 | Cationic polymerization type | ⊙ | ⊙ | Present invention |
| 404 | ⊙ | 55 | 125 | 2 | 404 | Cationic polymerization type | ○ | ⊙ | Present invention |

TABLE 5

| Optical film No. | Cellulose ester | | Retardation increasing agent | | Plasticizer 1 | | Plasticizer 2 | | Hydrogen bonding compound | Surfactant | Film thickness (μm) | Variation in film thickness (μm) |
|---|---|---|---|---|---|---|---|---|---|---|---|---|
| | Ac | Pr | Total substitution degree | Kind | Amount | Kind | Amount | Kind | Amount | Amount | Amount | | |
| 501 | 2.35 | — | 2.35 | A-022 | 4 | — | — | — | — | — | — | 30 | X |
| 502 | 2.35 | — | 2.35 | A-022 | 4 | FA-9 | 5 | — | — | — | — | 30 | Δ |
| 503 | 2.35 | — | 2.35 | A-022 | 4 | FA-9 | 20 | — | — | — | — | 30 | ⊙ |
| 504 | 2.35 | — | 2.35 | A-022 | 4 | FA-9 | 30 | — | — | — | — | 30 | ⊙ |

| Optical film No. | Rt humidity fluctuation (L*) | Ro (590) (nm) | Rt (591) (nm) | ΔRt (590) (nm) | Polarizing plate/ Liquid crystal display No. | Adhesive agent | Display unevenness | Durability (Color unevenness due to fluctuation in moisture content) | Remarks |
|---|---|---|---|---|---|---|---|---|---|
| 501 | Δ | 52 | 123 | 18 | 501 | Cationic polymerization type | X | Δ | Comparative example |
| 502 | Δ | 50 | 120 | 12 | 502 | Cationic polymerization type | Δ | Δ | Present invention |
| 503 | ⊙ | 48 | 123 | 3 | 503 | Cationic polymerization type | ⊙ | ⊙ | Present invention |
| 504 | ⊙ | 45 | 120 | 4 | 504 | Cationic polymerization type | ⊙ | ⊙ | Present invention |

TABLE 6

| Optical film No. | Cellulose ester | | Retardation increasing agent | | Plasticizer 1 | | Plasticizer 2 | | Hydrogen bonding compound | Surfactant | Film thickness (μm) | Variation in film thickness (μm) |
|---|---|---|---|---|---|---|---|---|---|---|---|---|
| | Ac | Pr | Total substitution degree | Kind | Amount | Kind | Amount | Kind | Amount | Amount | Amount | | |
| 601 | 2.35 | — | 2.35 | A-002 | 4 | FA-9 | 10 | — | — | — | — | 30 | ⊙ |
| 602 | 2.35 | — | 2.35 | A-009 | 4 | FA-9 | 10 | — | — | — | — | 30 | ⊙ |
| 603 | 2.35 | — | 2.35 | A-026 | 4 | FA-9 | 10 | — | — | — | — | 30 | ⊙ |
| 604 | 2.35 | — | 2.35 | A-032 | 4 | FA-9 | 10 | — | — | — | — | 30 | ⊙ |
| 605 | 2.35 | — | 2.35 | A-037 | 4 | FA-9 | 10 | — | — | — | — | 30 | ○ |
| 606 | 2.35 | — | 2.35 | A-041 | 4 | FA-9 | 10 | — | — | — | — | 30 | ○ |
| 607 | 2.35 | — | 2.35 | A-051 | 4 | FA-9 | 10 | — | — | — | — | 30 | ○ |
| 608 | 2.35 | — | 2.35 | A-073 | 4 | FA-9 | 10 | — | — | — | — | 30 | ⊙ |

TABLE 6-continued

| | | | | | | | | | | | | |
|---|---|---|---|---|---|---|---|---|---|---|---|---|
| 609 | 2.35 | — | 2.35 | A-097 | 4 | FA-9 | 10 | — | — | — | — | 30 | ○ |
| 610 | 2.35 | — | 2.35 | A-115 | 4 | FA-9 | 10 | — | — | — | — | 30 | ○ |
| 611 | 2.35 | — | 2.35 | A-133 | 4 | FA-9 | 10 | — | — | — | — | 30 | ○ |
| 612 | 2.35 | — | 2.35 | C-1 | 4 | FA-9 | 10 | — | — | — | — | 30 | X |
| 613 | 2.35 | — | 2.35 | C-2 | 4 | FA-9 | 10 | — | — | — | — | 30 | X |
| 614 | 2.35 | — | 2.35 | C-3 | 4 | FA-9 | 10 | — | — | — | — | 30 | X |

| Optical film No. | Rt humidity fluctuation (L*) | Retardation value Ro (590) (nm) | Rt (591) (nm) | ΔRt (590) (nm) | Polarizing plate/ Liquid crystal display No. | Adhesive agent | Display unevenness | Durability (Color unevenness due to fluctuation in moisture content) | Remarks |
|---|---|---|---|---|---|---|---|---|---|
| 601 | ⊙ | 50 | 125 | 4 | 601 | Cationic polymerization type | ⊙ | ⊙ | Present invention |
| 602 | ⊙ | 50 | 125 | 4 | 602 | Cationic polymerization type | ⊙ | ⊙ | Present invention |
| 603 | ⊙ | 50 | 120 | 3 | 603 | Cationic polymerization type | ⊙ | ⊙ | Present invention |
| 604 | ⊙ | 50 | 125 | 3 | 604 | Cationic polymerization type | ⊙ | ⊙ | Present invention |
| 605 | ⊙ | 55 | 125 | 3 | 605 | Cationic polymerization type | ○ | ⊙ | Present invention |
| 606 | ⊙ | 50 | 125 | 4 | 606 | Cationic polymerization type | ○ | ⊙ | Present invention |
| 607 | ⊙ | 50 | 120 | 4 | 607 | Cationic polymerization type | ○ | ⊙ | Present invention |
| 608 | ⊙ | 50 | 125 | 2 | 608 | Cationic polymerization type | ⊙ | ⊙ | Present invention |
| 609 | ⊙ | 55 | 125 | 4 | 609 | Cationic polymerization type | ○ | ⊙ | Present invention |
| 610 | ⊙ | 55 | 130 | 4 | 610 | Cationic polymerization type | ○ | ⊙ | Present invention |
| 611 | ⊙ | 50 | 125 | 2 | 611 | Cationic polymerization type | ○ | ⊙ | Present invention |
| 612 | X | 52 | 123 | 16 | 612 | Cationic polymerization type | X | X | Comparative example |
| 613 | X | 55 | 125 | 16 | 613 | Cationic polymerization type | X | X | Comparative example |
| 614 | X | 55 | 130 | 17 | 614 | Cationic polymerization type | X | X | Comparative example |

TABLE 7

| Optical film No. | Cellulose ester | | Total substitution degree | Retardation increasing agent | | Plasticizer 1 | | Plasticizer 2 | | Hydrogen bonding compound Amount | Surfactant Amount | Film thickness (μm) | Variation in film thickness (μm) |
|---|---|---|---|---|---|---|---|---|---|---|---|---|---|
| | Ac | Pr | | Kind | Amount | Kind | Amount | Kind | Amount | | | | |
| 701 | 2.35 | — | 2.35 | A-022 | 4 | FA-11 | 10 | — | — | — | — | 30 | ⊙ |
| 702 | 2.35 | — | 2.35 | A-022 | 4 | FA-12 | 10 | — | — | — | — | 30 | ⊙ |
| 703 | 2.35 | — | 2.35 | A-022 | 4 | FA-8 | 10 | — | — | — | — | 30 | ⊙ |
| 704 | 2.35 | — | 2.35 | A-022 | 4 | FB-14 | 10 | — | — | — | — | 30 | ⊙ |
| 705 | 2.35 | — | 2.35 | A-022 | 4 | FB-15 | 10 | — | — | — | — | 30 | ⊙ |
| 706 | 2.35 | — | 2.35 | A-022 | 4 | FB-16 | 10 | — | — | — | — | 30 | ⊙ |
| 707 | 2.35 | — | 2.35 | A-022 | 4 | Acryl 1 | 10 | — | — | — | — | 30 | ○ |
| 708 | 2.35 | — | 2.35 | A-022 | 4 | Acryl 2 | 10 | — | — | — | — | 30 | ○ |

TABLE 7-continued

| Optical film No. | Rt humidity fluctuation (L*) | Retardation value Ro (590) (nm) | Rt (591) (nm) | ΔRt (590) (nm) | Polarizing plate/ Liquid crystal display No. | Adhesive agent | Display unevenness | Durability (Color unevenness due to fluctuation in moisture content) | Remarks |
|---|---|---|---|---|---|---|---|---|---|
| 701 | ○ | 52 | 123 | 7 | 701 | Cationic polymerization type | ⊙ | ○ | Present invention |
| 702 | ⊙ | 50 | 125 | 2 | 702 | Cationic polymerization type | ⊙ | ⊙ | Present invention |
| 703 | ⊙ | 55 | 125 | 4 | 703 | Cationic polymerization type | ⊙ | ⊙ | Present invention |
| 704 | ⊙ | 50 | 125 | 2 | 704 | Cationic polymerization type | ⊙ | ⊙ | Present invention |
| 705 | ⊙ | 50 | 120 | 4 | 705 | Cationic polymerization type | ⊙ | ⊙ | Present invention |
| 706 | ⊙ | 55 | 130 | 4 | 706 | Cationic polymerization type | ⊙ | ⊙ | Present invention |
| 707 | ⊙ | 52 | 123 | 3 | 707 | Cationic polymerization type | ○ | ⊙ | Present invention |
| 708 | ⊙ | 50 | 125 | 2 | 708 | Cationic polymerization type | ○ | ⊙ | Present invention |

TABLE 8

| Optical film No. | Cellulose ester Total substitution degree Ac | Cellulose ester Total substitution degree Pr | Retardation increasing agent Kind | Retardation increasing agent Amount | Plasticizer 1 Kind | Plasticizer 1 Amount | Plasticizer 2 Kind | Plasticizer 2 Amount | Hydrogen bonding compound Amount | Surfactant Amount | Film thickness (μm) | Variation in film thickness (μm) |
|---|---|---|---|---|---|---|---|---|---|---|---|---|
| 801 | 2.35 | — | 2.35 | — | — | — | — | — | — | — | — | 30 | X |
| 802 | 2.35 | — | 2.35 | — | — | FA-9 | 5 | — | — | — | — | 30 | X |
| 803 | 2.35 | — | 2.35 | — | — | FA-9 | 10 | — | — | — | — | 30 | Δ |
| 804 | 2.35 | — | 2.35 | — | — | FA-9 | 20 | — | — | — | — | 30 | ○ |
| 805 | 2.35 | — | 2.35 | — | — | FA-9 | 30 | — | — | — | — | 30 | ⊙ |
| 806 | 2.35 | — | 2.35 | A-022 | 2 | — | — | — | — | — | — | 30 | X |
| 807 | 2.35 | — | 2.35 | A-022 | 4 | — | — | — | — | — | — | 30 | X |
| 808 | 2.35 | — | 2.35 | A-022 | 6 | — | — | — | — | — | — | 30 | Δ |
| 809 | 2.35 | — | 2.35 | A-022 | 8 | — | — | — | — | — | — | 30 | ○ |

| Optical film No. | Rt humidity fluctuation (L*) | Retardation value Ro (590) (nm) | Rt (591) (nm) | ΔRt (590) (nm) | Polarizing plate/ Liquid crystal display No. | Adhesive agent | Display unevenness | Durability (Color unevenness due to fluctuation in moisture content) | Remarks |
|---|---|---|---|---|---|---|---|---|---|
| 801 | X | 30 | 100 | 20 | 801 | Cationic polymerization type | X | X | Comparative example |
| 802 | X | 35 | 110 | 18 | 802 | Cationic polymerization type | X | X | Comparative example |
| 803 | X | 30 | 110 | 16 | 803 | Cationic polymerization type | Δ | X | Comparative example |
| 804 | Δ | 30 | 110 | 10 | 804 | Cationic polymerization type | ○ | Δ | Present invention |
| 805 | ○ | 30 | 110 | 8 | 805 | Cationic polymerization type | ⊙ | ○ | Present invention |

TABLE 8-continued

| | | | | | | | | | |
|---|---|---|---|---|---|---|---|---|---|
| 806 | X | 48 | 123 | 18 | 806 | Cationic polymerization type | X | X | Comparative example |
| 807 | Δ | 50 | 120 | 12 | 807 | Cationic polymerization type | X | Δ | Comparative example |
| 808 | Δ | 52 | 123 | 12 | 808 | Cationic polymerization type | Δ | Δ | Present invention |
| 809 | ○ | 55 | 125 | 8 | 809 | Cationic polymerization type | ○ | ○ | Present invention |

TABLE 9

| Optical film No. | Cellulose ester | | Retardation increasing agent | | Plasticizer 1 | | Plasticizer 2 | | Hydrogen bonding compound Amount | Surfactant Amount | Film thickness (μm) | Variation in film thickness (μm) |
|---|---|---|---|---|---|---|---|---|---|---|---|---|
| | Ac | Pr | Total substitution degree | Kind | Amount | Kind | Amount | Kind | Amount | | | |
| 901 | 2.45 | — | 2.45 | A-022 | 3 | FA-9 | 10 | — | — | — | — | 30 | ⊙ |

| Optical film No. | Rt humidity fluctuation (L*) | Retardation value | | | Polarizing plate/Liquid crystal display No. | Adhesive agent | Display unevenness | Durability (Color unevenness due to fluctuation in moisture content) | Remarks |
|---|---|---|---|---|---|---|---|---|---|
| | | Ro (590) (nm) | Rt (591) (nm) | ΔRt (590) (nm) | | | | | |
| 901 | ⊙ | 50 | 120 | 4 | 901 | Cationic polymerization type | ⊙ | ⊙ | Present invention |

TABLE 10

| Optical film No. | Cellulose ester | | Retardation increasing agent | | Plasticizer 1 | | Plasticizer 2 | | Hydrogen bonding compound Amount | Surfactant Amount | Film thickness (μm) | Variation in film thickness (μm) |
|---|---|---|---|---|---|---|---|---|---|---|---|---|
| | Ac | Pr | Total substitution degree | Kind | Amount | Kind | Amount | Kind | Amount | | | |
| 1001 | 2.35 | — | 2.35 | A-022 | 3 | FA-9 | 5 | FA-3 | 5 | — | — | 30 | ○ |
| 1002 | 2.35 | — | 2.35 | A-022 | 3 | FA-9 | 5 | Acryl 1 | 5 | — | — | 30 | ○ |
| 1003 | 2.35 | — | 2.35 | A-022 | 3 | FA-9 | 5 | Acryl 2 | 5 | — | — | 30 | ○ |
| 1004 | 2.35 | — | 2.35 | A-022 | 3 | FA-9 | 5 | Styrene 1 | 5 | — | — | 30 | ○ |
| 1005 | 2.35 | — | 2.35 | A-022 | 0 | FA-9 | 5 | Styrene 2 | 5 | — | — | 30 | ○ |
| 1006 | 2.35 | — | 2.35 | A-022 | 0 | FA-9 | 5 | Styrene 3 | 5 | — | — | 30 | ○ |
| 1007 | 2.35 | — | 2.35 | A-022 | 0 | FA-9 | 5 | Styrene 4 | 5 | — | — | 30 | ○ |
| 1008 | 2.45 | — | 2.45 | A-022 | 0 | FA-9 | 5 | FA-3 | 5 | — | — | 30 | ○ |
| 1009 | 2.45 | — | 2.45 | A-022 | 0 | FA-9 | 5 | Acryl 1 | 5 | — | — | 30 | ○ |
| 1010 | 2.45 | — | 2.45 | A-022 | 0 | FA-9 | 5 | Acryl 2 | 5 | — | — | 30 | ○ |
| 1011 | 2.45 | — | 2.45 | A-022 | 0 | FA-9 | 5 | Styrene 1 | 5 | — | — | 30 | ○ |
| 1012 | 2.45 | — | 2.45 | A-022 | 0 | FA-9 | 5 | Styrene 2 | 5 | — | — | 30 | ○ |
| 1013 | 2.45 | — | 2.45 | A-022 | 0 | FA-9 | 5 | Styrene 3 | 5 | — | — | 30 | ○ |
| 1014 | 2.45 | — | 2.45 | A-022 | 0 | FA-9 | 5 | Styrene 4 | 5 | — | — | 30 | ○ |
| 1015 | 1.56 | 0.9 | 2.46 | A-022 | 0 | FA-12 | 5 | FA-3 | 5 | — | — | 30 | ○ |
| 1016 | 1.56 | 0.9 | 2.46 | A-022 | 3 | FA-12 | 5 | Acryl 1 | 5 | — | — | 30 | ○ |
| 1017 | 1.56 | 0.9 | 2.46 | A-022 | 3 | FA-12 | 5 | Styrene 2 | 5 | — | — | 30 | ○ |

| Optical film No. | Rt humidity fluctuation (L*) | Retardation value | | | Polarizing plate/Liquid crystal display No. | Adhesive agent | Display unevenness | Durability (Color unevenness due to fluctuation in moisture content) | Remarks |
|---|---|---|---|---|---|---|---|---|---|
| | | Ro (590) (nm) | Rt (591) (nm) | ΔRt (590) (nm) | | | | | |
| 1001 | ⊙ | 50 | 125 | 3 | 1001 | Cationic polymerization type | ○ | ⊙ | Present invention |

TABLE 10-continued

| | | | | | | | | | | | |
|---|---|---|---|---|---|---|---|---|---|---|---|
| | 1002 | ◉ | 50 | 125 | 4 | 1002 | Cationic polymerization type | ○ | | ◉ | Present invention |
| | 1003 | ◉ | 50 | 120 | 4 | 1003 | Cationic polymerization type | ○ | | ◉ | Present invention |
| | 1004 | ◉ | 52 | 123 | 2 | 1004 | Cationic polymerization type | ○ | | ◉ | Present invention |
| | 1005 | ◉ | 50 | 125 | 3 | 1005 | Cationic polymerization type | ○ | | ◉ | Present invention |
| | 1006 | ◉ | 52 | 123 | 4 | 1006 | Cationic polymerization type | ○ | | ◉ | Present invention |
| | 1007 | ◉ | 55 | 125 | 3 | 1007 | Cationic polymerization type | ○ | | ◉ | Present invention |
| | 1008 | ◉ | 50 | 125 | 3 | 1008 | Cationic polymerization type | ○ | | ◉ | Present invention |
| | 1009 | ◉ | 50 | 125 | 4 | 1009 | Cationic polymerization type | ○ | | ◉ | Present invention |
| | 1010 | ◉ | 50 | 120 | 4 | 1010 | Cationic polymerization type | ○ | | ◉ | Present invention |
| | 1011 | ◉ | 52 | 123 | 2 | 1011 | Cationic polymerization type | ○ | | ◉ | Present invention |
| | 1012 | ◉ | 50 | 125 | 3 | 1012 | Cationic polymerization type | ○ | | ◉ | Present invention |
| | 1013 | ◉ | 52 | 123 | 4 | 1013 | Cationic polymerization type | ○ | | ◉ | Present invention |
| | 1014 | ◉ | 55 | 125 | 3 | 1014 | Cationic polymerization type | ○ | | ◉ | Present invention |
| | 1015 | ◉ | 50 | 125 | 3 | 1015 | Cationic polymerization type | ○ | | ◉ | Present invention |
| | 1016 | ◉ | 50 | 125 | 4 | 1016 | Cationic polymerization type | ○ | | ◉ | Present invention |
| | 1017 | ◉ | 50 | 125 | 3 | 1017 | Cationic polymerization type | ○ | | ◉ | Present invention |

TABLE 11

| Optical film No. | Cellulose ester | | Total substitution degree | Retardation increasing agent | | Plasticizer 1 | | Plasticizer 2 | | Hydrogen bonding compound | Surfactant | Film thickness (μm) | Variation in film thickness (μm) |
|---|---|---|---|---|---|---|---|---|---|---|---|---|---|
| | Ac | Pr | | Kind | Amount | Kind | Amount | Kind | Amount | Amount | Amount | | |
| 1101 | 2.35 | — | 2.35 | A-022 | 4 | — | — | — | — | 10 | — | 30 | ○ |
| 1102 | 2.35 | — | 2.35 | A-022 | 2 | — | — | — | — | 5 | — | 30 | ○ |
| 1103 | 2.35 | — | 2.35 | — | — | — | — | — | — | 5 | — | 30 | ○ |
| 1104 | 2.35 | — | 2.35 | A-022 | 3 | FA-9 | 5 | Acryl 1 | 5 | 3 | — | 30 | ○ |
| 1105 | 2.45 | — | 2.45 | A-022 | 3 | FA-9 | 5 | Styrene 2 | 5 | 3 | — | 30 | ○ |
| 1106 | 1.56 | 0.9 | 2.46 | A-022 | 3 | FA-12 | 5 | FA-3 | 5 | 3 | — | 30 | ○ |
| 1107 | 2.35 | — | 2.35 | A-022 | 3 | FA-9 | 10 | — | — | — | 0.75 | 30 | ○ |
| 1108 | 2.45 | — | 2.45 | A-022 | 3 | FA-9 | 10 | — | — | — | 0.75 | 30 | ○ |
| 1109 | 2.35 | — | 2.35 | A-022 | 3 | FA-9 | 5 | FA-3 | 5 | — | 0.75 | 30 | ○ |
| 1110 | 2.35 | — | 2.35 | A-022 | 3 | FA-9 | 5 | Acryl 1 | 5 | — | 0.75 | 30 | ○ |
| 1111 | 2.35 | — | 2.35 | A-022 | 3 | FA-9 | 5 | Acryl 2 | 5 | — | 0.75 | 30 | ○ |
| 1112 | 2.35 | — | 2.35 | A-022 | 3 | FA-9 | 5 | Styrene 1 | 5 | — | 0.75 | 30 | ○ |
| 1113 | 2.35 | — | 2.35 | A-022 | 3 | FA-9 | 5 | Styrene 2 | 5 | — | 0.75 | 30 | ○ |
| 1114 | 2.35 | — | 2.35 | A-022 | 3 | FA-9 | 5 | Styrene 3 | 5 | — | 0.75 | 30 | ○ |
| 1115 | 2.35 | — | 2.35 | A-022 | 3 | FA-9 | 5 | Styrene 4 | 5 | — | 0.75 | 30 | ○ |
| 1116 | 2.45 | — | 2.45 | A-022 | 3 | FA-9 | 5 | FA-3 | 5 | — | 0.75 | 30 | ○ |
| 1117 | 2.45 | — | 2.45 | A-022 | 3 | FA-9 | 5 | Acryl 1 | 5 | — | 0.75 | 30 | ○ |
| 1118 | 2.45 | — | 2.45 | A-022 | 3 | FA-9 | 5 | Acryl 2 | 5 | — | 0.75 | 30 | ○ |

TABLE 11-continued

| | | | | | | | | | | | | | |
|---|---|---|---|---|---|---|---|---|---|---|---|---|---|
| 1119 | 2.45 | — | 2.45 | A-022 | 3 | FA-9 | 5 | Styrene 1 | 5 | — | 0.75 | 30 | ◯ |
| 1120 | 2.45 | — | 2.45 | A-022 | 3 | FA-9 | 5 | Styrene 2 | 5 | — | 0.75 | 30 | ◯ |
| 1121 | 2.45 | — | 2.45 | A-022 | 3 | FA-9 | 5 | Styrene 3 | 5 | — | 0.75 | 30 | ◯ |
| 1122 | 2.45 | — | 2.45 | A-022 | 3 | FA-9 | 5 | Styrene 4 | 5 | — | 0.75 | 30 | ◯ |
| 1123 | 1.56 | 0.9 | 2.46 | A-022 | 3 | FA-12 | 5 | FA-3 | 5 | — | 0.75 | 30 | ◯ |
| 1124 | 1.56 | 0.9 | 2.46 | A-022 | 3 | FA-12 | 5 | Acryl 1 | 5 | — | 0.75 | 30 | ◯ |
| 1125 | 1.56 | 0.9 | 2.46 | A-022 | 3 | FA-12 | 5 | Styrene 2 | 5 | — | 0.75 | 30 | ◯ |
| 1126 | 2.35 | — | 2.35 | A-022 | 3 | FA-9 | 5 | Acryl 1 | 5 | 3 | 0.75 | 30 | ◯ |
| 1127 | 2.45 | — | 2.45 | A-022 | 3 | FA-9 | 5 | Styrene 2 | 5 | 3 | 0.75 | 30 | ◯ |
| 1128 | 1.56 | 0.9 | 2.46 | A-022 | 3 | FA-12 | 5 | FA-3 | 5 | 3 | 0.75 | 30 | ◯ |

| Optical film No. | Rt humidity fluctuation (L*) | Retardation value Ro (590) (nm) | Rt (591) (nm) | ΔRt (590) (nm) | Polarizing plate/ Liquid crystal display No. | Adhesive agent | Display unevenness | Durability (Color unevenness due to fluctuation in moisture content) | Remarks |
|---|---|---|---|---|---|---|---|---|---|
| 1101 | ◯ | 52 | 123 | 7 | 1101 | Cationic polymerization type | ◯ | ◯ | Present invention |
| 1102 | ⊙ | 55 | 125 | 4 | 1102 | Cationic polymerization type | ◯ | ⊙ | Present invention |
| 1103 | ⊙ | 55 | 125 | 3 | 1103 | Cationic polymerization type | ◯ | ⊙ | Present invention |
| 1104 | ◯ | 50 | 125 | 2 | 1104 | Cationic polymerization type | ◯ | ◯ | Present invention |
| 1105 | ◯ | 52 | 123 | 3 | 1105 | Cationic polymerization type | ◯ | ◯ | Present invention |
| 1106 | ◯ | 50 | 125 | 2 | 1106 | Cationic polymerization type | ◯ | ◯ | Present invention |
| 1107 | ◯ | 52 | 123 | 3 | 1107 | Cationic polymerization type | ◯ | ◯ | Present invention |
| 1108 | ◯ | 50 | 125 | 2 | 1108 | Cationic polymerization type | ◯ | ◯ | Present invention |
| 1109 | ⊙ | 50 | 125 | 3 | 1109 | Cationic polymerization type | ◯ | ⊙ | Present invention |
| 1110 | ⊙ | 50 | 125 | 4 | 1110 | Cationic polymerization type | ◯ | ⊙ | Present invention |
| 1111 | ⊙ | 50 | 120 | 4 | 1111 | Cationic polymerization type | ◯ | ⊙ | Present invention |
| 1112 | ⊙ | 52 | 123 | 2 | 1112 | Cationic polymerization type | ◯ | ⊙ | Present invention |
| 1113 | ⊙ | 50 | 125 | 3 | 1113 | Cationic polymerization type | ◯ | ⊙ | Present invention |
| 1114 | ⊙ | 52 | 123 | 4 | 1114 | Cationic polymerization type | ◯ | ⊙ | Present invention |
| 1115 | ⊙ | 55 | 125 | 3 | 1115 | Cationic polymerization type | ◯ | ⊙ | Present invention |
| 1116 | ⊙ | 50 | 125 | 3 | 1116 | Cationic polymerization type | ◯ | ⊙ | Present invention |
| 1117 | ⊙ | 50 | 125 | 4 | 1117 | Cationic polymerization type | ◯ | ⊙ | Present invention |
| 1118 | ⊙ | 50 | 120 | 4 | 1118 | Cationic polymerization type | ◯ | ⊙ | Present invention |
| 1119 | ⊙ | 52 | 123 | 2 | 1119 | Cationic polymerization type | ◯ | ⊙ | Present invention |
| 1120 | ⊙ | 50 | 125 | 3 | 1120 | Cationic polymerization type | ◯ | ⊙ | Present invention |

TABLE 11-continued

| | | | | | | | | | | |
|---|---|---|---|---|---|---|---|---|---|---|
| 1121 | ⊙ | 52 | 123 | 4 | 1121 | Cationic polymerization type | ○ | ⊙ | Present invention |
| 1122 | ⊙ | 55 | 125 | 3 | 1122 | Cationic polymerization type | ○ | ⊙ | Present invention |
| 1123 | ⊙ | 50 | 125 | 3 | 1123 | Cationic polymerization type | ○ | ⊙ | Present invention |
| 1124 | ⊙ | 50 | 125 | 4 | 1124 | Cationic polymerization type | ○ | ⊙ | Present invention |
| 1125 | ⊙ | 50 | 125 | 3 | 1125 | Cationic polymerization type | ○ | ⊙ | Present invention |
| 1126 | ○ | 50 | 125 | 4 | 1126 | Cationic polymerization type | ○ | ○ | Present invention |
| 1127 | ○ | 52 | 123 | 3 | 1127 | Cationic polymerization type | ○ | ○ | Present invention |
| 1128 | ○ | 50 | 125 | 3 | 1128 | Cationic polymerization type | ○ | ○ | Present invention |

TABLE 12

| Optical film No. | Cellulose ester | | Total substitution degree | Retardation increasing agent | | Plasticizer 1 | | Plasticizer 2 | | Hydrogen bonding compound Amount | Surfactant Amount | Film thickness (μm) | Variation in film thickness (μm) |
|---|---|---|---|---|---|---|---|---|---|---|---|---|---|
| | Ac | Pr | | Kind | Amount | Kind | Amount | Kind | Amount | | | | |
| 105 | 2.35 | — | 2.35 | A-022 | 4 | FA-9 | 10 | — | — | — | — | 30 | ⊙ |
| 105 | 2.35 | — | 2.35 | A-022 | 4 | FA09 | 10 | — | — | — | — | 30 | ⊙ |

| Optical film No. | Rt humidity fluctuation (L*) | Retardation value | | | Polarizing plate/ Liquid crystal display No. | Adhesive agent | Display unevenness | Durability (Color unevenness due to fluctuation in moisture content) | Remarks |
|---|---|---|---|---|---|---|---|---|---|
| | | Ro (590) (nm) | Rt (591) (nm) | ΔRt (590) (nm) | | | | | |
| 105 | ⊙ | 50 | 125 | 4 | 1201 | Radical polymerization type | ⊙ | ⊙ | Present invention |
| 105 | ⊙ | 50 | 125 | 4 | 1202 | Polyvinyl alcohol | ⊙ | ⊙ | Present invention |

The optical film of the present invention having a film thickness, a film thickness variation and a fluctuation in a retardation value (Rt humidity fluctuation) within the predetermined ranges was confirmed to keep a high retardation value and be excellent in bleed-out resistance and a slitting property as compared to films of comparative examples having some of these properties straying from the predetermined ranges. Furthermore, it was confirmed that a polarizing plate and a liquid crystal display using the optical film can be suppressed in generation of color unevenness, even if made in a size having a large area, and can be improved in durability such as moist heat resistance.

REFERENCE SIGNS LIST

1 Dissolution furnace
3, 6, 12, 15 Filter
4, 13 Stock tank
5, 14 Feeding pump
8, 16 Conduit tube
10 Ultraviolet absorber charge furnace
20 Junction tube
21 Mixer
30 Die
31 Metallic support
32 Web
33 Peeling position
34 Tenter device
35 Roller drying equipment
41 Charge furnace
42 Stock tank
43 Pump
44 Filter
101A, 101B Polarizing plate
102 Protecting film
103A, 103B Active energy ray curable adhesive agent,
104 Polarizer
105 Retardation film
106 Functional layer
107 Liquid crystal cell
108 Liquid crystal display

The invention claimed is:

1. A retardation film comprising a cellulose ester as the primary component, which has a film thickness of 15 μm or more and less than 40 μm, has a film thickness variation both in the widthwise direction and lengthwise direction of 0 to 4 μm, and satisfies an Rt humidity fluctuation represented by the formula (1) described below of 1.0% or more and less than 4.0%:

> Rt humidity fluctuation (ΔRt value, difference of retardation Rt(590) values in the thickness direction represented by the following formula (ii) measured at a wavelength of 590 nm after the film has been left to stand for 5 hours in each of a 23° C., 20% relative humidity environment and a 23° C., 80% relative humidity environment)/(Rt(590) value measured after the film has been left to stand for 5 hours in a 23° C., 55% relative humidity environment)×100    Formula (1)

$$Rt(590)=\{(n_x+n_y)/2-n_z\}\times d \quad \text{Formula (ii)}$$

wherein $n_x$ represents a refractive index in the slow axis direction in the film plane, $n_y$ represents a refractive index in the direction perpendicular to the slow axis in the film plane, $n_z$ represents a refractive index in the thickness direction of the film, and d represents a film thickness (nm), respectively, and wherein the retardation film further comprises at least one retardation increasing agent including a compound expressed by a general formula (1):

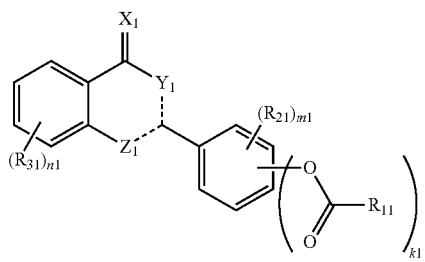

wherein $X_1$ represents an oxygen atom or a sulfur atom,
$Y_1$ represents an oxygen atom, a sulfur atom, or a nitrogen atom,
$Z_1$ represents an oxygen atom, a nitrogen atom or a sulfur atom,
$R_{11}$, $R_{21}$ and $R_{31}$ each represent a substituent,
$k_1$ represents an integer from 1 to 5,
$m_1$ represents an integer from 0 to 4,
$n_1$ represents an integer from 0 to 4, and
a dashed line represents a single bond (—) or a double bond (═).

2. The retardation film comprising a cellulose ester as the primary component according to claim 1, wherein the total substitution degree of the cellulose ester is 2.1 to 2.5.

3. The retardation film comprising a cellulose ester as the primary component according to claim 1, which comprises at least one plasticizer selected from the group consisting of sugar ester compounds, polyester compounds and acrylic compounds.

4. The retardation film comprising a cellulose ester as the primary component according to claim 1, wherein the total substitution degree of the cellulose ester is 2.15 to 2.35.

5. A polarizing plate, comprising retardation film according to claim 1 is adhered to a polarizer with an active energy ray curable adhesive agent.

6. A vertical alignment type liquid crystal display comprising the polarizing plate according to claim 5 on at least one surface of a liquid crystal cell.

7. The retardation film comprising a cellulose ester as the primary component according to claim 1, wherein the compound expressed by the general formula (1) is a compound expressed by a general formula (2):

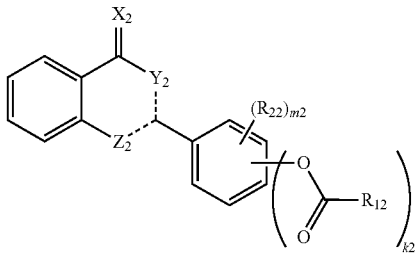

wherein $X_2$ represents an oxygen atom or a sulfur atom,
$Y_2$ represents an oxygen atom, a sulfur atom, or a nitrogen atom,
$Z_2$ represents an oxygen atom, a nitrogen atom or a sulfur atom,
$R_{12}$ and $R_{22}$ each represent a substituent,
$k_2$ represents an integer from 1 to 5,
$m_2$ represents an integer from 0 to 4, and
a dashed line represents a single bond (—) or a double bond (═).

8. The retardation film comprising a cellulose ester as the primary component according to claim 1, wherein the compound expressed by the general formula (1) is a compound expressed by a general formula (3):

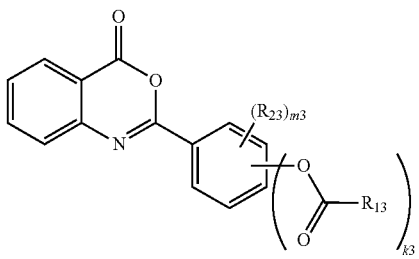

wherein $R_{13}$ and $R_{23}$ each represent a substituent, $k_3$ represents an integer from 1 to 5, and $m_3$ represents an integer from 0 to 4.

9. The retardation film comprising a cellulose ester as the primary component according to claim 1, wherein the compound expressed by a general formula (1) is a compound expressed by a general formula (4):

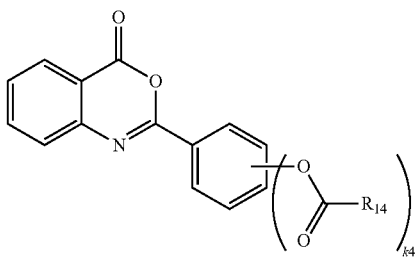

wherein $R_{14}$ represents a substituent, and $k_4$ represents an integer from 1 to 5.

* * * * *